(12) United States Patent
Koishi

(10) Patent No.: US 8,773,545 B2
(45) Date of Patent: Jul. 8, 2014

(54) IMAGE PROCESSING METHOD FOR EXECUTING COLOR CONVERSION PROCESSING, IMAGE PROCESSING PROGRAM, IMAGE PROCESSING DEVICE AND CAMERA

(75) Inventor: Erika Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 526 days.

(21) Appl. No.: 12/311,933

(22) PCT Filed: Oct. 23, 2007

(86) PCT No.: PCT/JP2007/070641
§ 371 (c)(1),
(2), (4) Date: Mar. 11, 2010

(87) PCT Pub. No.: WO2008/050761
PCT Pub. Date: May 2, 2008

(65) Prior Publication Data
US 2010/0165137 A1    Jul. 1, 2010

(30) Foreign Application Priority Data

Oct. 23, 2006  (JP) ................. 2006-287918
Nov. 24, 2006  (JP) ................. 2006-317391
Nov. 24, 2006  (JP) ................. 2006-317748

(51) Int. Cl.
*H04N 5/228*  (2006.01)
*G06K 9/00*   (2006.01)

(52) U.S. Cl.
USPC ........................ 348/222.1; 382/167

(58) Field of Classification Search
None
See application file for complete search history.

(56) References Cited

U.S. PATENT DOCUMENTS

| | | | |
|---|---|---|---|
| 5,754,682 A | 5/1998 | Katoh | |
| 6,987,519 B2* | 1/2006 | Kumada et al. | 345/603 |
| 2001/0011966 A1* | 8/2001 | Iwane et al. | 345/4 |
| 2002/0118210 A1* | 8/2002 | Yuasa et al. | 345/589 |
| 2003/0016862 A1 | 1/2003 | Ohga | |
| 2003/0053088 A1 | 3/2003 | Kanai et al. | |
| 2003/0214598 A1* | 11/2003 | Shizukuishi | 348/308 |
| 2005/0099429 A1* | 5/2005 | Chen et al. | 345/589 |
| 2005/0275911 A1* | 12/2005 | Yamada et al. | 358/518 |
| 2006/0209320 A1* | 9/2006 | Ariga | 358/1.9 |
| 2006/0284895 A1* | 12/2006 | Marcu et al. | 345/690 |

FOREIGN PATENT DOCUMENTS

| | | |
|---|---|---|
| JP | A-09-093451 | 4/1997 |
| JP | A-09-219800 | 8/1997 |
| JP | A-11-055688 | 2/1999 |
| JP | A-2000-050086 | 2/2000 |
| JP | A-2003-018416 | 1/2003 |
| JP | B2-3634633 | 3/2005 |

OTHER PUBLICATIONS http://www.ren-associates.com/ColorForumJ/program/home_jp.html, Oct. 16, 2006, p. 3, lines 17-18.

(Continued)

Primary Examiner — Albert Cutler
(74) Attorney, Agent, or Firm — Oliff PLC

(57) ABSTRACT

An image processing method for executing color conversion processing on input image data by taking into consideration chromatic adaptation, includes: executing color conversion processing by taking into consideration an adaptation factor indicating an extent of adaptation to an illumination condition under which a scene where an input image is obtained is illuminated or an adaptation factor indicating an extent of adaptation to a viewing condition where the input image is observed; and altering the adaptation factor in correspondence to a color of a conversion target pixel.

19 Claims, 34 Drawing Sheets

(56) References Cited

OTHER PUBLICATIONS

Mitsumori et al; "31.4: A Practical Method for Evaluating Viewing Angle Characteristics based on CIECAM02;" SID 2006; 2006 SID International Symposium; Society for Information Display; vol. XXXVII; May 24, 2005; pp. 1324-1327; XP007012725; ISSN: 0006-966X.

Moroney et al; "The CIECAM02 Color Appearance Model;" Color Science and Engineering: Systems, Technologies, Applications : Final Program and Proceedings of IS&T and SID Tenth Color Imaging Conference; IS&T; US; Jan. 1, 2002; pp. 23-27; XP008116526; ISBN: 978-0-89208-241-A.

Search Report issued in European Patent Application No. 07830375.7; mailed Oct. 7, 2010.

* cited by examiner

FIG.30

| AMBIENT LIGHT LEVEL | VALUE ASSUMED AS THRESHOLD La_limit |
|---|---|
| DARK | La_limit1 |
| LOW LIGHT | La_limit2 |
| BRIGHT | La_limit3 |

FIG.33

| AMBIENT LIGHT LEVEL | VALUE ASSUMED AS THRESHOLD $L_{a0}$ |
|---|---|
| DARK | $L_{a0}1$ |
| LOW LIGHT | $L_{a0}2$ |
| BRIGHT | $L_{a0}3$ |

IMAGE PROCESSING METHOD FOR EXECUTING COLOR CONVERSION PROCESSING, IMAGE PROCESSING PROGRAM, IMAGE PROCESSING DEVICE AND CAMERA

TECHNICAL FIELD

The present invention relates to an image processing method, an image processing program, an image processing device and a camera that may be adopted when executing the color conversion by taking into consideration a difference between viewing conditions.

BACKGROUND OF THE ART

Color takes on different appearances under different viewing conditions in such as the illumination white point, the illumination brightness, the ambient light level and the like. While the von Kries chromatic adaptation model in the known art is often adopted when executing chromatic adaptation transform taking into consideration the difference between the white points, the CIECAM02 may be adopted as a color appearance model if further details in the difference between the viewing conditions, including the difference in the luminance and the difference in the ambient light level, must be factored in. Since visual perception is not always completely adapted to the illumination provided in a given viewing condition, chromatic adaptation transform may be executed based upon an adaptation factor D ($0.0 \leq D \leq 1.0$) indicating the degree to which visual perception is adapted to the white point.

The adaptation factor D is determined in conformance to the viewing condition. For instance, in the color appearance model CIECAM 97s or CIECAM02 defined by the CIE, a value determined in correspondence to the illumination brightness or the ambient light level (whether the surrounding environment is light or dark) is utilized (see patent reference 1). Patent reference 2 proposes a method whereby the adaptation factor is altered based upon the correlated color temperature of the illumination.

Patent reference 1: Japanese Patent Publication No. 3634633.

Patent reference 2: Japanese Laid Open Patent Publication No. H11-055688

DISCLOSURE OF THE INVENTION

Problems to be Solved by the Invention

In a color appearance model in the related art, such as any of those mentioned above, the adaptation factor D, which is determined in conformance to the viewing condition, is assumed to be not dependent upon the actually targeted color. However, there is an issue yet to be effectively addressed in that the optimal appearance may not be achieved by adjusting the adaptation factor D in correspondence to the viewing condition.

In addition, the human eye is known to emphasize the perception of contrast in higher brightness (Stevens Effect). While the CIECAM02 color appearance model is a conversion model that takes into consideration such an effect on visual perception, processing executed based upon the CIECAM02 color appearance model is bound to be highly complicated. While the chromatic adaptation transform executed based upon the von Kries model requires an arithmetic operation simpler than that required by the CIECAM02 model, the effect on contrast perception as it is affected by brightness, cannot be reproduced through the von Kries chromatic adaptation transform executed simply by factoring in the difference between the white points.

Means for Solving Problems

According to the 1st aspect of the present invention, an image processing method for executing color conversion processing on input image data by taking into consideration chromatic adaptation, comprises: executing color conversion processing by taking into consideration an adaptation factor indicating an extent of adaptation to an illumination condition under which a scene where an input image is obtained is illuminated or an adaptation factor indicating an extent of adaptation to a viewing condition where the input image is observed; and altering the adaptation factor in correspondence to a color of a conversion target pixel.

According to the 2nd aspect of the present invention, an image processing method for executing color conversion processing on input image data by taking into consideration chromatic adaptation, comprises: executing color conversion processing by taking into consideration an adaptation factor indicating an extent of adaptation to a viewing condition where an output image is observed; and altering the adaptation factor in correspondence to a color of a conversion target pixel.

According to the 3rd aspect of the present invention, an image processing method for executing color conversion processing on input image data by taking into consideration chromatic adaptation, comprises: executing color conversion processing by taking into consideration an adaptation factor indicating an extent of adaptation to an illumination condition under which a scene where an input image is obtained is illuminated or an adaptation factor indicating an extent of adaptation to a viewing condition where the input image is observed and an adaptation factor indicating an extent of adaptation to a viewing condition where an output image is observed; and altering each of the adaptation factors in correspondence to a color of a conversion target pixel.

According to the 4th aspect of the present invention, in the image processing method according to any one of the 1st through 3rd aspects, it is preferred that the adaptation factor is altered in correspondence to a hue of the conversion target pixel.

According to the 5th aspect of the present invention, in the image processing method according to any one of the 1st through 3rd aspects, it is preferred that the adaptation factor is altered in correspondence to a saturation level of the conversion target pixel.

According to the 6th aspect of the present invention, an image processing method for executing color conversion processing on input image data by taking into consideration chromatic adaptation, comprises: executing color conversion processing by taking into consideration an adaptation factor indicating an extent of adaptation to an illumination condition under which a scene where an input image is obtained is illuminated or an adaptation factor indicating an extent of adaptation to a viewing condition where the input image is observed; and altering the adaptation factor based upon a color distribution in the input image, ascertained through color distribution analysis executed on the input image.

According to the 7th aspect of the present invention, an image processing method for executing color conversion processing on input image data by taking into consideration chromatic adaptation, comprises: executing color conversion processing by taking into consideration an adaptation factor indicating an extent of adaptation to a viewing condition where an output image is observed; and altering the adaptation factor based upon a color distribution in the input image, ascertained through color distribution analysis executed on the input image.

According to the 8th aspect of the present invention, an image processing method for executing color conversion processing on input image data by taking into consideration chromatic adaptation, comprises: executing color conversion processing by taking into consideration an adaptation factor indicating an extent of adaptation to an illumination condition under which a scene where an input image is obtained is illuminated or an adaptation factor indicating an extent of adaptation to a viewing condition where the input image is observed and an adaptation factor indicating an extent of adaptation to a viewing condition where an output image is observed; and altering each of the adaptation factors based upon a color distribution in the input image, ascertained through color distribution analysis executed on the input image.

According to the 9th aspect of the present invention, in the image processing method according to any one of the 6th through 8th aspects, it is preferred that the input image is divided into a plurality of areas, a representative color is determined in correspondence to each of the areas and the adaptation factor is altered based upon the representative color.

According to the 10th aspect of the present invention, in the image processing method according to any one of the 6th through 9th aspects, it is preferred that an adaptation factor applicable to an entire image is determined based upon the color distribution resulting from the color distribution analysis.

According to the 11th aspect of the present invention, in the image processing method according to any one of the 6th through 11th aspects, it is preferred that the adaptation factor for each area is altered based upon the color distribution resulting from the analysis.

According to the 12th aspect of the present invention, in the image processing method according to any one of the 6th through 11th aspects, it is preferred that a hue distribution is determined based upon the color distribution resulting from the color distribution analysis and the adaptation factor is altered based upon the hue distribution.

According to the 13th aspect of the present invention, in the image processing method according to any one of the 6th through 11th aspects, it is preferred that a saturation distribution is determined based upon the color distribution resulting from the analysis and the adaptation factor is altered based upon the saturation distribution.

According to the 14th aspect of the present invention, in the image processing method according to the 4th or 12th aspect, it is preferred that the adaptation factor is altered in correspondence to a color temperature of illumination in the scene where the input image is obtained or a color temperature of illumination in the viewing condition where the input image is observed, or in correspondence to a color temperature of illumination in the viewing condition where the output image is observed.

According to the 15th aspect of the present invention, in the image processing method according to any one of the 4th, 12th and 14th aspects, it is preferred that the adaptation factor is altered in correspondence to a saturation level of the conversion target pixel.

According to the 16th aspect of the present invention, in the image processing method according to any one of the 1st, 3rd, 6th and 8th aspects, it is preferred that: information related to the illumination condition under which the scene where the input image is obtained is illuminated or related to the viewing condition where the input image is observed is obtained; and the adaptation factor is determined by also taking into consideration the information related to the illumination condition or the viewing condition.

According to the 17th aspect of the present invention, in the image processing method according to any one of the 2nd, 3rd, 7th and 8th aspects, it is preferred that: information related to the viewing condition where the output image is observed is obtained; and the adaptation factor is determined by also taking into consideration the information related to the viewing condition.

According to the 18th aspect of the present invention, in the image processing method according to the 16th or 17th aspect, it is preferred that the adaptation factor is altered in correspondence to a hue of the conversion target pixel.

According to the 19th aspect of the present invention, in the image processing method according to the 18th aspect, it is preferred that the adaptation factor is altered in correspondence to a color temperature of illumination in the scene where the input image is obtained or a color temperature of illumination in the viewing condition where the input image is observed, or in correspondence to a color temperature of illumination in the viewing condition where the output image is observed.

According to the 20th aspect of the present invention, in the image processing method according to the 18th or 19th aspect, it is preferred that the adaptation factor is altered in correspondence to a saturation level of the conversion target pixel.

According to the 21st aspect of the present invention, in the image processing method according to any one of the 1st through 3rd, 5th, 6th through 11 and 13th aspects, it is preferred that: a first illumination brightness in the scene where the input image is obtained or in the viewing condition where the input image is observed is ascertained; a second illumination brightness in the viewing condition where the output image is observed is obtained; and an adaptation factor for achromatic color and an adaptation factor for chromatic color are altered based upon a difference between the first illumination brightness and the second illumination brightness.

According to the 22nd aspect of the present invention, in the image processing method according to the 21st aspect, it is preferred that the adaptation factor for achromatic color and the adaptation factor for chromatic color are altered if the first illumination brightness is higher than the second illumination brightness.

According to the 23rd aspect of the present invention, in the image processing method according to any one of the 18th through 20th aspects, it is preferred that a value obtained by averaging adaptation factors determined over a full hue range is altered in correspondence to the illumination condition under which the scene where the input image is obtained is illuminated or the viewing condition where the input image is observed and also in correspondence to the viewing condition where the output image is observed.

According to the 24th aspect of the present invention, in the image processing method according to the 23rd aspect, it is preferred that the value obtained by averaging the adaptation factors determined over the full hue range corresponds to an adaptation factor defined in CIECAM02.

According to the 25th aspect of the present invention, in the image processing method according to any one of the 18th through 20th, 23rd and 24th aspects, it is preferred that the adaptation factor D is calculated as expressed; $D=\alpha(La, F)+\beta(La, F) \times \gamma(h)$ by using functions $\alpha(La, F)$ and $\beta(La, F)$ related to an adapted luminance La in the scene where the input image is obtained or in the viewing condition where the input image is observed or the output image is observed and a parameter F determined in correspondence to an ambient light level and a function γ (h) related to a hue h determined based upon the conversion target pixel or based upon the color distribution resulting from the color distribution analysis.

According to the 26th aspect of the present invention, in the image processing method according to any one of the 18th through 20th, 23rd and 24th aspects, it is preferred that the adaptation factor D is calculated, as expressed; D=α' (Ld, F)+β' (Ld, F)×γ (h) by using functions α' (Ld, F) and β' (Ld, F) related to an illumination luminance Ld in the scene where the input image is obtained or in the viewing condition where the input image is observed or in the viewing condition where the output image is observed and a parameter F determined in correspondence to the ambient light level and a function γ (h) related to a hue h determined based upon the conversion target pixel or based upon the color distribution resulting from the color distribution analysis.

According to the 27th aspect of the present invention, in the image processing method according to the 25th aspect, it is preferred that α (La, F) is constantly set to 0.

According to the 28th aspect of the present invention, in the image processing method according to the 26th aspect, it is preferred that α' (Ld, F) is constantly set to 0.

According to the 29th aspect of the present invention, in the image processing method according to the 25th aspect, it is preferred that β (La, F) is constantly set to 1.

According to the 30th aspect of the present invention, in the image processing method according to the 26th aspect, it is preferred that β' (Ld, F) is constantly set to 1.

According to the 31st aspect of the present invention, in the image processing method according to the 25th aspect, it is preferred that β (La, F) is set to 0 when La assumes a value equal to or less than a predetermined threshold value La_limit.

According to the 32nd aspect of the present invention, in the image processing method according to the 26th aspect, it is preferred that β' (Ld, F) is set to 0 when Ld assumes a value equal to or less than a predetermined threshold value Ld_limit.

According to the 33rd aspect of the present invention, in the image processing method according to the 31st aspect, it is preferred that the La_limit is equal to or less than 100 Cd/m².

According to the 34th aspect of the present invention, in the image processing method according to the 31st or 33rd aspect, it is preferred that the La_limit is adjusted in correspondence to characteristics of an observer observing the output image.

According to the 35th aspect of the present invention, in the image processing method according to the 32nd aspect, it is preferred that the Ld_limit is adjusted in correspondence to characteristics of an observer observing the output image.

According to the 36th aspect of the present invention, in the image processing method according to any one of the 25th through 35th aspects, it is preferred that D is set to 1 if D calculated as expressed; D=α (La, F)+β (La, F)×γ (h) or D=α' (Ld, F)+β' (Ld, F)×γ (h) is greater than 1 and D is set to 0 if the calculated D is less than 0.

According to the 37th aspect of the present invention, in the image processing method according to any one of the 14th, 15th, 19th, 20th and 23rd through 36th aspects, it is preferred that if the color temperature of the illumination in the scene where the input image is obtained or the color temperature of the illumination in the viewing condition where the input image or the output image is observed is low, an adaptation factor for yellow through red is set to assume a value higher than an adaptation factor for another color and an adaptation factor for blue is set to assume a value lower than a value set in correspondence to another color.

According to the 38th aspect of the present invention, in the image processing method according to any one of the 14th, 15th, 19th, 20th and 23rd through 36th aspects, it is preferred that if the color temperature of the illumination in the scene where the input image is obtained or the color temperature of the illumination in the viewing condition where the input image or the output image is observed is high, an adaptation factor for yellow through red is set to assume a value lower than an adaptation factor for another color and an adaptation factor for blue is set to assume a value higher than a value set in correspondence to another color.

According to the 39th aspect of the present invention, in the image processing method according to any one of the 31th through 35th aspects, it is preferred that the La_limit or the Ld_limit is altered in correspondence to the ambient light level.

According to the 40th aspect of the present invention, an image processing method for executing color conversion processing on input image data by taking into consideration chromatic adaptation, comprises: executing color conversion processing by taking into consideration at least one of an adaptation factor indicating an extent of adaptation to an illumination condition under which a scene where an input image is obtained is illuminated, an adaptation factor indicating an extent of adaptation to a viewing condition where the input image is observed and an adaptation factor indicating an extent of adaptation to a viewing condition where an output image is observed; and making a switch based upon the current viewing condition or the input image, to alter or not to alter the adaptation factor in correspondence to a representative color determined based upon a conversion target pixel or based upon a conversion target pixel and surrounding pixels.

According to the 41st aspect of the present invention, in the image processing method according to the 40th aspect, it is preferred that the switch is made by allowing or disallowing the adaptation factor to be hue-dependent.

According to the 42nd aspect of the present invention, in the image processing method according to the 40th or 41st aspect, it is preferred that hue-dependency of the adaptation factor is disregarded if a saturation level of the representative color determined based upon the conversion target pixel or based upon the conversion target pixel and surrounding pixels is equal to or less than a predetermined threshold value.

According to the 43rd aspect of the present invention, in the image processing method according to any one of the 40th through 42nd aspects, it is preferred that hue-dependency of the adaptation factor is disregarded if an adapted luminance is equal to or less than a predetermined threshold value.

According to the 44th aspect of the present invention, in the image processing method according to any one of the 40th through 43rd aspects, it is preferred that hue-dependency of the adaptation factor is disregarded based upon a type of illumination in the scene where the input image is obtained or the viewing condition where the input or output image is observed.

According to the 45th aspect of the present invention, in the image processing method according to the 44th aspect, it is preferred that the hue-dependency of the adaptation factor is disregarded if a color temperature of illumination in the scene where the input image is obtained or the viewing condition where the input or output image is observed falls within a predetermined range.

According to the 46th aspect of the present invention, in the image processing method according to any one of the 40th through 45th aspects, it is preferred that a switching range over which the adaptation factor is either regarded or not regarded as hue-dependent is adjusted in correspondence to characteristics of an observer observing the output image.

According to the 47th aspect of the present invention, an image processing method for executing color conversion processing on input image data by taking into consideration chromatic adaptation, comprises: executing color conversion processing by taking into consideration at least one of an adaptation factor indicating an extent of adaptation to an illumination condition under which a scene where an input image is obtained is illuminated, an adaptation factor indicating an extent of adaptation to a viewing condition where the input image is observed and an adaptation factor indicating an extent of adaptation to a viewing condition where an output image is observed; and altering the adaptation factor based upon a color of the input image.

According to the 48th aspect of the present invention, in the image processing method according to any one of the 1st through 47th aspects, it is preferred that the color conversion is executed based upon a matrix.

According to the 49th aspect of the present invention, in the image processing method according to any one of the 1st through 48th aspects, it is preferred that the adaptation factor indicating an extent of adaptation to the illumination condition under which the scene where the input image is obtained is illuminated or the adaptation factor indicating an extent of adaptation to the viewing condition where the input image is observed and the adaptation factor indicating an extent of adaptation to the viewing condition where the output image is observed are each altered in correspondence to an appearance mode.

According to the 50th aspect of the present invention, in the image processing method according to the 49th aspect, it is preferred that the appearance mode is switched based upon at least one of a self-luminous color and an object color.

According to the 51st aspect of the present invention, an image processing program enables a computer to execute an image processing method according to anyone of the 1st through 50th aspects.

According to the 52nd aspect of the present invention, an image processing device has installed therein an image processing program according to the 51st aspect.

According to the 53rd aspect of the present invention, a camera comprises: an imaging unit that captures a subject image; a display unit; and a control unit. And the control unit executes color conversion processing on image data generated by capturing an image via the imaging unit through an image processing method according to any one of the 1 through 50, and displays the image data having undergone the color conversion processing at the display unit.

According to the 54th aspect of the present invention, in the camera according to the 53rd aspect, it is preferred that: the camera further comprises a photometering unit; and the control unit sets a viewing condition, where an output image is observed, based upon photometering data obtained via the photometering unit and an illumination condition at the image display unit.

Advantageous Effect of the Invention

According to the present invention, color appearance can be reproduced quite accurately even when there is a difference between viewing conditions or illumination conditions.

BEST MODE FOR CARRYING OUT THE INVENTION

First Embodiment

The first embodiment is characterized in that more accurate color appearance reproduction is assured by altering an adaptation factor indicating the extent of incomplete adaptation depending upon the hue of the conversion target color.

Figure 1:
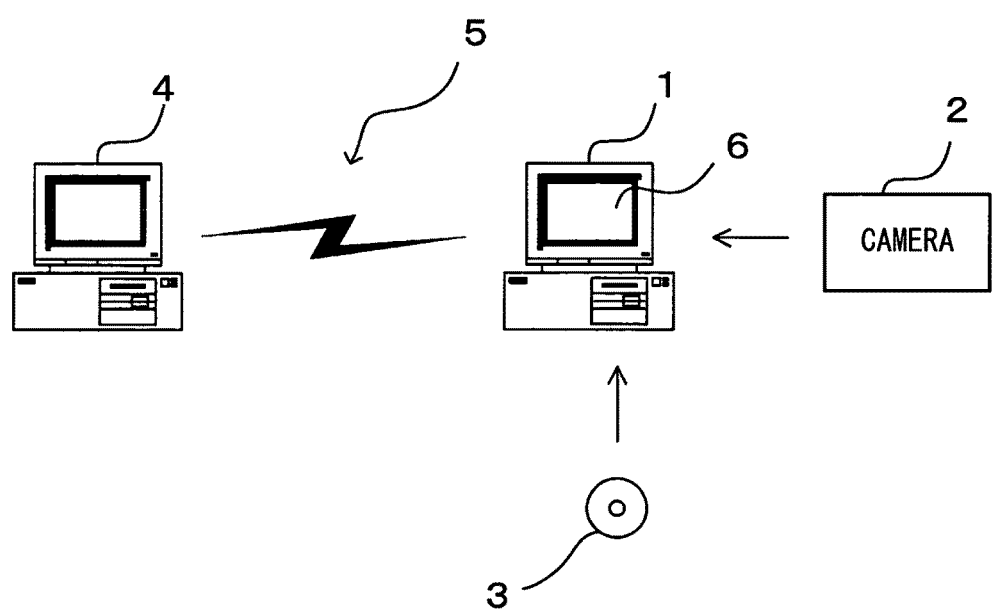
FIG. 1 The image processing device achieved in a first embodiment of the present invention FIG. 2 The relationship between the optimal adaptation factor $P_{h*}$ and the hue angle h*

FIG. 1 shows the image processing device achieved in the embodiment of the present invention. The image processing device is constituted with a personal computer 1. The personal computer 1, connected with a digital camera 2, a recording medium 3 such as a CD-ROM, another computer 4 and the like, receives various types of image data. The personal computer 1 executes the image processing described below on the image data provided thereto. The computer 4 is connected via the Internet or another electrical communication network 5.

The program enabling the personal computer 1 to execute the image processing, which may be provided in a recording medium such as a CD-ROM or from another computer via the Internet or another electrical communication network through a system similar to that shown in FIG. 1, is installed in the computer 1. At the personal computer 1, constituted with a CPU (not shown), a memory (not shown), peripheral circuits (not shown), a monitor 6 and the like, the installed program is executed by the CPU.

The program may be provided via the Internet or another electrical communication network as a signal on a carrier wave on the electrical communication network, i.e., on a carrier wave that transmits thorough the transmission medium. In short, the program can be distributed as a computer-readable computer program product in any of various modes including a recording medium and a carrier wave.

The personal computer 1 in the embodiment converts image data obtained through photographing operation executed under a photographic scene illumination conditions to image data reproducing the color appearance in correspondence to image viewing conditions different from the photographic scene illumination conditions by taking into consideration the chromatic adaptation characteristics of human visual perception.

Results of Color Appearance Tests

In a color appearance test, a highly qualified specialist in the appearance of color, is asked to select colors of similar appearance under two viewing conditions (viewing environments) having different color temperatures. Through such color appearance tests in which the specialist selects a color perceived in one viewing condition with a given color temperature in the other viewing condition with a different color temperature among a plurality of colors resulting from color conversion executed by adjusting the adaptation factor, results indicating how an optimal adaptation factor D changes dependently upon the hue, are obtained.

A reference color A (h*) is displayed in a viewing condition with a color temperature $T_1$. The reference color A (h*) is represented by the hue h*. It is to be noted that the hue h* is indicated as a hue angle. The results obtained through CIA-CAM02 color conversion executed on the reference color A (h*) by taking into consideration the difference between the color temperatures $T_1$ and $T_2$ are displayed in the viewing condition with the color temperature $T_2$. At this time, a plurality of color options B (h*) (D) in a range of D=0.0~1.0 are displayed as adaptation factor options, instead of a single adaptation factor value D that may be estimated based upon the viewing conditions such as the illumination brightness and the ambient light level. The specialist compares the appearance of the color A (h*) observed in the viewing condition with the color temperature $T_1$ with the appearances of the colors B (h*) (D) (D=0.0 . . . , 1.0) observed in the viewing condition with the color temperature $T_2$ and selects a color B (h*) ($D_{h*}$) closest in appearance to A (h*). This test procedure is executed for a plurality of colors assuming various hue angles h* without changing the brightness or the saturation level of the reference color A (h*).

Figure 2:
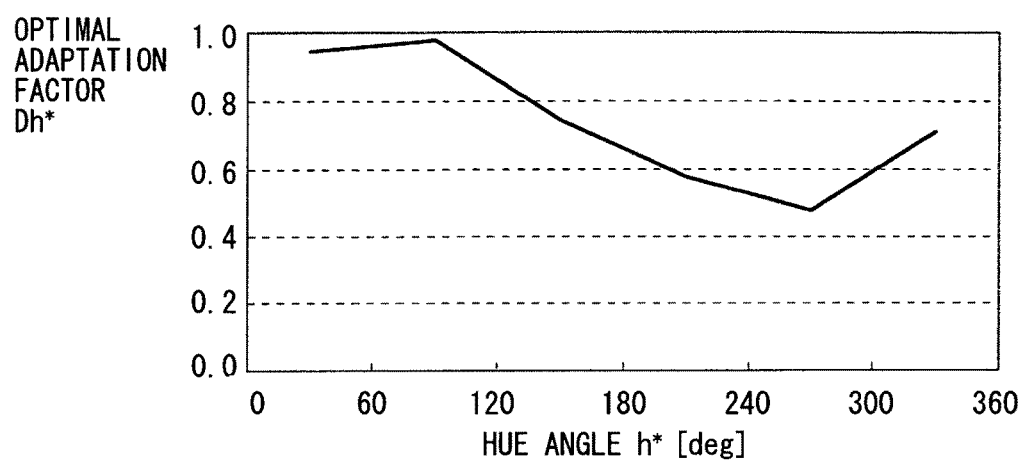

A plurality of participants took part in the tests described above a plurality of times and the results presented in FIG. 2 were obtained by collecting the individual test results. In FIG. 2, showing the relationship between the optimal adaptation factor $D_{h*}$ and the hue angle h*, the hue angle h* (in units of deg) is indicated along the horizontal axis and the participant average value of the optimal adaptation factors $D_{h*}$ selected as the colors closest in appearance in the individual tests is indicated along the vertical axis. Tests were conducted in relation to the embodiment for six colors with different hue angles; h*=30° (red), h*=90° (yellow), h*=150° (green), h*=210° (cyan), h*=270° (blue) and h*=330° (magenta). The results presented in FIG. 2 indicate that the optimal adaptation factor changes in conformance to the hue and that the color appearance is better approximated by increasing $D_{h*}$ when h*=90° (yellow) and reducing $D_{h*}$ when h*=270° (blue).

Conversion Processing

Figure 3:
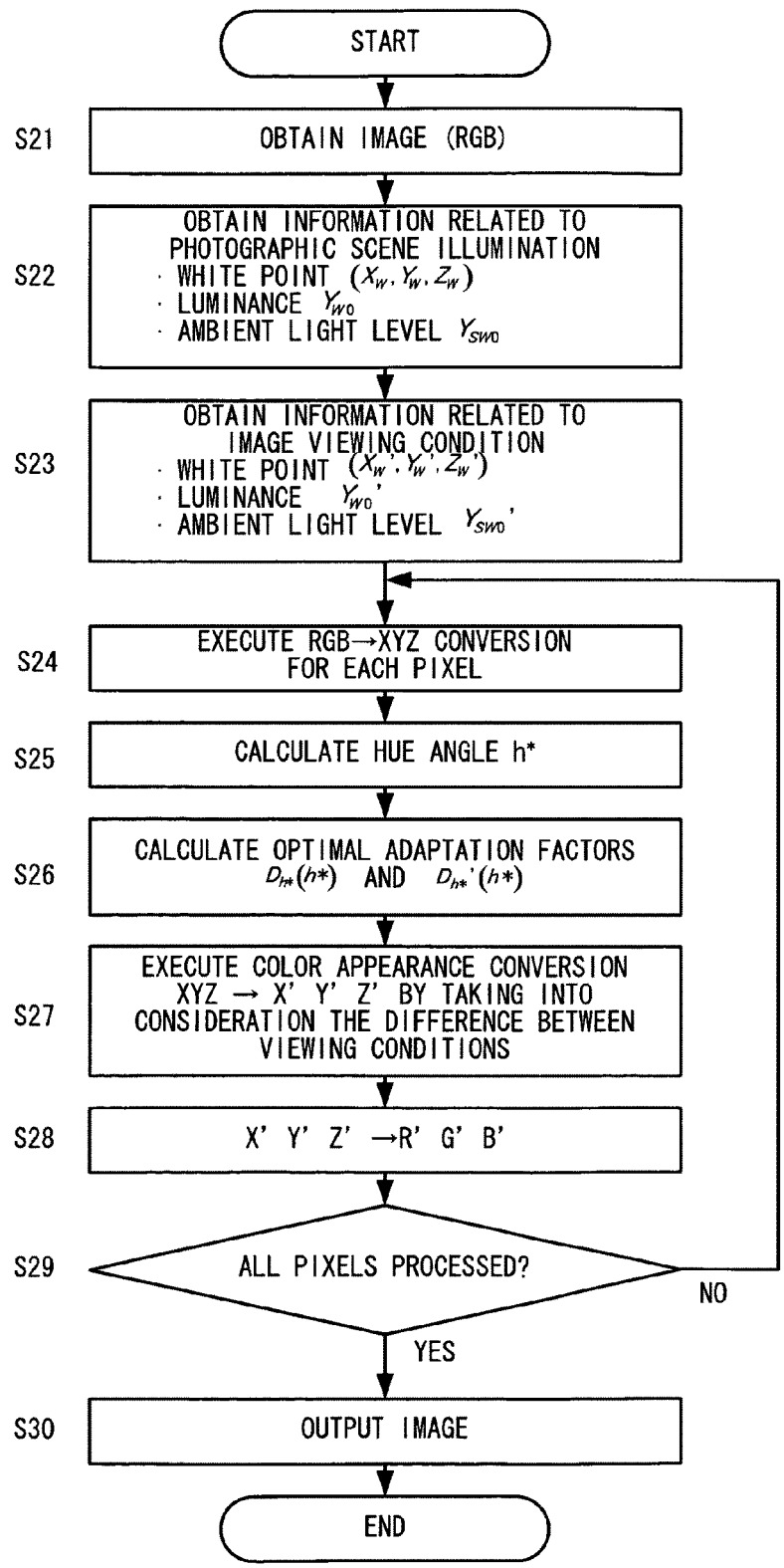
FIG. 3 A flowchart of the processing executed in the personal computer 1 in the first embodiment FIG. 4 The microscope observation system achieved in a second embodiment, constituted with a microscope 100, a personal computer 1 and a digital camera 2

Next, the color conversion processing is described. FIG. 3 presents a flowchart of the processing executed in the personal computer 1 in the first embodiment. The relationship $D_{h*}$ (h*) between the optimal adaptation factor and the hue, determined through tests similar to those described above, may be stored in the form of a table or an approximating expression into the image processing program. Alternatively, the relationship may be saved in advance as data to be referenced by the program into the storage device, the memory or the like in the personal computer 1.

First, a photographic image is obtained in step S21. The photographic image, constituted of a plurality of pixels, is described in the color space RGB inherent to the spectral sensitivity of the camera.

The operation then proceeds to step S22. In step S22, information related to the photographic scene illumination is obtained. Namely, information indicating the illumination white point ($X_w$, $Y_w$, $Z_w$) and the luminance $Y_{w0}$ of the photographic scene illumination and the ambient light level $Y_{sw0}$ in the environment where the image is photographed is obtained. For instance, values input by the user (observer) via a keyboard, indicating the results obtained by measuring the white point and the luminance levels via a spectroradiometer or the like, may be read in. Alternatively, the photographing illumination white point ($X_w$, $Y_w$, $Z_w$) may be calculated by engaging the auto white balance function of the digital camera and the photographing illumination brightness $Y_{w0}$ may be calculated by analyzing the results provided by engaging the photometering function, which is utilized for purposes of automatic exposure adjustment. The ambient light level $Y_{sw0}$ may be calculated based upon the results obtained by executing photometering over a wider range. As an alternative, a value indicated in information input in advance by the photographer and appended to the image or a value input by the photographer via a keyboard may used as the ambient light level $Y_{sw0}$.

In step S23, information related to the image viewing condition is obtained. Assuming that an image on display at a monitor is observed in standard viewing conditions, the image viewing condition is the sRGB standard viewing conditions (white point=D65, luminance $Y_{device0}'$=80 Cd/m$^2$, ambient light level $Y_{sw0}'$=4.1 Cd/m$^2$). If, on the other hand, the image is observed in a viewing condition other than the sRGB standard viewing conditions or an image printout is observed, the personal computer 1 may read the device white point ($X_{device}'$, $Y_{device}'$, $Z_{device}'$) and the device luminance $Y_{device0}'$ of the device used for the image observation and the ambient light white point ($X_{sw}'$, $Y_{sw}'$, $Z_{sw}'$) and the ambient light level $Y_{sw0}'$, input by the user (observer) via a keyboard or the like and determine the illumination white point ($X_w'$, $Y_w'$, $Z_w'$) and the corresponding luminance $Y_{w0}'$ in the image viewing condition by integrating the device white point and the ambient light white point.

More specifically, the information may be obtained through the calculation expressed below based upon a ratio $R_{mix}'$ of the influences of the device light source and the illumination light source used for the image observation.

[Expression 1]

$$\begin{pmatrix} L_{device}' \\ M_{device}' \\ S_{device}' \end{pmatrix} = M_{CAT02} \begin{pmatrix} X_{device}' \\ Y_{device}' \\ Z_{device}' \end{pmatrix} \quad (1)$$

[Expression 2]

$$\begin{pmatrix} L_{SW}' \\ M_{SW}' \\ S_{SW}' \end{pmatrix} = M_{CAT02} \begin{pmatrix} X_{SW}' \\ Y_{SW}' \\ Z_{SW}' \end{pmatrix} \quad (2)$$

[Expression 3]

$$L_W' = \frac{R_{mix}' \cdot Y_{device0}'^{1/3} \cdot L_{device}' + (1 - R_{mix}') \cdot Y_{SW0}'^{1/3} \cdot L_{SW}'}{R_{mix}' \cdot Y_{device0}'^{1/3} + (1 - R_{mix}') \cdot Y_{SW0}'^{1/3}}$$

$$M_W' = \frac{R_{mix}' \cdot Y_{device0}'^{1/3} \cdot M_{device}' + (1 - R_{mix}') \cdot Y_{SW0}'^{1/3} \cdot M_{SW}'}{R_{mix}' \cdot Y_{device0}'^{1/3} + (1 - R_{mix}') \cdot Y_{SW0}'^{1/3}}$$

$$S_W' = \frac{R_{mix}' \cdot Y_{device0}'^{1/3} \cdot S_{device}' + (1 - R_{mix}') \cdot Y_{SW0}'^{1/3} \cdot S_{SW}'}{R_{mix}' \cdot Y_{device0}'^{1/3} + (1 - R_{mix}') \cdot Y_{SW0}'^{1/3}} \quad (3)$$

[Expression 4]

$$\begin{pmatrix} X_W' \\ Y_W' \\ Z_W' \end{pmatrix} = (M_{CAT02})^{-1} \begin{pmatrix} L_W' \\ M_W' \\ S_W' \end{pmatrix} \quad (4)$$

[Expression 5]

$$Y_{W0}' = (R_{mix}' \cdot Y_{device0}'^{1/3} + (1 - R_{mix}') \cdot Y_{SW0}'^{1/3})^3 \quad (5)$$

It is to be noted that $M_{cat02}$ is a conversion matrix used to convert the XYZ data to cone response LMS.

[Expression 6]

$$M_{CAT02} = \begin{pmatrix} 0.7328 & 0.4296 & -0.1624 \\ -0.7036 & 1.6975 & 0.0061 \\ 0.0030 & 0.0136 & 0.9834 \end{pmatrix} \quad (6)$$

The operation then proceeds to step S24. The processing in steps S24~S28 is repeatedly executed until all the pixels are processed. Since camera RGB data are expressed in the inherent color space RGB determined based upon the camera spectral sensitivity, the data are converted to CIE 1931 XYZ color space by using a predetermined camera RGB→XYZ matrix $N_{RGB \to XYZ}$.

[Expression 7]

$$\begin{pmatrix} X \\ Y \\ Z \end{pmatrix} = M_{RGB \to XYZ} \cdot \begin{pmatrix} R \\ G \\ B \end{pmatrix} \quad (7)$$

The operation then proceeds to step S25 to calculate the hue angle h* of the conversion target pixel. The CIE XYZ data are converted to CIELAB data and the angle formed in the a*b* coordinate system is calculated in the 0~360° range as the hue angle h*.

In step S26, based upon the relationship $D_{h*}$ (h*) between the optimal adaptation factor and the hue determined in advance based upon the color appearance test results, the adaptation factor $D_{h*}$ (h*) that provides the optimal color appearance in correspondence to h* calculated in step S25 is determined. Since the adaptation factor is affected by the ambient light and the adapted luminance in the surrounding environment, the optimal adaptation factor takes on different values in correspondence to the photographic viewing condition and the image viewing condition. For this reason, an adaptation factor $D_{h*}'$ (h*) for the image observation, too, may be calculated.

In step S27, a color X'Y'Z' taking on an appearance under the observation illumination condition, which is close to the appearance of the color XYZ as perceived under the photographic scene illumination condition, is calculated based upon the difference between the viewing conditions having been ascertained in steps S22 and S23 and $D_{h*}$ (h*) and $D_{h*}'$ (h*) having been calculated in step S26. The color appearance model used in this step may be a chromatic adaptation transform expression that factors in the difference between the viewing conditions, such as the CIECAM02 model or the von Kries chromatic adaptation model. If the CIECAM02 model is used, $D_{h*}$ (h*) calculated in step S26 may be used in place of the adaptation factor D calculated as expressed in the defining expression when converting the XYZ data to JCh data and $D_{h*}'$ (h*) calculated in step S26 may be used when converting the JCh data to X'Y'Z' data. If the von Kries chromatic adaptation transform expression is used, color conversion may be executed as expressed below.

[Expression 8]

$$\begin{pmatrix} X' \\ Y' \\ Z' \end{pmatrix} = (M_{CAT02})^{-1} \cdot M_h \cdot M_{CAT02} \cdot \begin{pmatrix} X \\ Y \\ Z \end{pmatrix} \quad (8)$$

provided

[Expression 9]

$$M_h = \begin{pmatrix} \dfrac{L'_{W,D}}{L_{W,D}} & 0.0 & 0.0 \\ 0.0 & \dfrac{M'_{W,D}}{M_{W,D}} & 0.0 \\ 0.0 & 0.0 & \dfrac{S'_{W,D}}{S_{W,D}} \end{pmatrix} \quad (9)$$

[Expression 10]

$$L_{W,D} = \frac{L_W}{Y_W \cdot D_{h^*}(h^*) + L_W \cdot (1 - D_{h^*}(h^*))}$$

$$M_{W,D} = \frac{M_W}{Y_W \cdot D_{h^*}(h^*) + M_W \cdot (1 - D_{h^*}(h^*))} \quad (10)$$

$$S_{W,D} = \frac{S_W}{Y_W \cdot D_{h^*}(h^*) + S_W \cdot (1 - D_{h^*}(h^*))}$$

[Expression 11]

$$L'_{w,D} = \frac{L'_w}{Y'_w \cdot D'_{h^*}(h) + L'_w \cdot (1 - D'_{h^*}(h))}$$

$$M'_{w,D} = \frac{M'_w}{Y'_w \cdot D'_{h^*}(h) + M'_w \cdot (1 - D'_{h^*}(h))} \quad (11)$$

$$S'_{w,D} = \frac{S'_w}{Y'_w \cdot D'_{h^*}(h) + S'_w \cdot (1 - D'_{h^*}(h))}$$

[Expression 12]

$$\begin{pmatrix} L_W \\ M_W \\ S_W \end{pmatrix} = M_{CAT02} \cdot \begin{pmatrix} X_W \\ Y_W \\ Z_W \end{pmatrix} \quad (12)$$

[Expression 13]

$$\begin{pmatrix} L'_W \\ M'_W \\ S'_W \end{pmatrix} = M_{CAT02} \cdot \begin{pmatrix} X'_W \\ Y'_W \\ Z'_W \end{pmatrix} \quad (13)$$

The operation then proceeds to step S28 to convert the X'Y'Z' data to data in the color space R'G'B' to be used as the output image. $M_{XYZ \to sRGB}$ is a matrix used to convert the XYZ data to data in the color space RGB to be used as the output image and assuming that the output image is expressed with data in the color space sRGB, a matrix predetermined in conformance to the standard may be used.

[Expression 14]

$$\begin{pmatrix} R' \\ G' \\ G' \end{pmatrix} = M_{XYZ \to sRGB} \cdot \begin{pmatrix} X' \\ Y' \\ Z' \end{pmatrix} \quad (14)$$

If it is decided in step S29 that the processing for all the pixels has not yet been completed, the operation returns to step S24 to repeat the processing described above. Once the processing for all the pixels is completed, the operation proceeds to step S30 to output the image and then the processing ends.

Through the processing described above, the color appearance can be accurately reproduced even when the scene where an image is photographed and the environment where the photographic image is observed are illuminated under different illumination conditions. The image processing device achieved in the embodiment, which executes color conversion by using the optimal adaptation factor in correspondence to the color, i.e., the hue of the conversion target pixel, is capable of predicting the accurate color appearance with a high level of reliability.

It is to be noted that the embodiment may be adopted in various color conversion methods whereby color conversion is executed by factoring in the chromatic adaptation, including the CIECAM02 color appearance model and the von Kries chromatic adaptation transform executed by incorporating the white point conversion alone.

It is also to be noted that the value $(X_w', Y_w', Z_w')$ in the CIE 1931 XYZ colorimetric system is calculated as the illumination white point in the image viewing condition in step S23 described above. As an alternative, the arithmetic operation expressed in (4) may be skipped and the value $(L_w', M_w', S_w')$ in the cone response space may be obtained as the illumination white point in the image viewing condition. In such a case, the arithmetic operation executed in step S27 as expressed in (13) can also be skipped and $(L_w', M_w', S_w')$ obtained in step S23 can be directly used in expression (11). As a result, the processing load can be reduced.

While the first embodiment is described above in reference to an example in which an image is brought up on display at the monitor 6, the output image may instead be displayed via a projector or in the form of a printout. An example of input data that may be used to display the image as a printout has already been described in reference to step S23. When the image is displayed via a projector, the user may input via a keyboard or the like values representing the output image viewing condition. The device white point $(X_{device}', Y_{device}', Z_{device}')$ and the device luminance $Y_{device0}'$ may be set by referencing data included in the specifications or the user may input values obtained through actual measurement to be used as the device white point $(X_{device}', Y_{device}', Z_{device}')$ and the device luminance $Y_{device0}'$. If the observation is conducted in a dark room where it is dimly lit, $Y_{sw0}'=0$, and $(X_{sw}', Y_{sw}', Z_{sw}')=(X_{device}', Y_{device}', Z_{device}')$ may be input to be used as the ambient light white point $(X_{sw}', Y_{sw}', Z_{sw}')$ and the ambient light level $Y_{sw0}'$. In case of not in a dark room, the user measures actual values and input the measured values.

In the first embodiment described above, the processing is executed by using the results of tests conducted with regard to hue directions. As an alternative, tests similar to those pertaining to hue directions may also be conducted with regard to directions of saturation or lightness and the results of such tests, too, may be utilized in the adaptation factor calculation. In such a case, the saturation level may assume a value $C^* = (a^{*2} + b^{*2})^{1/2}$ and the lightness level may assume the value of $L^*$ in the CIELAB.

In addition, while an explanation is given above on an example in which $h^*$, $L^*$ and $C^*$ in the CIELAB are used respectively for the hue, the lightness and the saturation, parameters in a color space other than the CIELAB may be utilized instead. For instance, J, C and h parameters indicating the relative lightness, the relative saturation and the relative hue in the CIECAM02 may be utilized.

Second Embodiment

The second embodiment is characterized in that the color appearance is reproduced when there is a significant difference between the brightness levels in the different viewing conditions and particularly in that the visual characteristics whereby the image appears to assume a high level of contrast when there is a significant brightness difference are rendered with ease, without having to execute complicated calculations such as those required in the CIECAM02 model.

In reference to the second embodiment, a color conversion method that allows a photomicrograph (refers to an image magnified by a microscope) obtained by photographing an image through a microscope with the digital camera 2 and observed at a monitor or as a printout, to take on an appearance close to the microscope image observed with the naked eye, is described.

Figure 4:
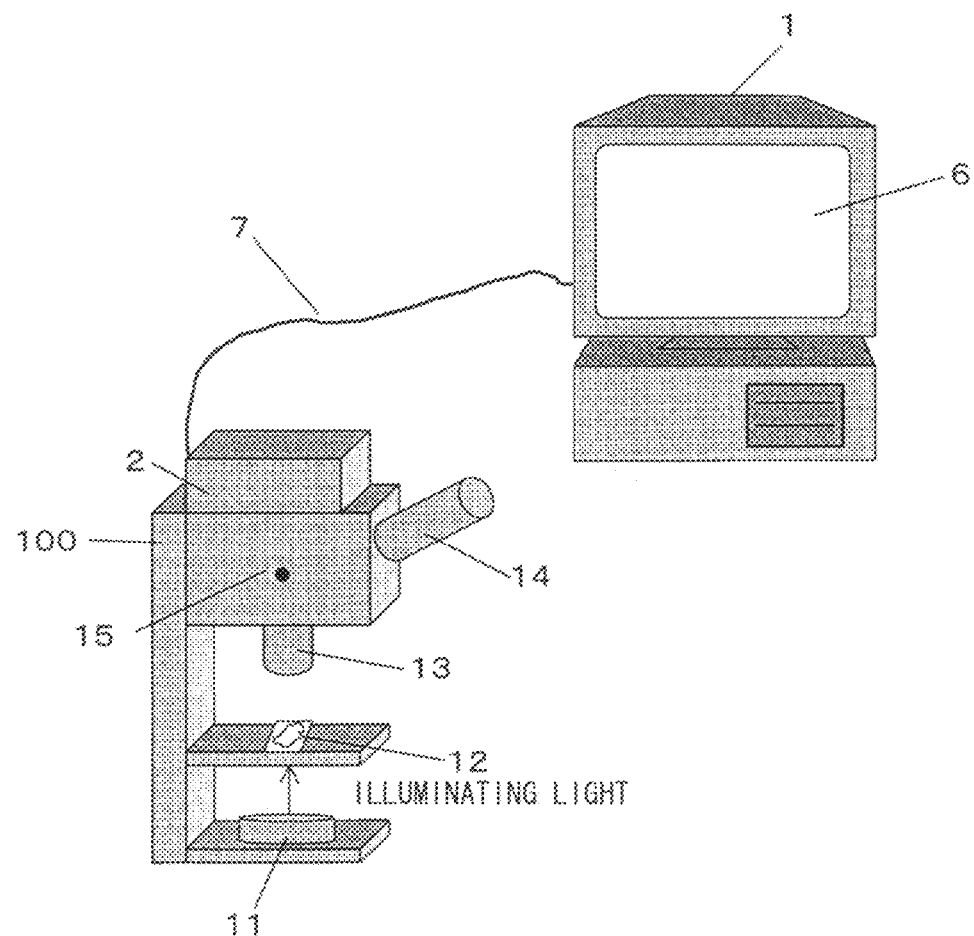

FIG. 4 shows a microscope observation system achieved in the embodiment comprising a microscope 100, a personal computer 1 and a digital camera 2. The personal computer 1 and the digital camera 2 are similar to those in the first embodiment. The personal computer 1 and the digital camera 2 are connected by a cable 7.

A specimen 12 is illuminated with an illuminating light source 11 and a specimen image magnified through an objective lens 13 and an eyepiece lens 14 can be observed through the microscope 100. As shown in FIG. 4, the digital camera 2 is mounted atop the microscope 100. The personal computer 1 takes in an image photographed with the digital camera 2 and displays the image thus taken in on the monitor 6 in real time.

The microscope 100 includes a visual field selector switch 15 via which the visual field can be switched to the eyepiece lens 14 or to the digital camera 2. Thus, the specimen 12 can be directly observed with the naked eye through the eyepiece lens 14 or the specimen 12 can be observed as a photomicrograph captured with the digital camera 2, which is brought up on display at the monitor 6 at the personal computer 1. While the setting can be adjusted completely to the eyepiece lens side or the digital camera side via the visual field selector switch 15, the light can also be split into halves via the visual field selector switch. Thus, the specimen can be observed simultaneously through the eyepiece lens 14 and on the monitor 6.

A specific type of color conversion processing is executed in the personal computer 1 in the embodiment, so as to ensure that the microscope image observed directly through the eyepiece lens 14 at the microscope 100 and the photomicrograph captured with the digital camera 2 and displayed at the monitor 6 have similar appearances.

The image observed at the microscope 100 and the display image at the monitor 6 may appear different mainly due to the difference between the color temperature of the light source 11 and the color temperature of the monitor 6, the difference between the levels of the luminance of the light source 11 and the monitor 6, the difference between the ambient light conditions under which the image is observed through the eyepiece lens 14 and the ambient light conditions under which the image on display at the monitor 6 is observed. While the color temperature of the monitor 6 in standard viewing conditions is fixed at D65, the color temperature of the microscope illumination is determined by the characteristics of the lamp constituting the light source 11 and is often lower than that of the monitor 6, at approximately 3000 K~5000 K. This means that the image displayed at the monitor 6 is bound to take on a color different from that of the microscope observation image directly viewed with the naked eye through the eyepiece lens 14 unless the difference between the color temperature at the illuminating light source 11 and the color temperature at the monitor 6 is factored in.

In addition, the luminance of the monitor 6 in the sRGB standard viewing conditions is fixed at 80 $Cd/m^2$ and the luminance at a typical LCD to be used in this type of application can only be set to approximately 200 $Cd/m^2$ at the most. In reality, the luminance of the monitor at its maximum brightness setting will decrease due to deterioration occurring over years and, for this reason, the monitor is more likely to be used with the luminance at or below 200 $Cd/m^2$. When the specimen is observed through the eyepiece lens 14 at the microscope 100, the luminance is often equal to or higher than 300 $Cd/m^2$ and under certain circumstances, the specimen may be observed at a luminance equal to or higher than 1000 $Cd/m^2$, almost 10 times the luminance at which the image displayed on the monitor is observed. For this reason, the brightness of the microscope observation image may be higher than the brightness level at which the monitor observation is conducted by a factor of 50% or more and, as a result, the observer may perceive the microscope observation image to have higher contrast.

The ambient light conditions are another factor that will affect the appearance of the specimen image. When the specimen is observed through the eyepiece lens 14 at the microscope, the user will have his eye placed near the eyepiece lens to look at the microscope observation image, and will be not much affected by the surrounding conditions (i.e., it will not matter whether the surrounding environment is bright or dim). The image displayed on the monitor 6 is normally observed in a brightly lit room and, for this reason, the monitor display image will appear to have less contrast compared to the specimen image directly observed through the eyepiece lens 14 due to the flare effect. Furthermore, if the color temperature of the monitor 6 and the color temperature of the ambient light are different, the ambient light color temperature also needs to be considered since the visual perception is also affected by the color temperature of the ambient light.

In the embodiment, the following image processing is executed in the personal computer 1 so as to ensure that the microscope observation image of the specimen 12 directly observed through the eyepiece lens 14 and the photomicrograph of the specimen 12 indirectly observed via the monitor 6 have similar appearances by factoring in the varying viewing conditions discussed above. It is to be noted that an image printed out via a printer (not shown) connected to the personal computer 1 is observed during a printout observation.

Figure 5:
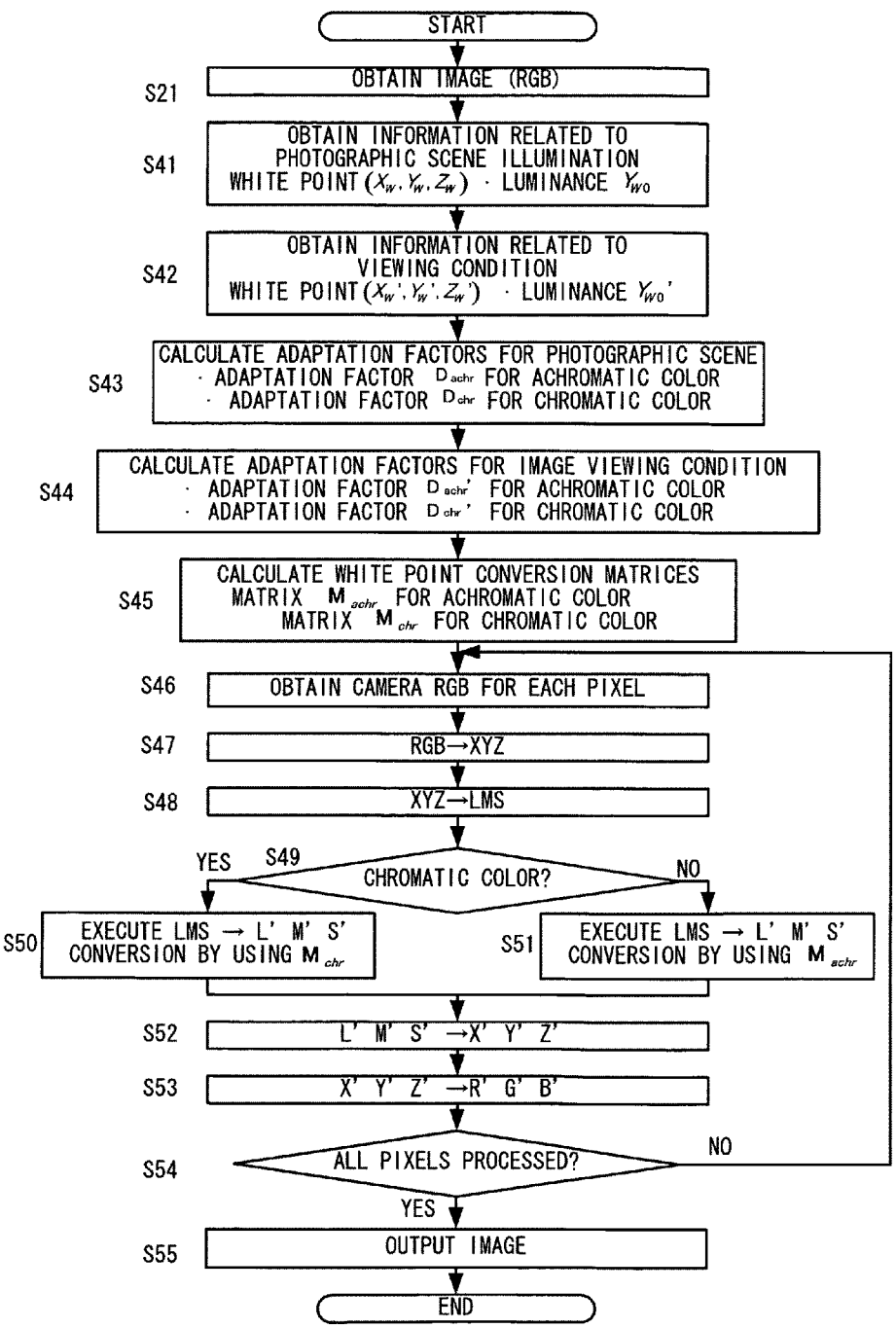
FIG. 5 A flowchart of the image processing program executed in the personal computer 1 in the second embodiment FIG. 6 A flowchart of the processing executed in a third embodiment to determine the color conversion matrix FIG. 7 A block diagram showing the structure of the digital camera 20 achieved in the third embodiment FIG. 8 A flowchart of the processing executed by the control unit 21 in the digital camera 20

FIG. 5 presents a flowchart of the image processing program executed by the personal computer 1 in the second embodiment.

First, a photographic image is obtained in step S21, as in the first embodiment (see FIG. 3). The photographic image is described in the color space RGB inherent to the spectral sensitivity of the camera.

In step S41, information related to the photographic scene illumination is obtained. Namely, information indicating the photographic scene illumination white point and the photographic scene brightness level, i.e., information indicating the white point ($X_w, Y_w, Z_w$) and the luminance $Y_{w0}$ of the microscope illumination provided by the light source 11 in the embodiment, is obtained. For instance, values indicating the results obtained by measuring the microscope illumination white point and the microscope illumination brightness levels via a spectroradiometer or the like, may be used. Alternatively, the photographing illumination white point ($X_w, Y_w, Z_w$) may be calculated by engaging an auto white balance function of the digital camera and the photographing illumination brightness $Y_{w0}$ may be estimated by analyzing the results provided by engaging the photometering function, which is utilized for purposes of automatic exposure adjustment. The influence of the ambient light on the microscope observation is small enough to be disregarded.

In step S42, information related to the image viewing condition is obtained. Assuming that an image on display at a monitor is observed in standard viewing conditions, the image viewing condition is the sRGB standard viewing conditions (white point=D65, luminance $Y_{device0}'$=80 Cd/m², ambient light level $Y_{sw0}'$=4.1 Cd/m²). If, on the other hand, the image is observed in a viewing condition other than the sRGB standard viewing conditions or an image printout is observed, the personal computer 1 may read the device white point ($X_{device}'$, $Y_{device}'$, $Z_{device}'$) and the device luminance $Y_{device0}'$ of the device used for the image observation, the ambient light white point ($X_{sw}'$, $Y_{sw}'$, $Z_{sw}'$) and the ambient light level $Y_{sw0}'$, input by the user (observer) via a keyboard or the like and determine the illumination white point ($X_w'$, $Y_w'$, $Z_w'$) and the brightness level $Y_{w0}'$ in the image viewing condition by integrating the device white point and the ambient light white point.

More specifically, the information may be obtained through the calculation expressed below based upon a ratio $R_{mix}'$ of the influences of the device light source and the illumination light source used for the image observation.

[Expression 15]

$$\begin{pmatrix} L'_{device} \\ M'_{device} \\ S'_{device} \end{pmatrix} = M_{CAT02} \begin{pmatrix} X'_{device} \\ Y'_{device} \\ Z'_{device} \end{pmatrix} \quad (15)$$

[Expression 16]

$$\begin{pmatrix} L'_{SW} \\ M'_{SW} \\ S'_{SW} \end{pmatrix} = M_{CAT02} \begin{pmatrix} X'_{SW} \\ Y'_{SW} \\ Z'_{SW} \end{pmatrix} \quad (16)$$

[Expression 17]

$$L'_W = \frac{R'_{mix} \cdot Y'^{1/3}_{device0} \cdot L'_{device} + (1 - R'_{mix}) \cdot Y'^{1/3}_{SW0} \cdot L'_{SW}}{R'_{mix} \cdot Y'^{1/3}_{device0} + (1 - R'_{mix}) \cdot Y'^{1/3}_{SW0}}$$

$$M'_W = \frac{R'_{mix} \cdot Y'^{1/3}_{device0} \cdot M'_{device} + (1 - R'_{mix}) \cdot Y'^{1/3}_{SW0} \cdot M'_{SW}}{R'_{mix} \cdot Y'^{1/3}_{device0} + (1 - R'_{mix}) \cdot Y'^{1/3}_{SW0}}$$

$$S'_W = \frac{R'_{mix} \cdot Y'^{1/3}_{device0} \cdot S'_{device} + (1 - R'_{mix}) \cdot Y'^{1/3}_{SW0} \cdot S'_{SW}}{R'_{mix} \cdot Y'^{1/3}_{device0} + (1 - R'_{mix}) \cdot Y'^{1/3}_{SW0}} \quad (17)$$

[Expression 18]

$$\begin{pmatrix} X'_W \\ Y'_W \\ Z'_W \end{pmatrix} = (M_{CAT02})^{-1} \begin{pmatrix} L'_W \\ M'_W \\ S'_W \end{pmatrix} \quad (18)$$

[Expression 19]

$$Y'_{W0} = (R'_{mix} \cdot Y'^{1/3}_{device0} + (1 - R'_{mix}) \cdot Y'^{1/3}_{SW0})^3 \quad (19)$$

It is to be noted that $M_{cat02}$, is identical to the conversion matrix used to convert the XYZ data to cone response LMS in the first embodiment.

In step S43, an adaptation factor $D_{achr}$ for achromatic color and an adaptation factor $D_{chr}$ for chromatic color are calculated based upon the photographic scene conditions having been ascertained in step S41. $D_{chr}$ may assume a value such as that calculated as indicated in the expression below, which is defined in the CIECAM02.

[Expression 20]

$$D_{chr} = F\left[1 - \left(\frac{1}{3,6}\right)e^{\left(\frac{-(L_A+42)}{92}\right)}\right] \quad (20)$$

The adapted luminance La may assume the value expressed as $L_a = Y_{W0}/5$ under normal circumstances. F is a parameter determined in correspondence to the ratio of the device luminance and the ambient light level. The adaptation factor $D_{achr}$ for achromatic color (white or gray), on the other hand, may be set to 1.0, by taking into consideration the tendency in human visual perception whereby white is still perceived as white (closer to the complete adaptation) even when the color of the illuminating light changes. Such characteristics in human visual perception render the appearance of contrast over an area where the specimen is present (a stained area taking on a chromatic color) and an area where the specimen is not present (an area with no stain taking on an achromatic appearance) in, for instance, an image observed through a biological microscope.

Next, in step S44, an adaptation factor $D_{achr}'$ for achromatic color and an adaptation factor $D_{chr}'$ for chromatic color in the viewing condition where the image is observed are calculated based upon the image viewing condition having been ascertained in step S42. The adaptation factor $D_{chr}'$ for chromatic color can be calculated through processing similar to that executed in step S43, by using the adapted luminance $L_A'$ at which the image observation is conducted and a parameter F' that is determined in correspondence to the ambient light level.

[Expression 21]

$$D'_{chr} = F'\left[1 - \left(\frac{1}{3,6}\right)e^{\left(\frac{-(L'_A+42)}{92}\right)}\right] \quad (21)$$

[Expression 22]

$$L'_A = \frac{Y'_{W0}}{5} \quad (22)$$

In addition, the adaptation factor $D_{achr}'$ for achromatic color is set to 1.0.

In step S45, white point conversion matrices (a matrix $M_{achr}$ for achromatic color and a matrix $M_{chr}$ for chromatic color) are calculated by using the data obtained or calculated in steps S41~S44. The white point conversion is executed in the LMS space, which is a color space better approximating the human cone response.

[Expression 23]

$$\begin{pmatrix} L_W \\ M_W \\ S_W \end{pmatrix} = M_{CAT02} \cdot \begin{pmatrix} X_W \\ Y_W \\ Z_W \end{pmatrix} \quad (23)$$

[Expression 24]

$$\begin{pmatrix} L'_W \\ M'_W \\ S'_W \end{pmatrix} = M_{CAT02} \cdot \begin{pmatrix} X'_W \\ Y'_W \\ Z'_W \end{pmatrix} \quad (24)$$

In this step, $M_{chr}$ and $M_{achr}$ are calculated as expressed below.

[Expression 25]

$$M_{chr} = \begin{pmatrix} \frac{L'_{W,chr}}{L_{W,chr}} & 0.0 & 0.0 \\ 0.0 & \frac{M'_{W,chr}}{M_{W,chr}} & 0.0 \\ 0.0 & 0.0 & \frac{S'_{W,chr}}{S_{W,chr}} \end{pmatrix} \quad (25)$$

[Expression 26]

$$M_{achr} = \begin{pmatrix} \frac{L'_{W,achr}}{L_{W,achr}} & 0.0 & 0.0 \\ 0.0 & \frac{M'_{W,achr}}{M_{W,achr}} & 0.0 \\ 0.0 & 0.0 & \frac{S'_{W,achr}}{S_{W,achr}} \end{pmatrix} \quad (26)$$

provided that

[Expression 27]

$$L_{W,chr} = \frac{L_W}{Y_W \cdot D_{chr} + L_W \cdot (1 - D_{chr})} \quad (27)$$

$$M_{W,chr} = \frac{M_W}{Y_W \cdot D_{chr} + M_W \cdot (1 - D_{chr})}$$

$$S_{W,chr} = \frac{S_W}{Y_W \cdot D_{chr} + S_W \cdot (1 - D_{chr})}$$

[Expression 28]

$$L'_{W,chr} = \frac{L'_W}{Y'_W \cdot D'_{chr} + L'_W \cdot (1 - D'_{chr})} \quad (28)$$

$$M'_{W,chr} = \frac{M'_W}{Y'_W \cdot D'_{chr} + M'_W \cdot (1 - D'_{chr})}$$

$$S'_{W,chr} = \frac{S'_W}{Y'_W \cdot D'_{chr} + S'_W \cdot (1 - D'_{chr})}$$

[Expression 29]

$$L_{W,achr} = \frac{L_W}{Y_W \cdot D_{achr} + L_W \cdot (1 - D_{achr})} \quad (29)$$

$$M_{W,achr} = \frac{M_W}{Y_W \cdot D_{achr} + M_W \cdot (1 - D_{achr})}$$

$$S_{W,achr} = \frac{S_W}{Y_W \cdot D_{achr} + S_W \cdot (1 - D_{achr})}$$

[Expression 30]

$$L'_{W,achr} = \frac{L'_W}{Y'_W \cdot D'_{achr} + L'_W \cdot (1 - D'_{achr})} \quad (30)$$

$$M'_{W,achr} = \frac{M'_W}{Y'_W \cdot D'_{achr} + M'_W \cdot (1 - D'_{achr})}$$

$$S'_{W,achr} = \frac{S'_W}{Y'_W \cdot D'_{achr} + S'_W \cdot (1 - D'_{achr})}$$

The operation then proceeds to step S46. In step S46, camera RGB data are obtained in correspondence to the individual pixels constituting the image obtained in step S21. Next, the operation proceeds to step S47. Since camera RGB data are expressed in the inherent color space RGB determined based upon the camera spectral sensitivity, the data are converted to data in the CIE 1931 XYZ color space, which is not device-dependent by using a predetermined camera RGB→XYZ matrix $M_{RGB \to XYZ}$ in step S47.

[Expression 31]

$$\begin{pmatrix} X \\ Y \\ Z \end{pmatrix} = M_{RGB \to XYZ} \cdot \begin{pmatrix} R \\ G \\ B \end{pmatrix} \quad (31)$$

The operation then proceeds to step S48 to convert the data to data in the LMS space by using $M_{cat02}$ explained earlier.

[Expression 32]

$$\begin{pmatrix} L \\ M \\ S \end{pmatrix} = M_{CAT02} \cdot \begin{pmatrix} X \\ Y \\ Z \end{pmatrix} \quad (32)$$

The operation then proceeds to step S49 to make a decision as to whether the target pixel holds chromatic color data or achromatic color data. The target pixel is judged to hold chromatic color data if $C^* \geq C^*_0$ but is judged to hold achromatic color data if $C^* < C^*_0$ by converting the CIE XYZ data to CIELAB data and using the saturation level $C^* = (a^{*2} + b^{*2})^{1/2}$ and a threshold value $C^*_0$.

If an affirmative decision is made in step S49, the operation proceeds to step S50 to execute white point conversion by using $M_{chr}$, having been created in step S45.

[Expression 33]

$$\begin{pmatrix} L' \\ M' \\ S' \end{pmatrix} = M_{chr} \cdot \begin{pmatrix} L \\ M \\ S \end{pmatrix} \quad (33)$$

If a negative decision is made in step S49, the operation proceeds to step S51 to execute white point conversion by using $M_{achr}$, having been created in step S45.

[Expression 34]

$$\begin{pmatrix} L' \\ M' \\ S' \end{pmatrix} = M_{achr} \cdot \begin{pmatrix} L \\ M \\ S \end{pmatrix} \quad (34)$$

In step S52, color conversion, which is the reverse of the conversion executed in step S48, is executed to convert the data in the LMS color space to data in the XYZ color space.

[Expression 35]

$$\begin{pmatrix} X' \\ Y' \\ Z' \end{pmatrix} = (M_{CAT02})^{-1} \cdot \begin{pmatrix} L' \\ M' \\ S' \end{pmatrix} \quad (35)$$

In step S53, the X'Y'Z' data are converted to data in the color space R'G'B', in which the output image is to be expressed. $M_{XYZ \to sRGB}$ is a matrix used when converting the XYZ data to data in the color space RGB, in which the output image is expressed and, accordingly, assuming that the output image is expressed in the color space sRGB, a matrix determined in conformance to the specifications may be used as $M_{XYZ \to sRGB}$.

[Expression 36]

$$\begin{pmatrix} R' \\ G' \\ G' \end{pmatrix} = M_{XYZ \to sRGB} \cdot \begin{pmatrix} X' \\ Y' \\ Z' \end{pmatrix} \quad (36)$$

If it is decided in step S54 that the processing for all the pixels has not yet been completed, the operation returns to step S46 to repeat the processing described above. Once the processing for all the pixels is completed, the operation proceeds to step S55 to output the image and then the processing ends.

Through the processing described above, the color appearance can be reproduced with ease simply by adjusting the adaptation factors in correspondence to the saturation level even when there is a significant difference of 50% or more between the illumination brightness of the microscope observation scene and the illumination brightness of the photographic image display observation. The advantages of the embodiment will prove particularly effective if the difference between the brightness level for the microscope observation and the brightness level for the monitor observation is great. In addition, the adaptation factor for achromatic color such as white is adjusted to assume a high value, whereas the adaptation factor for chromatic color is adjusted to assume a low value (so as to achieve color reproduction better reflecting the light source color). As a result, the color conversion is executed so as to reproduce color by reflecting the characteristics of human visual perception, whereby the contrast is perceived to be further intensified at a higher brightness level.

It is to be noted that the value $(X_w', Y_w', Z_w')$ in the CIE 1931 XYZ colorimetric system is calculated as the illumination white point in the image viewing condition in step S42, as in the first embodiment. As an alternative, the arithmetic operation expressed in (18) may be skipped and the value $(L_w', M_w', S_w')$ in the cone response space may be obtained as the illumination white point in the image viewing condition. In such a case, the arithmetic operation expressed in (24) can also be skipped in step S45 and $(L_w', M_w', S_w')$ obtained in step S42 can be directly used in expressions (28) and (30). As a result, the processing load can be reduced.

Variation of the Second Embodiment

It is to be noted that two matrices, each integrating the matrices used in steps S47~S53 as expressed below, may be calculated in advance in step S45.

[Expression 37]

$$M_{chr}' = M_{XYZ \to sRGB} \cdot (M_{CAT02})^{-1} \cdot M_{chr} \cdot M_{CAT02} \cdot M_{RGB \to XYZ} \quad (37)$$

[Expression 38]

$$M_{achr}' = M_{XYZ \to sRGB} \cdot (M_{CAT02})^{-1} \cdot M_{achr} \cdot M_{CAT02} \cdot M_{RGB \to XYZ} \quad (38)$$

In this case, the processing in steps S47, S48, S52 and S53 does not need to be executed and the operation can proceed directly from step S46 to step S49. If an affirmative decision is made in step S49, the processing proceeds to step S50 to convert the RGB data to R'G'B' data by using $M_{chr}'$ instead of $M_{chr}$, before proceeding to step S54. If a negative decision is made in step S49, the processing proceeds to step S51 to convert the RGB data to R'G'B' data by using $M_{achr}'$ instead of $M_{achr}$, before proceeding to step S54. Since the processing in steps S47, S48, S52 and S53 is skipped, the processing load is reduced.

Third Embodiment

In the third embodiment described below, a specific matrix is preinstalled in the digital camera in correspondence to a predetermined photographic scene illumination condition and a predetermined image observation illumination condition. Since the single preinstalled matrix can be used for the processing executed within the camera, the load of the internal processing executed in the camera can be reduced.

Figure 6:
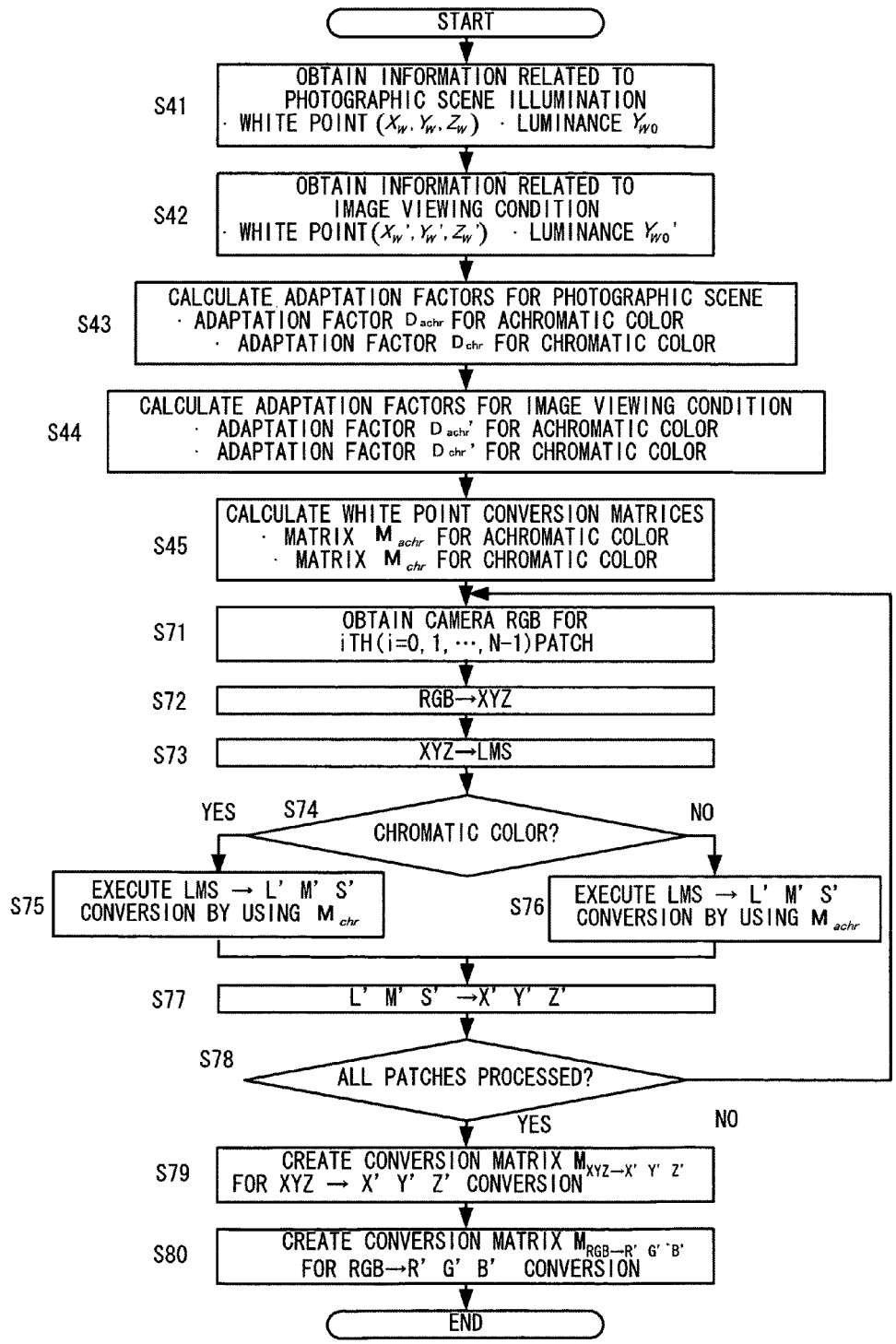

FIG. 6 presents a flowchart of the processing executed in the third embodiment to determine the color conversion matrix. The processing is executed by the personal computer 1, included in a configuration similar to that shown in FIG. 4 illustrating the second embodiment, to determine the color conversion matrix.

Since the processing executed in steps S41~S45 is similar to that executed in the second embodiment, a repeated explanation is not provided.

In steps S71~S77, processing is executed by using predetermined N color patches, which include the illumination color (white) and a prominent color appearing in the photographic scene. If a color frequently appearing in the photographic scene has distinct characteristics, as in the case of images captured by a camera used in conjunction with a biological microscope, a color (a chromatic color) frequently appearing in actual subjects may be extracted to be used as one of the N color patches. In such a case, the illumination color may be used as an achromatic color patch. As an alternative, the achromatic color patch and the chromatic color patch may be individually obtained from a commercially available color chart.

First, in step S71, the photographic image of an ith color patch among the N color patches explained above is read in at the microscope and the camera RGB data of the color patch are obtained. Since the processing executed in steps S72~S77 is similar to the processing executed in step S47~S52 in the second embodiment except that the processing is executed on the patch instead of the pixel in the current embodiment, a repeated explanation is not provided.

The processing in steps S71~S77 is repeatedly executed for all the patches. If an affirmative decision is made in step S78, i.e., if it is decided in step S78 that the processing has been executed for all the patches, the operation proceeds to step S79.

In step S79, the 3×3 matrix $M_{XYZ \to X'Y'Z'}$ is optimized so as to minimize the average color difference between $(X_{calc}'(i), Y_{calc}'(i), Z_{calc}'(i))$ (i=0, 1, ..., N−1) having been calculated as expressed below by using $(X(i), Y(i), Z(i))$, (i=0, 1, ..., N−1) in step S72 and $(X'(i), Y'(i), Z'(i))$ (i=0, 1, ..., N−1) having been calculated in step S77.

[Expression 39]

$$\begin{pmatrix} X'_{calc}(i) \\ Y'_{calc}(i) \\ Z'_{calc}(i) \end{pmatrix} = M_{XYZ \to X'Y'Z'} \cdot \begin{pmatrix} X(i) \\ Y(i) \\ Z(i) \end{pmatrix} \quad (39)$$

Namely, a matrix $M_{XYZ \to X'Y'Z'}$ at which the average color difference is the smallest is determined by sequentially adjusting the parameter of matrix $M_{XYZ \to X'Y'Z''}$.

Next, the operation proceeds to step S80 to calculate a conversion matrix $M_{RGB \to R'G'B'}$ to be used to convert the RGB data to R'G'B' data as expressed below.

[Expression 40]

$$M_{RGB \to R'G'B'} = M_{XYZ \to sRGB} \cdot M_{XYZ \to X'Y'Z'} \cdot M_{RGB \to XYZ} \quad (40)$$

It is to be noted that $M_{XYZ \to sRGB}$ is the matrix used when converting XYZ data to data in the color space RGB to be used to generate the output image. Assuming that the output image is generated in the color space sRGB, a specific standard matrix can be used.

Figure 7:
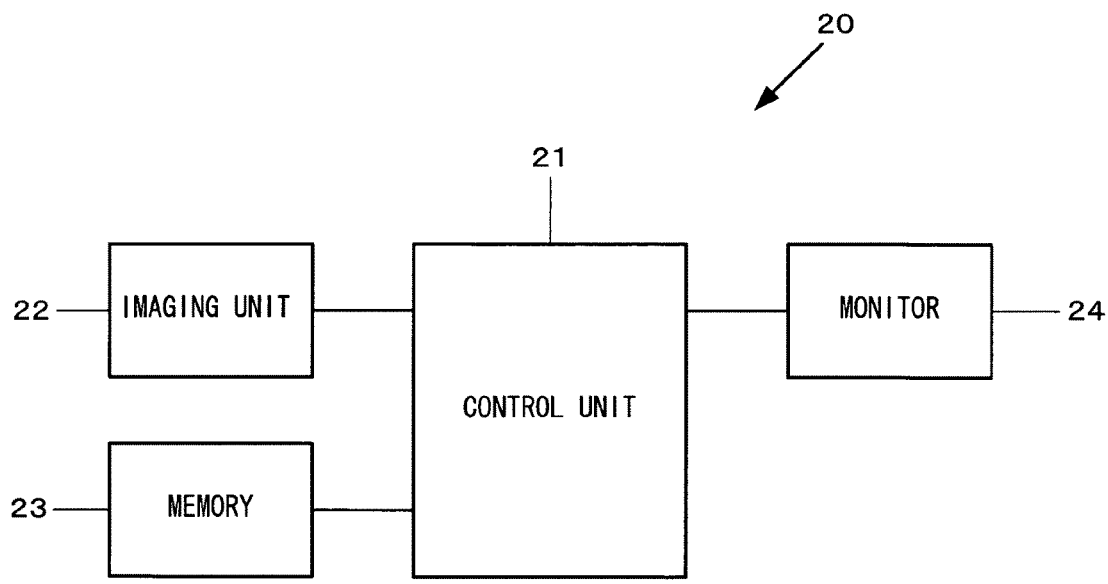

Next, the color conversion executed within a digital camera by using the conversion matrix $M_{RGB \to R'G'B'}$ having been determined as described above and installed into the digital camera is described. FIG. 7 shows the structure adopted in a digital camera 20 achieved in the embodiment. The digital camera 20 comprises a control unit 21, an imaging unit 22, a memory 23 and the like. A monitor 24 is connected to the digital camera 20 and thus, a microscope image output from the digital camera 20 can be observed on the monitor.

The control unit 21, constituted with a microprocessor, peripheral circuits and the like, executes various types of control for the digital camera 20 and the image processing to be detailed later by executing a program stored in the memory 23. In the memory 23, which also functions as a temporary buffer during the image processing, the conversion matrix $M_{RGB \to R'G'B'}$ mentioned earlier as well as the program is stored. Accordingly part of the memory 23 is constituted with non-volatile memory.

The imaging unit 22, constituted with an image sensor such as CCD, converts a light flux originating from the subject and received therein via a photographic optical system (not shown), such as a photographic lens, to electrical signals, digitizes the electrical signals resulting from the conversion and outputs digital image data. The imaging unit 22, equipped with RGB color filters, outputs image data expressed in the RGB colorimetric system.

Figure 8:
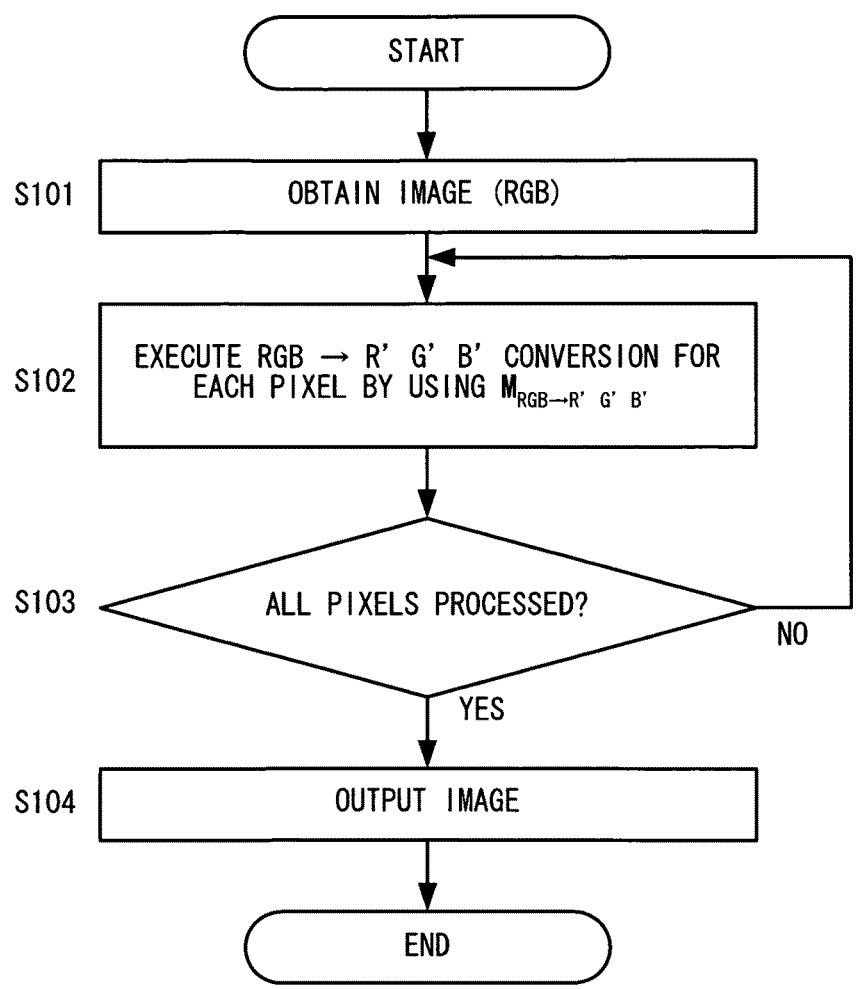

FIG. 8 presents a flowchart of the processing executed by the control unit 21 in the digital camera 20.

In step S101, a photographic image obtained by engaging the imaging unit 22 in photographing (imaging) operation is obtained. The photographic image is expressed in the color space RGB inherent to the camera spectral sensitivity.

Next, the operation proceeds to step S102 to convert the RGB data at each pixel to R'G'B' data by using the matrix $M_{RGB \to R'G'B'}$ having been calculated in advance in step S80 in FIG. 6 and preinstalled in the memory 23 of the digital camera 20.

[Expression 41]

$$\begin{pmatrix} R' \\ G' \\ B' \end{pmatrix} = M_{RGB \to R'G'B'} \cdot \begin{pmatrix} R \\ G \\ B \end{pmatrix} \quad (41)$$

After making an affirmative decision in step S103, i.e., after deciding in step S103 that the color conversion in step S102 has been executed for all the pixels, the operation proceeds to step S104 to output the image resulting from conversion to the monitor 24 before the processing ends.

As described above, color conversion is executed to reproduce color by factoring in the characteristics of human visual perception, whereby strong contrast is perceived at high brightness levels, as in the second embodiment. Furthermore, such color conversion is achieved through simple processing with a light processing load executed in the digital camera.

It is to be noted that the processing in FIG. 8 may instead be executed within the personal computer 1 in succession to the processing shown in FIG. 6.

In addition, while the color conversion is executed by using a matrix in the embodiment described above, color conversion may be executed by using an LUT instead of the matrix. In such a case, a conversion LUT to be used when executing the XYZ→X'Y'Z' conversion may be created in step S79 in FIG. 6 and a conversion LUT to be used when executing the RGB→R'G'B' conversion may be created based upon the details of the RGB→XYZ conversion and the X'Y'Z'→R'G'B' conversion in step S80 in FIG. 6. Then, in step S102 in FIG. 8, the color conversion may be executed by using the RGB→R'G'B' conversion LUT instead of $M_{RGB \to R'G'B'}$.

The flowchart of such processing may be prepared by modifying "create XYZ→X'Y'Z' conversion matrix $M_{XYZ \to X'Y'Z'}$" in step S79 in FIG. 6 to "create XYZ→X'Y'Z' conversion LUT", modifying "create conversion matrix $M_{RGB \to R'G'B'}$" in step S80 in FIG. 6 to "create RGB→R'G'B' conversion LUT" and modifying "execute RGB→R'G'B' conversion for each pixel by using $M_{RGB \to R'G'B'}$" in step S102 in FIG. 8 to "execute RGB→R'G'B' conversion for each pixel by using RGB→R'G'B' conversion LUT".

Fourth Embodiment

In the second embodiment described earlier, two different color conversions are determined by using different adaptation factors in correspondence to chromatic color and achromatic color. Next, specific color conversion is executed for each of the pixels constituting the conversion target image by determining whether the pixel is a chromatic pixel or an achromatic pixel so as to simulate the characteristics of human visual perception, whereby greater contrast is perceived at higher brightness levels.

Figure 9:
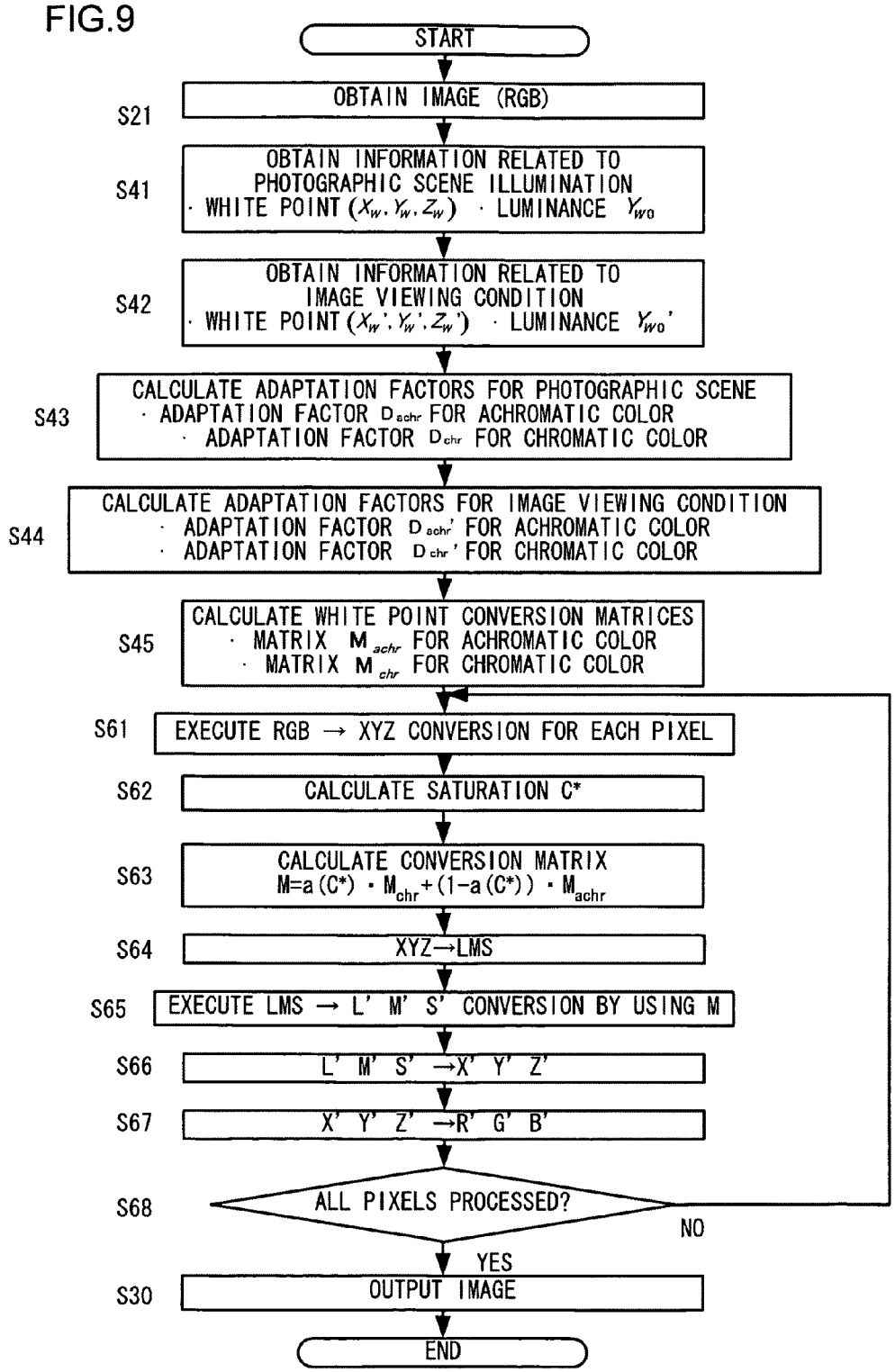
FIG. 9 A flowchart of the processing executed in the personal computer 1 in a fourth embodiment FIG. 10 A graph of function α (C*)

While the object of the fourth embodiment, too, is to achieve accurate color conversion with ease particularly when brightness of the subject is high, the color conversion in the fourth embodiment is executed by combining two types of color conversion matrices in correspondence to the state of the conversion target pixel. FIG. 9 presents a flowchart of the processing executed by the personal computer 1 in the fourth embodiment. The processing in FIG. 9 is executed by the personal computer 1 in a system configured as shown in FIG. 4 illustrating the second embodiment.

In step S21, a photographic image is obtained. The photographic image is expressed in the color space RGB inherent to the camera spectral sensitivity.

The operation then proceeds to step S41. Since the processing executed in steps S41→S45 is identical to that shown in FIG. 5, in reference to which the second embodiment has been described, a repeated explanation is not provided.

The operation then proceeds to step S61 and subsequently, the processing in steps S61~S67 is executed for each of the pixels constituting the image having been obtained in step S21. Since the processing executed in step S61 is similar to that executed in step S47 in FIG. 5, a repeated explanation is not provided.

The operation then proceeds to step S62 to calculate the saturation C* of the conversion target pixel. The saturation C* is calculated as; $C^* = (a^{*2} + b^{*2})^{1/2}$ by converting the XYZ data to CIELAB data.

The operation proceeds to step S63 to calculate a conversion matrix M to be used in conjunction with the conversion target pixel as expressed below. As indicated below, the conversion matrix is weighted by using α(C*).

[Expression 42]

$$M = \alpha(C^*) \cdot M_{chr} + (1 - \alpha(C^*)) \cdot M_{acchr} \quad (42)$$

Figure 10:
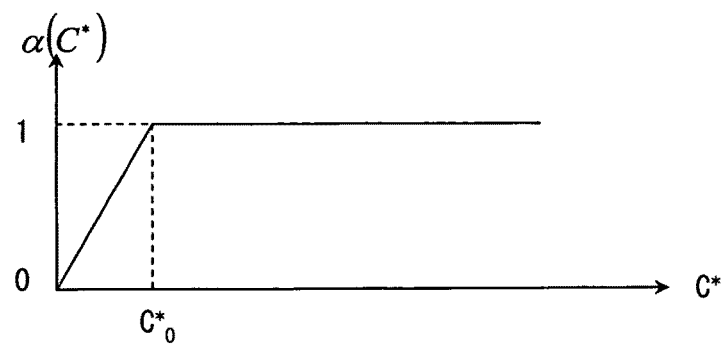

FIG. 10 is a graph presenting an example of the function α(C*). As FIG. 10 indicates, α(C*) is a function that achieves α(0)=0 (achromatic color) and achieves α(C*)=1 when C* assumes a significant value (chromatic color). Over the range of α(0) through α(C*$_0$), the function increases monotonously from 0 to 1. C*$_0$ indicates a saturation range preset as the achromatic color range.

The operation then proceeds to step S64. Since the processing executed in step S64 is similar to that executed in step S48 in FIG. 5, a repeated explanation is not provided. Next, the operation proceeds to step S65 to execute white point conversion by using the matrix M having been calculated in step S63.

[Expression 43]

$$\begin{pmatrix} L' \\ M' \\ S' \end{pmatrix} = M \cdot \begin{pmatrix} L \\ M \\ S \end{pmatrix} \quad (43)$$

The operation then proceeds to step S66. Since the processing executed in step S66 is similar to that executed in step S52 in FIG. 5, a repeated explanation is not provided.

The operation next proceeds to step S67 to convert the X'Y'Z' data to data in the color space R'G'B' used to generate the output image. It is to be noted that $M_{XYZ \rightarrow sRGB}$ is the matrix used when converting the XYZ data to data in the color space RGB to be used to generate the output image. Assuming that the output image is generated in the color space sRGB, a specific standard matrix can be used.

[Expression 44]

$$\begin{pmatrix} R' \\ G' \\ B' \end{pmatrix} = M_{XYZ \rightarrow sRGB} \cdot \begin{pmatrix} X' \\ Y' \\ Z' \end{pmatrix} \quad (44)$$

Variation of the Fourth Embodiment

It is to be noted that following step S63, a single matrix may be calculated by integrating the matrices used in steps S64→S67 as expressed below;

[Expression 45]

$$M' = M_{XYZ \rightarrow sRGB} \cdot (M_{CAT02})^{-1} \cdot M \cdot M_{CAT02} \quad (45)$$

and may be executed in a single step instead of the processing in steps S64→S67 so as to reduce the processing load as expressed below.

[Expression 46]

$$\begin{pmatrix} R' \\ G' \\ B' \end{pmatrix} = M' \cdot \begin{pmatrix} X \\ Y \\ Z \end{pmatrix} \quad (46)$$

If it is decided in step S68 that the processing for all the pixels has not been completed, the operation returns to step S61 to repeatedly execute the processing in steps S61~S67. Once all the pixels are processed, the operation proceeds to step S30 to output the image before ending the processing.

By adjusting the adaptation factor to a higher value in correspondence to achromatic color such as white and adjusting the adaptation factor to a lower value (so as to reproduce color by better reflecting the color of the light source) in correspondence to chromatic color as in the embodiment, the characteristics of human visual perception, whereby contrast is emphasized at higher brightness levels, can be simulated through simple color conversion such as a matrix operation. In addition, unlike in the second embodiment, in which color conversion is executed by using the two matrices, the color conversion in the embodiment is executed by combining two different types of matrices in correspondence to the saturation level at the conversion target pixel, assuring even more accurate color reproduction.

As in the third embodiment, the optimal matrix may be predetermined and preinstalled in the digital camera in the fourth embodiment provided that the photographic scene illumination conditions and the image observation illumination condition are already known. In such a case, processing similar to steps S61~S66 in FIG. 9 maybe executed in place of the processing in steps S72~S77 in FIG. 6 and the processing in step S61 may be executed for "each patch" instead of for "each pixel". Since the processing within the camera can be executed by using a single matrix, the load of processing executed in the camera can be reduced, as in the third embodiment.

Fifth Embodiment

In the second embodiment described earlier, two different color conversions are determined by using different adaptation factors in correspondence to chromatic color and achromatic color. Specific color conversion is then executed for each of the pixels constituting the conversion target image by determining whether the pixel is a chromatic pixel or an achromatic pixel so as to simulate the characteristics of human visual perception, whereby greater contrast is perceived at higher brightness levels. In addition, the color conversion is executed in the fourth embodiment by combining two types of color conversion matrices in correspondence to the state of the conversion target pixel.

While the fifth embodiment shares a common object with the second, third and fourth embodiments, i.e., to achieve color conversion through simple processing by factoring in the influence of the brightness on the appearance, the fifth embodiment is unique in that an optimal adaptation factor is calculated in correspondence to the state of the conversion target pixel and that color conversion is executed by using a color conversion matrix adjusted in correspondence to the adaptation factor having been calculated.

Figure 11:
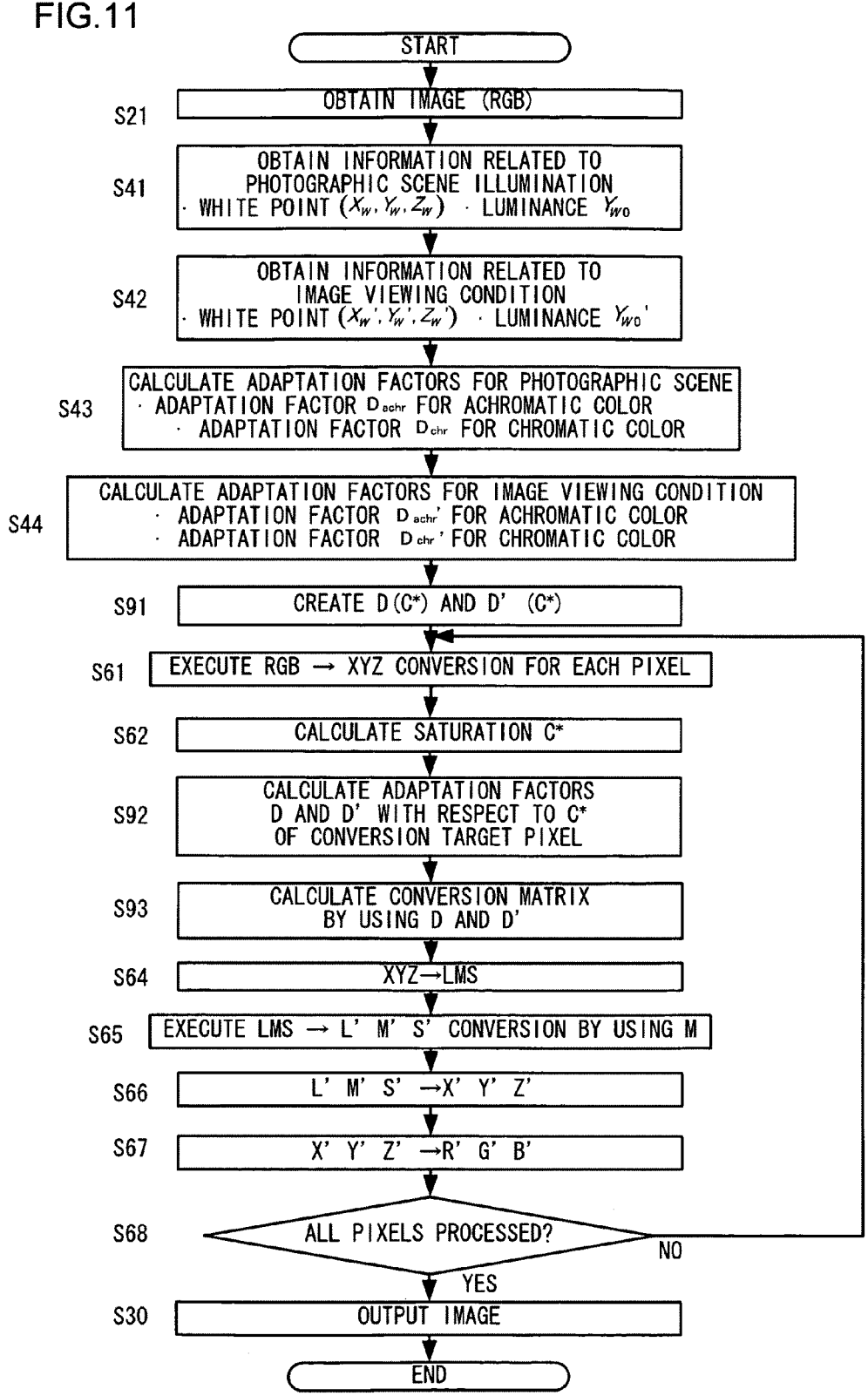
FIG. 11 A flowchart of the image processing program executed in the personal computer 1 in a fifth embodiment FIG. 12 A graph of function D (C*)

FIG. 11 presents a flowchart of the image processing program executed by the personal computer 1 in the fifth embodiment. The processing in FIG. 11 is executed by the personal computer 1 in a system configured as shown in FIG. 4 illustrating the second embodiment.

Since the processing executed in steps S21 and steps S41~S45 is identical to that shown in FIG. 5, in reference to which the second embodiment has been described, a repeated explanation is not provided.

Figure 12:
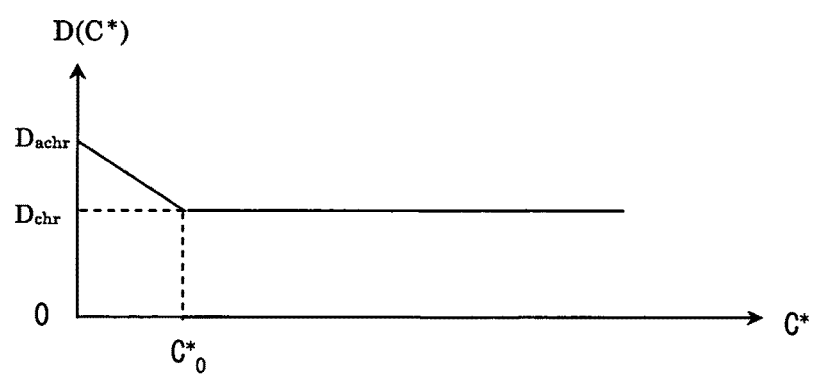
Figure 13:
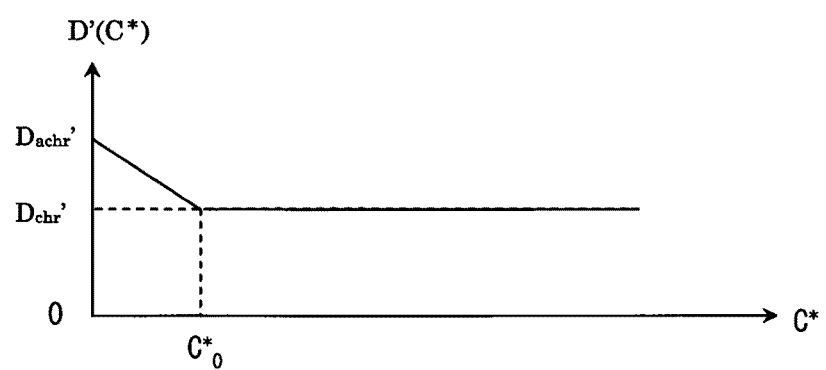
FIG. 13 A graph of function D' (C*)

The operation then proceeds to step S91 to calculate an adaptation factor D(C*) for the photographic scene illumination conditions and an adaptation factor D'(C*) for the image viewing condition as functions of the saturation C* at the conversion target pixel. FIG. 12 presents a graph representing an example of the function D(C*), whereas FIG. 13 presents a graph representing an example of the function D' (C*). As indicated in FIGS. 12 and 13, D(C*) and D' (C*) are functions taking on values expressed respectively as D(0)=$D_{achr}$ and D' (0)=$D_{achr}'$ (achromatic color) and also taking on values respectively expressed as D (C*)=$D_{chr}$ and D' (C*)=$D_{chr}'$ when C* is significant (chromatic color). The functions expressed below, for instance, may be used as D (C*) and D' (C*).

[Expression 47]

$$D(C^*)=D_{achr}+C^* \cdot (D_{chr}-D_{achr})/C^*_0 (0 \le C^* \le C^*_0)$$

$$D(C^*)=D_{chr}(C^*_0 \le C^*) \quad (47)$$

[Expression 48]

$$D'(C^*)=D_{achr}'+C^* \cdot (D_{chr}'-D_{achr}')/C^*_0 (0 \le C^* \le C^*_0)$$

$$D'(C^*)=D_{chr}'(C^*_0 \le C^*) \quad (48)$$

$C^*_0$ indicates a saturation range preset as the achromatic color range.

Since the processing executed in steps S61 and S62 is identical to that shown in FIG. 9, in reference to which the fourth embodiment has been described, a repeated explanation is not provided.

The operation then proceeds to step S92 to calculate an adaptation factor D and an adaptation factor D' for the conversion target pixel respectively in correspondence to the photographic scene illumination conditions and the image viewing condition by using the saturation C* at the conversion target pixel having been calculated in step S62 and the adaptation factors D (C*) and D' (C*) having been calculated in step S91.

In step S93, a color conversion matrix M corresponding to the saturation at the conversion target pixel is calculated.

[Expression 49]

$$M = \begin{pmatrix} \frac{L'_{w,C}}{L_{w,C}} & 0.0 & 0.0 \\ 0.0 & \frac{M'_{w,C}}{M_{w,C}} & 0.0 \\ 0.0 & 0.0 & \frac{S'_{w,C}}{S_{w,C}} \end{pmatrix} \quad (49)$$

provided that

[Expression 50]

$$L_{w,C} = \frac{L_w}{Y_w \cdot D + L_w \cdot (1-D)}$$

$$M_{w,C} = \frac{M_w}{Y_w \cdot D + M_w \cdot (1-D)}$$

$$S_{w,C} = \frac{S_w}{Y_w \cdot D + S_w \cdot (1-D)} \quad (50)$$

[Expression 51]

$$L'_{w,C} = \frac{L'_w}{Y'_w \cdot D' + L'_w \cdot (1-D')} \quad (51)$$

$$M'_{w,C} = \frac{M'_w}{Y'_w \cdot D' + M'_w \cdot (1-D')}$$

$$S'_{w,C} = \frac{S'_w}{Y'_w \cdot D' + S'_w \cdot (1-D')}$$

provided that

[Expression 52]

$$\begin{pmatrix} L_W \\ M_W \\ S_W \end{pmatrix} = M_{CAT02} \cdot \begin{pmatrix} X_W \\ Y_W \\ Z_W \end{pmatrix} \quad (52)$$

[Expression 53]

$$\begin{pmatrix} L'_W \\ M'_W \\ S'_W \end{pmatrix} = M_{CAT02} \cdot \begin{pmatrix} X'_W \\ Y'_W \\ Z'_W \end{pmatrix} \quad (53)$$

Since the processing executed in steps S64~S68 and step S30 is identical to that shown in FIG. 9, in reference to which the fourth embodiment has been described, a repeated explanation is not provided.

It is to be noted that functions other than those expressed in (47) and (48) or those shown in FIGS. 12 and 13 may be used as D (C*) and D' (C*).

As in the third embodiment, the optimal matrix may be predetermined and preinstalled in the digital camera in the fifth embodiment provided that the photographic scene illumination conditions and the image observation illumination condition are already known. In such a case, processing similar to that executed in step S91 in FIG. 9 may be executed in place of the processing in step S45 in FIG. 6, processing similar to that executed in steps S61~S66 in FIG. 9 may be executed in place of the processing in steps S72~S77 in FIG. 6 and the processing in step S61 may be executed for "each patch" instead of for "each pixel". Since these modifications allow the camera to execute internal processing by using a single matrix, the load of processing executed in the camera can be reduced, as in the third embodiment.

It is to be noted that while $M_{CAT02}$ is used as the conversion matrix when converting the XYZ data to LMS data in the second through fifth embodiments, color conversion may be executed by using another color conversion matrix with which the data can be converted to data in a color space optimal for a chromatic adaptation transform.

Figure 19:
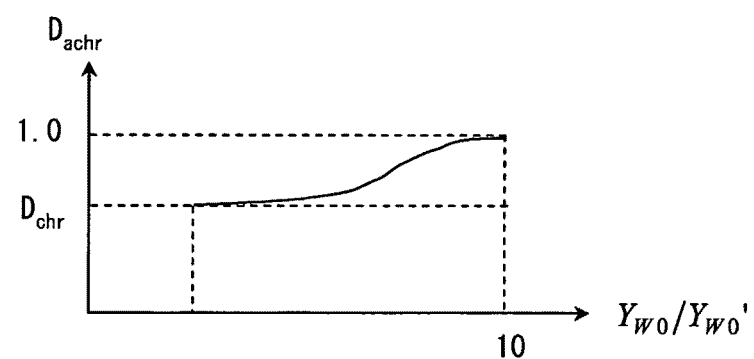

It is also to be noted that while the adaptation factor is invariably set to 1.0 for an achromatic color in the second through fifth embodiments described above, the difference between the contrast levels becomes more noticeable as the difference between the brightness level for the microscope observation and the brightness level for the monitor observation becomes greater. Accordingly, instead of setting the achromatic color adaptation factor $D_{achr}$ to 1.0 at all times, it may be set to 1.0 only when the brightness ratio is particularly large (e.g., when the brightness levels differ from each other by a factor of one digit, i.e., when one brightness level is higher by a factor of 10 times relative to the other brightness level) and $D_{achr}$ may be adjusted so as to assume a value between the chromatic adaptation factor $D_{achr}$ and 1.0 when the brightness ratio is moderate (one brightness level is higher by a factor of 1~10 times). Such an adjustment may be achieved simply through linear interpolation, by using a different function such as that shown in FIG. 19, or by using another function. FIG. 19 presents an example of a nonlinear function of the brightness ratio/adaptation factor $D_{achr}$. The optimal values of $D_{achr}$, determined through testing conducted in advance by adjusting the brightness ratio, may be stored in a table, $D_{achr}$ for the closest condition may be read out from the table in correspondence to the actual brightness ratio and the final $D_{achr}$ may be determined through interpolation.

It is to be noted that, as in the second embodiment, the value $(X_w', Y_w', Z_w')$ in the CIE 1931 XYZ colorimetric system is calculated as the illumination white point in the image viewing condition in step S42 in the third through fifth embodiments. However, the operation executed as expressed in (18) may be skipped and instead, the value $(L_w', M_w', S_w')$ in the cone response space may be obtained as the illumination white point in the image viewing condition. In the fifth embodiment, the operation executed as expressed in (53) in step S93 in FIG. 11, too, can be skipped and $(L_w', M_w', S_w')$ obtained in step S42 can be directly used in the operation expressed in (51). The processing load can thus be further reduced.

While the second through fifth embodiments have been described by assuming that the adaptation factors and the matrices are altered in correspondence to the saturation $C^*$, the adaptation factors and the matrices may be adjusted based upon a parameter representing the saturation level other than the saturation $C^*$, such as S expressed in the HSV colorimetric system, as defined in (54) below.

[Expression 54]

$$S = \frac{MAX(R, G, B) - MIN(R, G, B)}{MAX(R, G, B)} \quad (54)$$

While data conversion XYZ→CIELAB must be executed when $C^*$ is used, the use of S, which can be calculated based upon RGB data, simplifies the calculation procedure. In addition, while $C^*$ in the CIELAB space takes on a numerical value in a varying numerical range depending upon the brightness, $0.0 \leq S \leq 1.0$ may be true for S, and thus, handling of the range of the achromatic color ($C^*_0$ in the embodiments) constituting part of $\alpha$ ($C^*$) in the fourth embodiment and D ($C^*$) and D' ($C^*$) in the fifth embodiment is facilitated.

Sixth Embodiment

In the first embodiment described earlier, a photographic image obtained through a photographing operation is converted to an image to be observed on a monitor or as a printout through color conversion executed by factoring in the difference between the photographic scene illumination conditions and the image viewing condition. However, the principle, having been described in reference to the embodiment, can also be adopted whenever the appearance of color under a different viewing condition needs to be estimated by using the color appearance model (including a chromatic adaptation model).

In addition to the application having been described in reference to the embodiment, the principle may be adopted when color conversion is to be executed by factoring in the color appearance so as to approximate the appearance of an image observed in a first viewing condition (e.g., observed at a monitor) to the appearance of an image observed in a second viewing condition (e.g., an image observed as a hard copy printout). It may also be adopted when an image resulting from a chromatic adaptation transform executed by assuming at the time of the photographing operation that the image is to be observed in standard viewing conditions further undergoes a chromatic adaptation transform so as to adjust the image to the actual viewing condition.

In the sixth embodiment described below, an image created for observation in a first viewing condition (e.g., as a monitor display image) is observed in a second viewing condition (as a hard copy printout). As in the first embodiment shown in FIG. 1, the processing is executed by the personal computer 1.

The personal computer 1 in the embodiment converts image data having already been created based upon information related to the first viewing condition to image data reproducing the color appearance in correspondence to information related to the second viewing condition different from the first viewing condition by taking into consideration the chromatic adaptation characteristics of human visual perception.

The information related to the first viewing condition mentioned above indicates conditions related to the device used for input image data observation and the ambient observation environment illumination where the input image data having been created. The information related to the second viewing condition indicates conditions related to the device and the ambient observation environment illumination where the output image data are actually observed. The information related to the first viewing condition and the information related to the second viewing condition each relate to the environment of the peripheral visual field, which affects the appearance of the image, for instance the brightness level and the white point of an illuminating light source, the ambient light level and the like.

Figure 14:
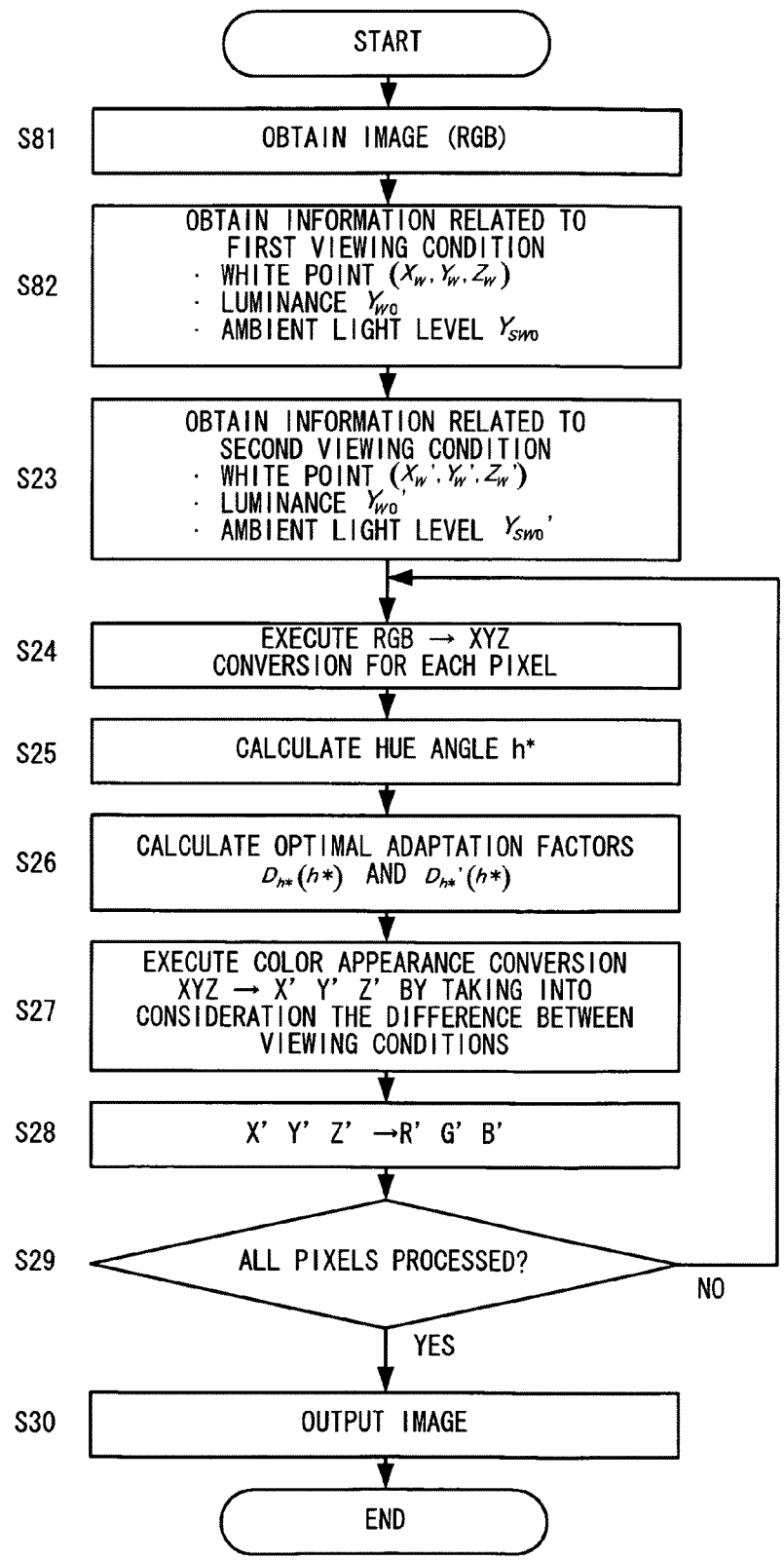
FIG. 14 A flowchart of the processing executed in the personal computer 1 in a sixth embodiment FIG. 15 A flowchart of the processing executed in the personal computer 1 in a seventh embodiment FIG. 16 A flowchart of the processing executed in the personal computer 1 in an eighth embodiment FIG. 17 A flowchart of the processing executed in the personal computer 1 in a variation of the eighth embodiment FIG. 18 A block diagram showing the structure of the digital camera 30 achieved in a ninth embodiment FIG. 19 An example of a nonlinear function of the adaptation factor $D_{achr}$ relative to the brightness ratio FIG. 20 The relationship between the optimal adaptation factor $D_{h*}$ in the hue angle h* at various color temperatures FIG. 21 The relationship between the optimal adaptation factor $D_{h*}$ in the hue angle h* at various saturation levels FIG. 22 The relationship between the optimal adaptation factor $D_{h*}$ in the hue angle h* in various viewing conditions FIG. 23 A flowchart of the processing executed in the personal computer 1 in a thirteenth embodiment FIG. 24 A flowchart of the processing executed in the personal computer 1 in a fourteenth embodiment FIG. 25 A flowchart of the processing executed in the personal computer 1 in variation 1 of the fourteenth embodiment FIG. 26 A flowchart of the processing executed in the personal computer 1 in variation 2 of the fourteenth embodiment FIG. 27 A flowchart of the processing executed in the personal computer 1 in variation 3 of the fourteenth embodiment FIG. 28 A flowchart of the processing executed in the personal computer 1 in variation 4 of the fourteenth embodiment FIG. 29 A flowchart of the processing executed in the personal computer 1 in another variation of the fourteenth embodiment FIG. 30 A plurality of La_limit values set in correspondence to ambient light level levels FIG. 31 A flowchart of the processing executed in the personal computer 1 in an eighteenth embodiment FIG. 32 The relationship between the optimal adaptation factor and the hue angle at various adapted luminance levels as observed in the nineteenth embodiment FIG. 33 A plurality of adapted luminance threshold values set in correspondence to ambient light levels in a variation of the nineteenth embodiment FIG. 34 A flowchart of the processing executed in the personal computer 1 in variation 5 of the eighteenth through twentieth embodiments

FIG. 14 presents a flowchart of the processing executed by the personal computer 1 in the sixth embodiment.

In step S81, first image data having undergone color conversion executed by assuming that the image is to be observed in the first viewing condition are obtained. In step S82, conditions related to the first viewing condition, in which the first image data have been created are read from the image data having been obtained and the conditions thus read out are set as the first viewing condition. If the image data do not include any data related to the first viewing condition, the conditions of the sRGB standard viewing conditions (white point=D65, luminance $Y_{device0}$=80 Cd/m², ambient light white point=D50, ambient light level $Y_{sw0}$=4.1 Cd/m²) are read and the illumination white point $(X_w, Y_w, Z_w)$ and the luminance $Y_{w0}$ in the first viewing condition are calculated by incorporating the device white point and the ambient light white point.

If the image has been created to be observed in a viewing condition other than the sRGB standard viewing conditions, the device white point $(X_{device}, Y_{device}, Z_{device})$ and the luminance $Y_{device0}$ of the device having been used to create the image, the ambient light white point $(X_{sw}, Y_{sw}, Z_{sw})$ and the ambient light level $Y_{sw0}$, entered by the user (observer) via the keyboard, are read and the illumination white point $(X_w, Y_w, Z_w)$ and the luminance $Y_{w0}$ in the first image viewing condition are calculated by incorporating the device white point and the ambient light white point. Since the illumination white point and the brightness in the first viewing condition can be calculated through processing similar to that executed in step S23 in FIG. 3, a repeated explanation is not provided.

In step S23, conditions related to illumination under which the output image is to be observed are read and the conditions thus read are set as the second viewing condition. Since the processing executed in step S23 is similar to that executed in step S23 in FIG. 3, in reference to which the first embodiment has been described, a repeated explanation is not provided. Since the processing executed in steps S24~S30 is similar to that executed in steps S24~S30 in FIG. 3, in reference to which the first embodiment has been described, a repeated explanation is not provided.

It is to be noted that $D_{h*}$ (h*) and $D_{h*}'$ (h*) are calculated in step S26 based upon the hue h* of the conversion target pixel, respectively in correspondence to the first viewing condition and the second viewing condition.

Through the processing described above, executed based upon image data generated by assuming that the input image data are to be observed in a specific viewing condition, the color appearance in the photographic scene can be accurately reproduced for observation in a viewing condition different from the viewing condition. Since the image data are converted by using an adaptation factor optimized in correspondence to the color, i.e., the hue of the conversion target pixel, as in the first embodiment, the color appearance can be reproduced accurately.

Seventh Embodiment

In the first embodiment described earlier, based upon a photographic image used as input image data, the appearance of the photographic scene is reproduced in observing of the output image. In addition, in the sixth embodiment, an image having been created by assuming that it is to be observed in a first viewing condition is observed in a second viewing condition different from the first viewing condition.

In reference to the seventh embodiment, an application in which an image observed in a first viewing condition is also observed in a second viewing condition differently from the first viewing condition, is described. The embodiment may be adopted to match the appearance of, for instance, a printout image with the appearance of an image observed at a monitor or the appearance of an image projected via a projector with the appearance of an image observed at a monitor.

Figure 15:
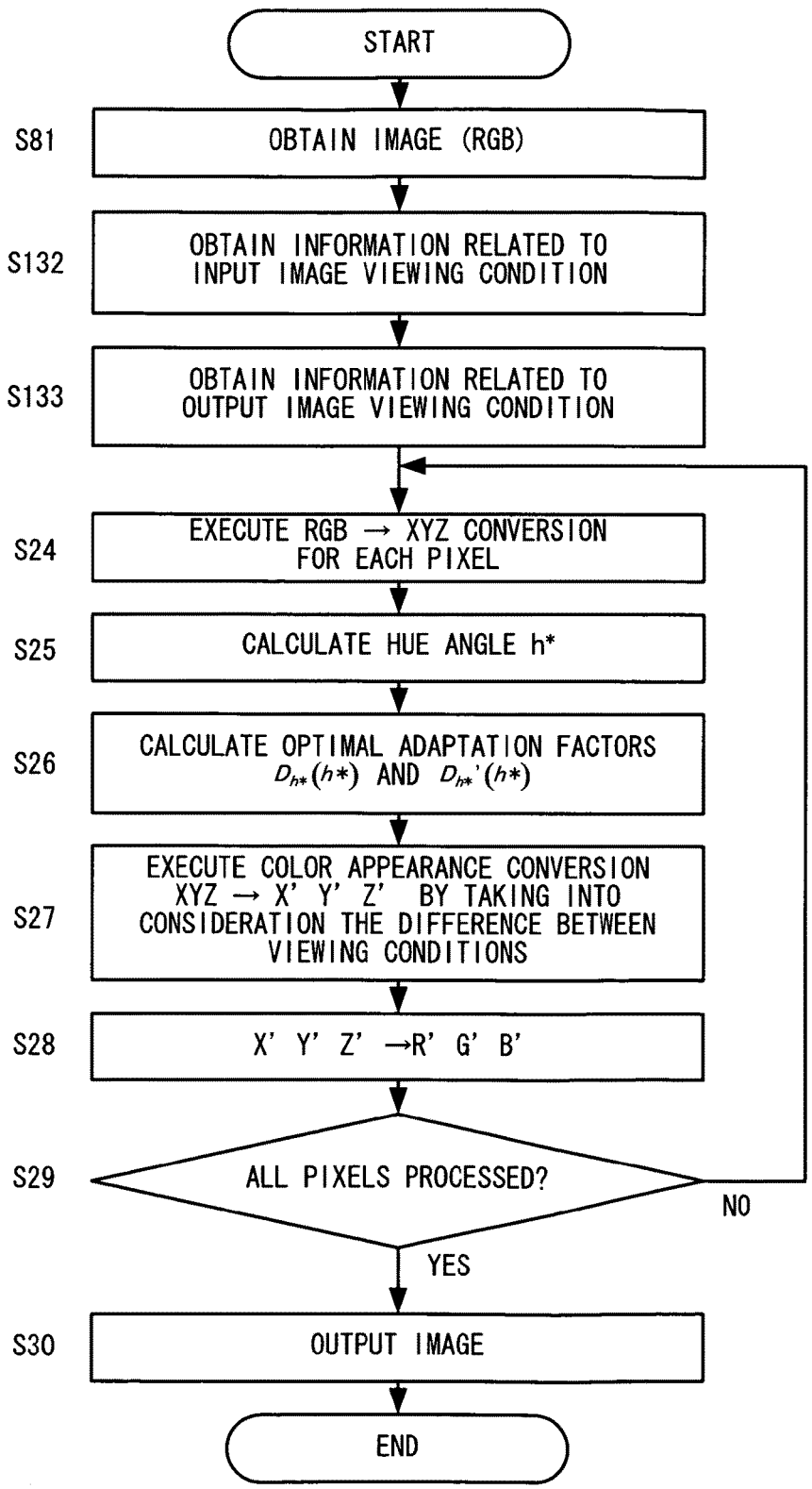

FIG. 15 presents a flowchart of the processing executed by a personal computer in the seventh embodiment. As in the first embodiment illustrated in FIG. 1, the personal computer 1 is assigned to execute the processing in FIG. 15.

Since the processing executed in step S21 and steps S24~S30 is similar to that executed in the first embodiment (see FIG. 3), a repeated explanation is not provided.

In step S132, information related to the viewing condition in which a first image is observed, entered by the user with a keyboard or the like, is obtained. If "CRT observation (sRGB standard viewing conditions)" is selected, the XYZ value at D65 for the device white point $(X_{device}, Y_{device}, Z_{device})$ luminance $Y_{device0}$=80 Cd/m², the XYZ values at D50 for the ambient light white point $(X_{sw}, Y_{sw}, Z_{sw})$ and ambient light level $Y_{sw0}$=4.1 Cd/m² are set. Otherwise, values $(X_{device}, Y_{device}, Z_{device}), Y_{device0}, (X_{sw}, Y_{sw}, Z_{sw})$ and $Y_{sw}$ entered by the user are obtained.

Based upon the four values obtained as described above, the cone response $(L_W, M_W, S_W)$ of the illumination white point and the luminance $Y_{w0}$ in case that visual perception is adapted in the input image viewing condition, are determined. More specifically, the cone response and the brightness are calculated as expressed below by using the ratio $R_{mix}$ of the influences of the device light source used for the image observation and the ambient illuminating light source.

[Expression 55]

$$\begin{pmatrix} L_{device} \\ M_{device} \\ S_{device} \end{pmatrix} = M_{CAT02} \begin{pmatrix} X_{device} \\ Y_{device} \\ Z_{device} \end{pmatrix} \quad (55)$$

[Expression 56]

$$\begin{pmatrix} L_{SW} \\ M_{SW} \\ S_{SW} \end{pmatrix} = M_{CAT02} \begin{pmatrix} X_{SW} \\ Y_{SW} \\ Z_{SW} \end{pmatrix} \quad (56)$$

[Expression 57]

$$L_W = \frac{R_{mix} \cdot Y_{device0}^{1/3} \cdot L_{device} + (1 - R_{mix}) \cdot Y_{SW0}^{1/3} \cdot L_{SW}}{R_{mix} \cdot Y_{device0}^{1/3} + (1 - R'_{mix}) \cdot Y_{SW0}^{1/3}} \quad (57)$$

$$M_W = \frac{R_{mix} \cdot Y_{device0}^{1/3} \cdot M_{device} + (1 - R_{mix}) \cdot Y_{SW0}^{1/3} \cdot M_{SW}}{R_{mix} \cdot Y_{device0}^{1/3} + (1 - R_{mix}) \cdot Y_{SW0}^{1/3}}$$

$$S_W = \frac{R_{mix} \cdot Y_{device0}^{1/3} \cdot S_{device} + (1 - R_{mix}) \cdot Y_{SW0}^{1/3} \cdot S_{SW}}{R_{mix} \cdot Y_{device0}^{1/3} + (1 - R_{mix}) \cdot Y_{SW0}^{1/3}}$$

[Expression 58]

$$Y_{W0} = (R_{mix} \cdot Y_{device0}^{1/3} + (1 - R_{mix}) \cdot Y_{SW0}^{1/3})^3 \quad (58)$$

In step S133, information related to the viewing condition where the output image is to be observed, entered by the user with a keyboard or the like, is obtained. Namely, the white point $(X_{device}', Y_{device}', Z_{device}')$ and the luminance $Y_{device0}'$ of the device used in the output image observation, the ambient light white point $(X_{sw}', Y_{sw}', Z_{sw}')$ and the ambient light level $Y_{sw0}'$, entered by the user (observer) via a keyboard or the like, are read and the cone response $(L_w', M_w', S_w')$ of the illumination white point and the luminance $Y_{w0}'$ in case that visual perception is adapted in the output image viewing condition are calculated by incorporating the device white point and the ambient light white point.

For instance, if the output image is to be observed as a printed hard copy, the calculation is executed by using the white point $(X_{device}', Y_{device}', Z_{device}')$ and the luminance $Y_{device0}'$ of the illumination used in the output image observation, the ambient light white point $(X_{sw}', Y_{sw}', Z_{sw}')$ and the ambient light level $Y_{sw0}'$, entered by the user (observer) via a keyboard or the like. If, on the other hand, the output image is to be displayed via a projector, the following values entered by the user with a keyboard or the like, may be used.

For the white point $(X_{device}', Y_{device}', Z_{device}')$ and the luminance $Y_{device0}'$ of the device, data included in the specifications or values obtained by the user through actual measurements may be used. For the ambient light white point $(X_{sw}', Y_{sw}', Z_{sw}')$ and the ambient light level $Y_{sw0}', Y_{sw0}'=0$ and $(X_{sw}', Y_{sw}', Z_{sw}')=(X_{device}', Y_{device}', Z_{device}')$ may be entered if the image is to be observed in a dark room. Otherwise the values obtained by the user by measuring the conditions in the ambient viewing condition may be entered.

As in the first embodiment, $(L_w', M_w', S_w')$ and $Y_{w0}'$ are calculated as expressed below by using the ratio $R_{mix}'$ of the influences of the device light source used for the output image observation and the ambient illuminating light source.

[Expression 59]

$$\begin{pmatrix} L'_{device} \\ M'_{device} \\ S'_{device} \end{pmatrix} = M_{CAT02} \begin{pmatrix} X'_{device} \\ Y'_{device} \\ Z'_{device} \end{pmatrix} \quad (59)$$

-continued

[Expression 60]

$$\begin{pmatrix} L'_{SW} \\ M'_{SW} \\ S'_{SW} \end{pmatrix} = M_{CAT02} \begin{pmatrix} X'_{SW} \\ Y'_{SW} \\ Z'_{SW} \end{pmatrix} \quad (60)$$

[Expression 61]

$$L'_W = \frac{R'_{mix} \cdot Y'^{1/3}_{device0} \cdot L'_{device} + (1 - R'_{mix}) \cdot Y'^{1/3}_{SW0} \cdot L'_{SW}}{R'_{mix} \cdot Y'^{1/3}_{device0} + (1 - R'_{mix}) \cdot Y'^{1/3}_{SW0}} \quad (61)$$

$$M'_W = \frac{R'_{mix} \cdot Y'^{1/3}_{device0} \cdot M'_{device} + (1 - R'_{mix}) \cdot Y'^{1/3}_{SW0} \cdot M'_{SW}}{R'_{mix} \cdot Y'^{1/3}_{device0} + (1 - R'_{mix}) \cdot Y'^{1/3}_{SW0}}$$

$$S'_W = \frac{R'_{mix} \cdot Y'^{1/3}_{device0} \cdot S'_{device} + (1 - R'_{mix}) \cdot Y'^{1/3}_{SW0} \cdot S'_{SW}}{R'_{mix} \cdot Y'^{1/3}_{device0} + (1 - R'_{mix}) \cdot Y'^{1/3}_{SW0}}$$

[Expression 62]

$$Y'_{W0} = (R'_{mix} \cdot Y'^{1/3}_{device0} + (1 - R'_{mix}) \cdot Y'^{1/3}_{SW0})^3 \quad (62)$$

$D_{h*}$ (h*) and $D_{h*'}$ (h*) are calculated in step S26 based upon the hue h* of the conversion target pixel, respectively in correspondence to the first viewing condition and the second viewing condition.

Through the processing described above, images reproduced with matching colors can be observed in different viewing conditions. Since the image data are converted by using an adaptation factor optimized in correspondence to the color, i.e., the hue of the conversion target pixel, as in the first embodiment, the color appearance can be reproduced accurately.

Eighth Embodiment

In the first through seventh embodiments, the adaptation factor D is adjusted in correspondence to the color (the hue, the saturation level and the like) of each target pixel undergoing the color conversion. In the eighth embodiment, the pixels constituting the image data are grouped into areas each made up with a plurality of pixels present in the area, a representative color for each area is determined and an adaptation factor D to be used in the pixel conversion within the area is determined based upon the representative color (the hue, the saturation level and the like) instead of adjusting the adaptation factor in correspondence to the individual pixels. Namely, the color (hue, saturation level or the like) distribution in the image data is analyzed and the adaptation factor is determined based upon the color distribution resulting from the analysis.

The image data may be divided into areas by dividing the image data into areas each corresponding to a given subject based upon edge extraction results or by dividing the image into blocks. The adaptation factor D determined for each area corresponding to a given subject defined based upon the edge extraction results changes in a manner faithfully reflecting the outline of the particular subject and thus, the converted image does not take on any unnatural look such as a change in D manifesting as a noticeable boundary.

If the image data are divided into blocks and the adaptation factor D is adjusted to assume different values in correspondence to the individual block areas, D used in a given area becomes discontinued at a block boundary. If such changes in D lead to an unnatural look in the vicinity of the boundaries of the divided areas, an interpolated D, obtained through interpolation executed based upon the representative adaptation factors D in the adjacent areas, may be used over a plurality of pixels present in each boundary area so as to assure continuity in D.

Figure 16:
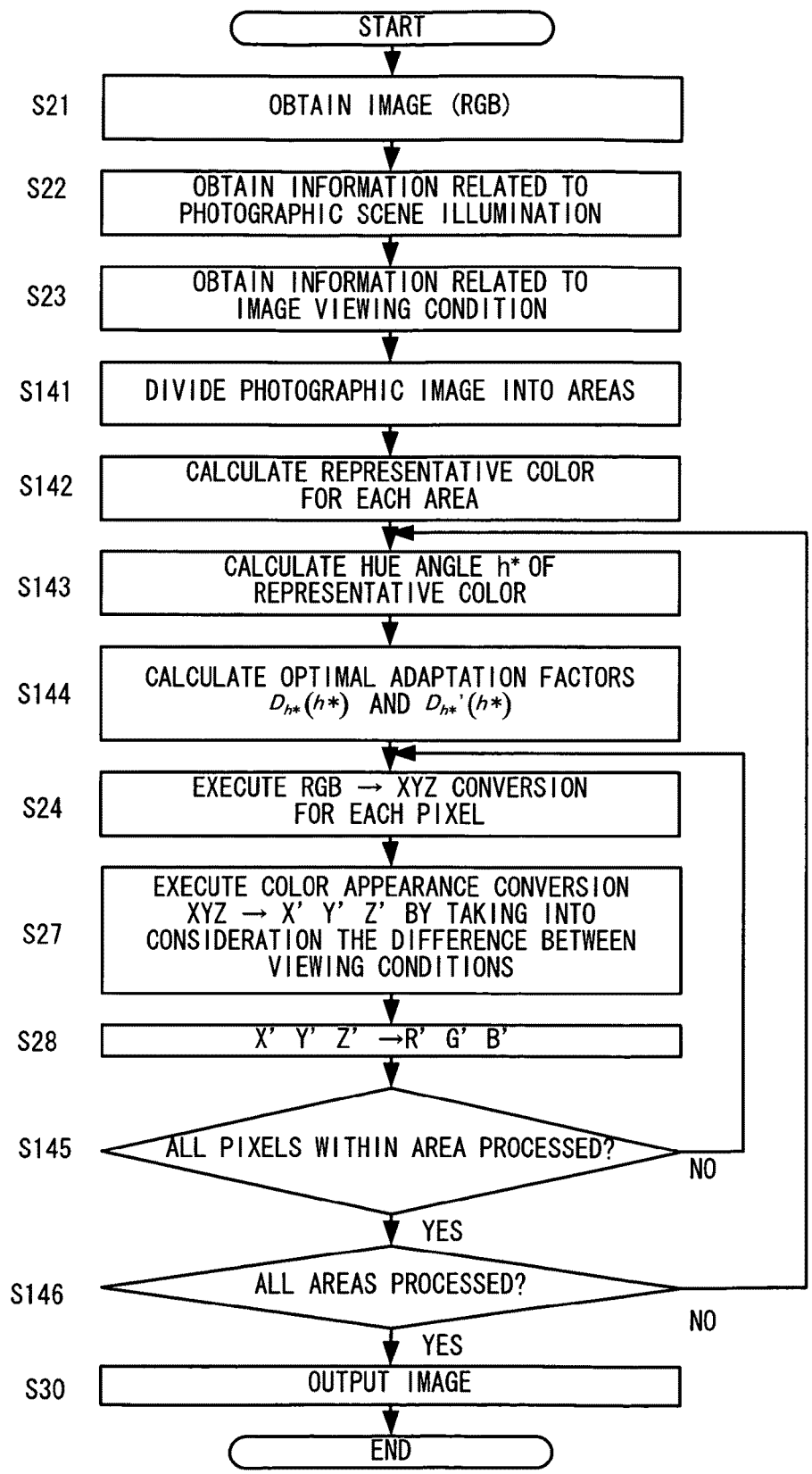

FIG. 16 presents a flowchart of the processing executed in the personal computer 1 in the eighth embodiment. As in the configuration shown in FIG. 1, in reference to which the first embodiment has been described, the personal computer 1 is assigned to execute the processing in FIG. 16.

Since the processing executed in steps S21~S23 is similar to that executed in the first embodiment (see FIG. 3), a repeated explanation is not provided.

In step S141, the photographic image is divided into a plurality of image areas. The photographic image may be divided into, for instance, block areas or into a plurality of closed spaces determined through edge extraction and a space outside the closed spaces in this step. In step S142, the representative color for each area is determined. The color extracted from a pixel present near the center of the area, the color representing the average of the pixel values at the pixels within the area or a color appearing frequently within the area may be designated as the representative color.

In step S143, the hue angle h* of the representative color is calculated. In step S144, adaptation factors $D_{h*}$ (h*) and $D_{h*'}$ (h*) that may be adopted in conjunction with the pixels in the area are calculated based upon the hue angle h* of the representative color. Namely, a two-dimensional distribution of the adaptation factors $D_{h*}$ (h*) and $D_{h*'}$ (h*) is calculated.

Since the processing executed in steps S124~S128 is similar to that executed in the first embodiment (see FIG. 3), a repeated explanation is not provided. $D_{h*}$ (h*) and $D_{h*'}$ (h*) having been calculated in correspondence to each conversion target area or $D_{h*}$ (h*) and $D_{h*'}$ (h*) determined through interpolation executed by using representative colors of neighboring areas should be used as the adaptation factors when executing the color conversion on the individual pixels.

In step S145, a decision is made as to whether or not the conversion on all the pixels present in the area has been completed and if a negative decision is made, the operation returns to step S24 to continuously execute the processing. If an affirmative decision is made, the operation proceeds to step S146. In step S146, a decision is made as to whether or not all the areas defined by dividing the photographic image have undergone the processing in steps S143~S145. If a negative decision is made, the operation returns to step S143 to continuously execute the processing. If an affirmative decision is made, however, the operation proceeds to step S30 to output the image before ending the processing.

As described above, the optimal adaptation factors corresponding to the representative color are determined for each area. Since this eliminates the need to judge the hue of each pixel, the processing is simplified. Furthermore, since the color conversion is executed by using the optimal adaptation factors corresponding to the color best representing the conversion target pixel, the exact color appearance can be reproduced.

Variation of the Eighth Embodiment

Figure 17:
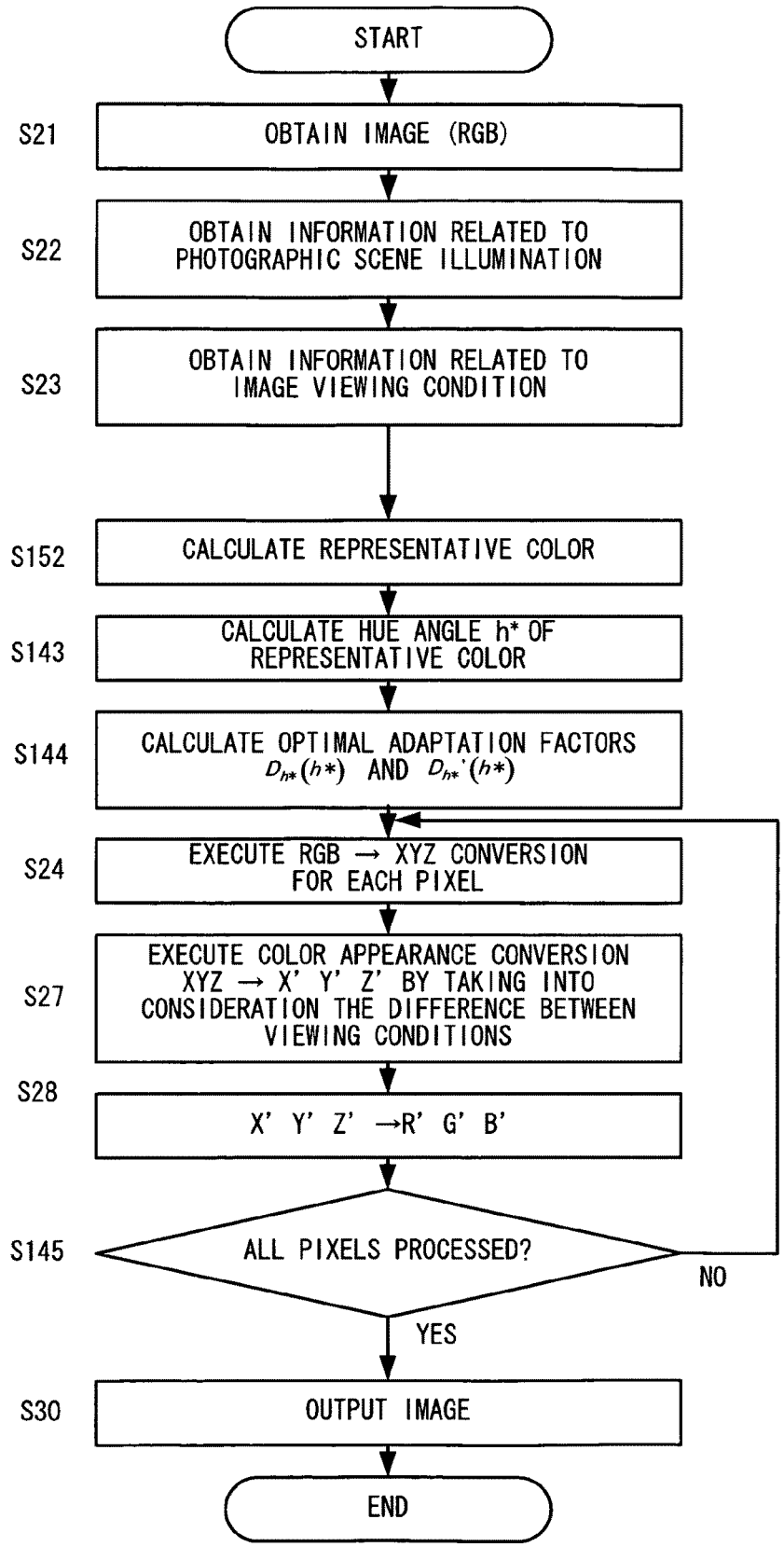

Instead of dividing the image into areas in step S141, a single representative color representing the color of the entire image may be determined. FIG. 17 presents a flowchart of the processing executed in the personal computer 1 in the variation. As in the configuration shown in FIG. 1, in reference to which the first embodiment has been described, the personal computer 1 is assigned to execute the processing in FIG. 17.

Since the processing executed in steps S21~S23 is similar to that executed in the first embodiment (see FIG. 3), a repeated explanation is not provided. In step S152, the representative color representing the entire image is determined. Since the representative color may be determined as in step S142 in the eighth embodiment (see FIG. 16), a repeated explanation is not provided. Since the processing executed in steps S143~S144, S24, S27 and S28 is similar to that executed in the eighth embodiment (see FIG. 16), a repeated explanation is not provided.

In step S145, a decision is made as to whether or not the conversion on all the pixels has been completed and if a negative decision is made, the operation returns to step S24 to continuously execute the processing. If an affirmative decision is made, however, the operation proceeds to step S30 to output the image before ending the processing. Since even the need to judge the hue of each area is eliminated, the processing can be further simplified.

It is to be noted that as in the first embodiment, color conversion of the photographic image is executed by factoring in the conditions in the output image viewing condition so that the appearance in observing of the output image approximates the appearance in the photographic scene, in the eighth embodiment. The eighth embodiment, however, is unique in that a representative color is determined in correspondence to each area and D is adjusted based upon the representative color. When color conversion is executed based upon image data having been created on an assumption that the image was to be observed in a first viewing condition so that the appearance in observing in a second viewing condition approximates the appearance in a photographic scene, as in the sixth embodiment, too, a representative color may be determined for each area and D may be adjusted based upon the representative color, as has been explained in reference to the eighth embodiment. Furthermore, a single representative color may be determined for the entire image, as in the variation of the eighth embodiment.

In addition, when executing the color conversion so as to output an image to be observed in a second viewing condition, which achieves an appearance best approximating the appearance of the input image observed in a first viewing condition, as in the seventh embodiment, too, a representative color may be determined for each area and D may be adjusted based upon the representative color as has been described in reference to the eighth embodiment. Furthermore, a single representative color may be determined for the entire image, as in the variation of the eighth embodiment.

Ninth Embodiment

Figure 18:
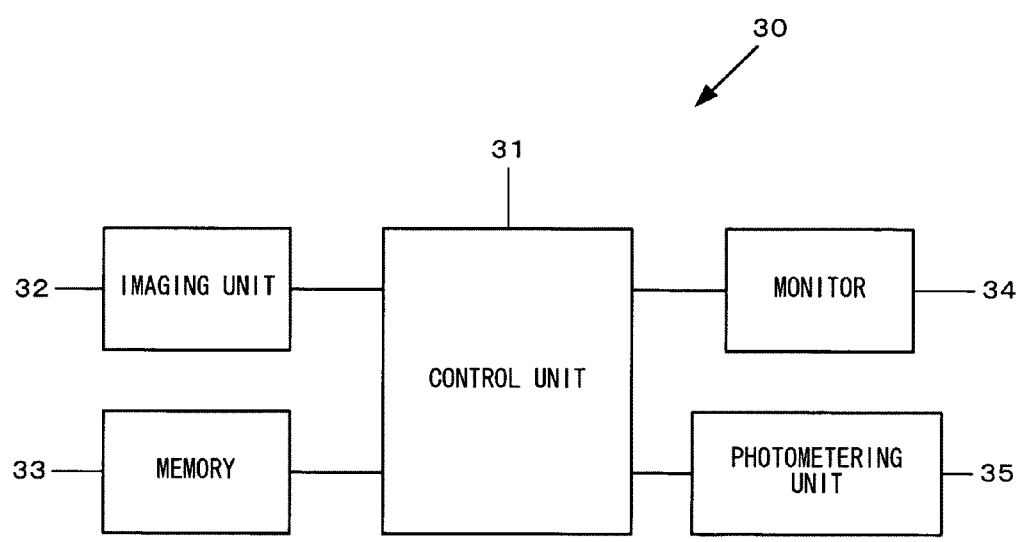

In the ninth embodiment, a photographic image is displayed at a liquid crystal display screen mounted on the rear of a digital camera. FIG. 18 shows the structure adopted in a digital camera 30 achieved in the embodiment. The digital camera 30 comprises a control unit 31, an imaging unit 32, a memory 33, a monitor 34, a photometering unit 35 and the like. The monitor 34 is a liquid crystal monitor mounted at the rear of the digital camera 30.

The control unit 31, constituted with a microprocessor, peripheral circuits and the like executes various types of control for the digital camera 30 and the image processing to be detailed later by executing programs stored in the memory 33. The imaging unit 32, constituted with an image sensor such as a CCD, converts a light flux originating from the subject and received therein via a photographic optical system (not shown) such as a photographic lens, to electrical signals, digitizes the electrical signals resulting from the conversion and outputs digital image data. The imaging unit 32, equipped with RGB color filters, outputs image data expressed in the RGB colorimetric system.

Since the control unit 31 in the digital camera 30 executes image processing similar to that shown in FIG. 16, the following explanation is given by referring to FIG. 16.

In step S21, a photographic image captured via the imaging unit 32 is obtained. In step S22, information related to the photographic scene is obtained. Since the details of this processing are similar to those explained in reference to the eighth embodiment, a repeated explanation is not provided. In step S23, information related to the image viewing condition is obtained.

The image observation device used for the image observation in this embodiment is the monitor 34 at the digital camera 30. Accordingly, the white point and the luminance of the monitor 34 stored in advance in the memory 33 are read and respectively designated as the device white point ($X_{device}'$, $Y_{device}'$, $Z_{device}'$) and the device luminance $Y_{device0}'$. In addition, the ambient light level is calculated by engaging the photometering function of the photometering unit 35 and the calculated ambient light level is set as the ambient light level $Y_{sw0}'$. The ambient illuminating light source may be determined by checking the WB data for the most recently photographed image and the white point of this light source may be read and designated as the ambient white point ($X_{sw}'$, $Y_{sw}'$, $Z_{sw}'$).

If the user is allowed to select the type of light source used for the observation in a menu listing, for instance, "sunlight", "cloudy (weak natural light)", "incandescent lamp", "fluorescent lamp" and the like, the white point corresponding to the selected light source is read. Since the illumination white point ($X_w'$, $Y_w'$, $Z_w'$) and the luminance $Y_{w0}'$ in the image viewing condition can be calculated by incorporating the device white point and the ambient light white point, as in the eighth embodiment, a repeated explanation is not provided.

The processing executed in steps S141~S30 is similar to that executed in the eighth embodiment. The image output and brought up on display on the monitor 34 mounted at the rear of the digital camera 30 assumes an appearance close to that of the actual photographic scene, achieved through simple processing even when the entry of the viewing condition information by the user is skipped.

In the ninth embodiment, the image processing method having been described in reference to the eighth embodiment is adopted when displaying a photographic image on the liquid crystal display mounted at the rear of the digital camera so as to display at the camera monitor an image taking on an appearance similar to that of the photographic scene. Likewise, processing similar to that executed in the first embodiment maybe executed within the camera. The processing executed in such an application will differ from that executed in the ninth embodiment in that steps S24~S29 in the first embodiment (see FIG. 3) are executed instead of steps S141~S146 in FIG. 16. In addition, processing similar to that executed in the variation (see FIG. 17) of the eighth embodiment may be executed within the camera by executing steps S152~S145 in FIG. 17 in place of steps S141~S146 in FIG. 16 illustrating the ninth embodiment.

It is to be noted that expressions other than those described in reference to the first through eighth embodiment (e.g., expressions (8)~(13) used in the first embodiment) may be used in an adaptation factor-based chromatic adaptation transform. Namely, any other expressions may be used in the chromatic adaptation transform as long as the cone response to white (e.g., expressions (10) and (11) in the first embodiment) used therein, in case that visual perception is adapted when the input image is photographed or observed and when the output image is observed, is expressed as follows.

$$L_{W,D}=f(L_W,D(h^*,C^*,L^*))$$

$$M_{W,D}=f(M_W,D(h^*,C^*,L^*))$$

$$S_{W,D}=f(S_W,D(h^*,C^*,L^*))$$

$$L_{W,D}'=f(L_W',D'(h^*,C^*,L^*))$$

$$M_{W,D}'=f(M_W',D'(h^*,C^*,L^*))$$

$$S_{W,D}'=f(S_W',D'(h^*,C^*,L^*))$$

It is to be noted that ($L_w$, $M_w$, $S_w$) and ($L_w'$, $M_w'$, $S_w'$) respectively represent cone responses to white, in case that visual perception is adapted as the image is photographed or the input image is observed and as the output image is observed, and they are respectively equivalent to expression (12) and expression (13) in the first embodiment. C* indicates the saturation level of the conversion target pixel or the representative color, h* indicates the hue of the conversion target pixel or the representative color, L* represents the lightness of the conversion target pixel or the representative color.

Tenth Embodiment

In the first, sixth, seventh, eighth and ninth embodiments, adaptation factors are determined by using the data shown in FIG. 2 based upon the hue of the conversion target pixel or the hue of the representative color. In the tenth embodiment, data indicating the relationship between the optimal adaptation factor $D_{h*}$ (h*) and the hue angle h*, such as those shown in FIG. 2, are obtained in advance in correspondence to each of varying illumination color temperatures (Tc) and adaptation factors $D_{h*}$ (h*, Tc) and $D_{h*}'$ (h*, Tc') are adjusted based upon the illumination color temperature (Tc) in the viewing condition where an input image, e.g., a photographic image, is obtained or an input image is observed, the color temperature (Tc') of the light used to illuminate the display device in the image viewing condition and the hue h*. Namely, adaptation factors are determined based upon the hue of the image data, the color temperature of the illumination used when obtaining the input image and the color temperature of the illumination in the image viewing condition under which the image is observed.

Figure 20:
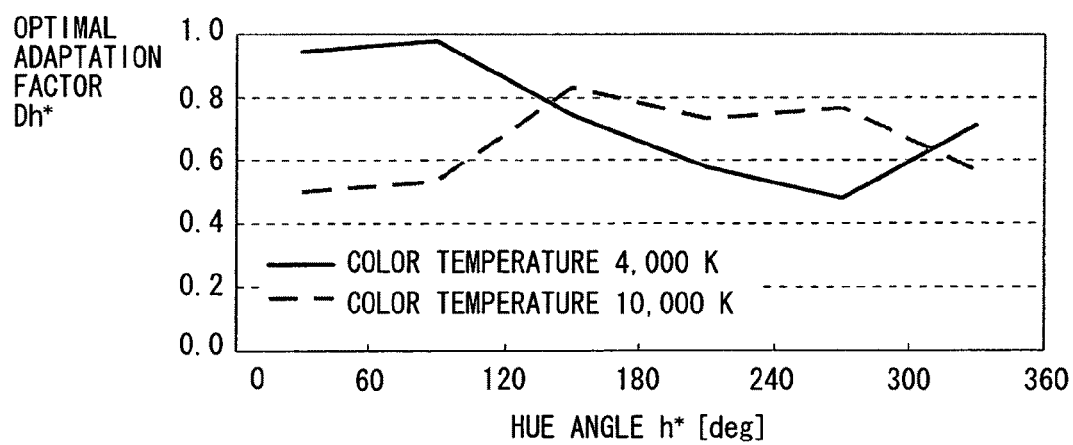

FIG. 20 presents a graph $D_{h*}$ (h*, Tc) indicating the optimal relationships between the hue angle h* and adaptation factor $D_{h*}$ (h*) at color temperatures 4000K and 10,000K. These relationships were determined through testing conducted at the different color temperatures by adopting a method similar to that adopted to obtain the color appearance test results described earlier. As indicated in the graph, even if the hue remains unchanged, the adaptation factor $D_{h*}$ (h*) may assume different values at different color temperatures. Accordingly, the optimal adaptation factor is calculated as an adaptation factor $D_{h*}$ (h*, Tc) or $D_{h*}'$ (h*, Tc') in the embodiment, instead of through the processing executed in step S26 in the first embodiment.

The processing executed in the embodiment differs from that in the first embodiment in that: (1) an additional step in which the color temperature (Tc) is calculated based upon the illumination white point ($X_w$, $Y_w$, $Z_w$) indicated in the information related to the photographic scene illumination, and obtained in step S22, is executed; (2) an additional step in which the color temperature (Tc') is calculated based upon the illumination white point ($X_w'$, $Y_w'$, $Z_w'$) indicated in the information related to the image viewing condition, and obtained in step S23, is executed; (3) $D_{h*}$ (h*, Tc) is used instead of the optimal adaptation factor $D_{h*}$ (h*) calculated through step S26; and (4) $D_{h*}'$ (h*, Tc') is used instead of the optimal adaptation factor $D_{h*}'$ (h*) calculated through step S26.

It is to be noted that such modifications may also be made in the sixth, seventh and eighth embodiments. However, when the tenth embodiment is adopted in the sixth embodiment, the color temperature (Tc) must be calculated based upon the illumination white point ($X_w$, $Y_w$, $Z_w$) constituting part of the information related to the first viewing condition, where the first image data are created, having been extracted from the obtained image data.

The tenth embodiment may otherwise be adopted in the sixth embodiment by modifying the processing, as described in (2)~(4) earlier (steps S23 and S26), in reference to the adoption of the tenth embodiment in the first embodiment.

The tenth embodiment may be adopted in the seventh embodiment (see FIG. 15) by: (1) calculating the color temperature (Tc) based upon the illumination white point indicated in the information related to the input image viewing condition and obtained in step S132; and (2) calculating the color temperature (Tc') based upon the illumination white point indicated in the information related to the output image viewing condition and obtained in step S133. The tenth embodiment may otherwise be adopted in the seventh embodiment by modifying the processing as described in (3) and (4) earlier (the modifications to the processing executed in step S26), in reference to the adoption of the tenth embodiment in the first embodiment.

The tenth embodiment may be adopted in the eighth embodiment by: (1) using $D_{h*}$ (h*, Tc) in place of the optimal adaptation factor $D_{h*}$ (h*) calculated in step S144; and (2) using $D_{h*}'$ (h*, Tc') in place of the optimal adaptation factor $D_{h*}'$ (h*) calculated in step S144.

The tenth embodiment may otherwise be adopted in the eighth embodiment by modifying the processing as described in (1) and (2) earlier (the modifications to the processing executed in steps S22 and S23), in reference to the adoption of the tenth embodiment in the first embodiment.

It is to be noted that since the tenth embodiment may be adopted in the ninth embodiment by modifying the processing as in conjunction with the eighth embodiment, a repeated explanation is not provided.

The color temperatures may be determined based upon the white points by, for instance, indicating a point corresponding to the spectrum with black-body radiation as a coordinate point in the XYZ color coordinate system and selecting the color temperatures corresponding to the spectrum assuming coordinate positions closest to the respective white points. As an alternative, the color temperatures may be calculated in the ninth embodiment based upon the extent of white balance adjustment executed in the camera.

Eleventh Embodiment

In the first, sixth, seventh, eighth and ninth embodiments, adaptation factors are determined by using the data shown in FIG. 2 based upon the color (the hue or the like) of the conversion target pixel or of the representative color. In the eleventh embodiment, data indicating the relationship between the optimal adaptation factor $D_{h*}$ (h*) and the hue angle h*; such as those shown in FIG. 2, are obtained in advance in correspondence to each of varying levels of saturation (C*) and an adaptation factor $D_{h*}$ (h*, C*) is adjusted based upon the hue angle h* and the saturation (C*) of the conversion target pixel or the representative color. Namely, the adaptation factor is determined based upon the hue and the saturation level assumed in the image data.

Figure 21:
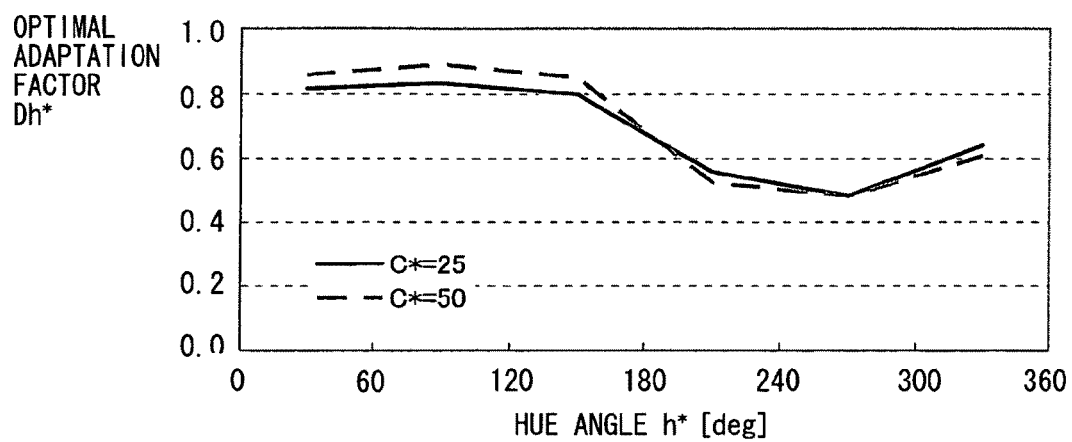

FIG. 21 presents a graph indicating the optimal relationships between the hue angle (h*) and the adaptation factor $D_{h*}$ (h*) at varying saturation levels C*=25 and C*=50. These relationships were determined at the different saturation levels through testing conducted by adopting a method similar to that adopted to obtain the color appearance test results described earlier. As indicated in the graph, even if the hue remains unchanged, the adaptation factor $D_{h*}$ (h*) may assume different values at different saturation levels. Accordingly, the optimal adaptation factor is calculated as an adaptation factor $D_{h*}$ (h*, C*) in the embodiment, instead of through the processing executed in step S26 in the first embodiment.

The processing executed in the eleventh embodiment differs from that in the first embodiment in that: (1) the saturation level (C*), in addition to the hue angle (h*) is calculated for the conversion target pixel in step S25; (2) $D_{h*}$ (h*, C*) is used instead of the optimal adaptation factor $D_{h*}$ (h*) calculated in step S26; and (3) $D_{h*}'$ (h*, C*') is used instead of the optimal adaptation factor $D_{h*}'$ (h*) calculated in step S26.

It is to be noted that such modifications may be made in the sixth, seventh, eighth and ninth embodiments as well.

The eleventh embodiment may be adopted in any of the eighth and the ninth embodiments and the variation of the eighth embodiment by: (1) calculating the saturation level C* as well as the hue angle h* of the representative color in step S143; and (2) calculating in step S144 the optimal adaptation factors $D_{h*}$ (h*, C*) and $D_{h*}'$ (h*, C*') instead of the optimal adaptation factors $D_{h*}$ (h*) and $D_{h*}'$ (h*) based upon the hue angle h* and the saturation level C* of the representative color having been determined in step S143.

It is to be noted that since the eleventh embodiment maybe adopted in the sixth and seventh embodiments by modifying the processing as in the first embodiment, a repeated explanation is not provided.

Twelfth Embodiment

In the first, sixth, seventh, eighth and ninth embodiments, adaptation factors are determined by using the data shown in FIG. 2 based upon the color (the hue or the like) of the conversion target pixel or of the representative color. In the tenth embodiment, data indicating the relationship between the optimal adaptation factor $D_{h*}$ (h*) and the hue angle h*, such as those shown in FIG. 2, are obtained in advance in correspondence to each of the varying illumination color temperatures and the adaptation factors are adjusted based upon the hue angle h* of the conversion target pixel or the representative color and the color temperatures Tc and Tc' of the illumination under which the input image is obtained and the input and output images are observed. In the eleventh embodiment, data indicating the relationship between the optimal adaptation factor $D_{h*}$ (h*) and the hue angle h*, such as those shown in FIG. 2, are obtained in advance in correspondence to each of varying levels of saturation (C*) and the adaptation factor is adjusted based upon the hue angle (h*) and the saturation (C*) of the conversion target pixel or the representative color.

As an alternative, the optimal adaptation factor $D_{h*}$ (h*, C*) may be determined in advance in correspondence to the hue angle (h*) and the saturation level (C*) at varying color temperatures and optimal adaptation factors $D_{h*}$ (h*, C*, Tc) and $D_{h*}'$ (h*, C*, Tc') may then be determined based upon the illumination color temperature (Tc) in the viewing condition where the photographic image is obtained or the input image is observed, the color temperature (Tc') of the illumination of the display device used in the viewing condition where the output image is observed, and the hue angle (h*) and the saturation level (C*) of the conversion target pixel or the representative color.

The processing executed in the twelfth embodiment differs from that in the first embodiment in that: (1) an additional step in which the color temperature (Tc) is calculated based upon the illumination white point ($X_w, Y_w, Z_w$) indicated in the information related to the photographic scene illumination, and obtained in step S22, is executed; (2) an additional step in which the color temperature (Tc') is calculated based upon the illumination white point ($X_w', Y_w', Z_w'$) indicated in the information related to the image viewing condition, and obtained in step S23, is executed; (3) the saturation level (C*), in addition to the hue angle (h*), is calculated for the conversion target pixel in step S25; (4) $D_{h*}$ (h*, C*, Tc) is used instead of the optimal adaptation factor $D_{h*}$ (h*) calculated through step S26; and (5) $D_{h*}'$ (h*, C*, Tc') is used instead of the optimal adaptation factor $D_{h*}'$ (h*) calculated through step S26.

It is to be noted that other aspects characterizing the processing executed in the twelfth embodiment, including the method adopted when calculating the color temperatures Tc and Tc', are similar to those in the tenth and eleventh embodiments.

It is to be noted that these modifications may be made in the sixth, seventh, eighth and ninth embodiments as well.

The twelfth embodiment may be adopted in the sixth embodiment by: (1) calculating the color temperature (Tc) based upon the white point ($X_w, Y_w, Z_w$) of the illumination, constituting part of the information related to the first viewing condition where the first image data have been created, having been extracted in step S82 from the image data; (2) executing an additional step in which the color temperature (Tc') is calculated based upon the white point ($X_w', Y_w', Z_w'$) of the illumination, indicated in the information related to the image viewing condition and obtained in step S23; (3) executing an additional step as part of step S25 through which the saturation level (C*) is calculated in addition to the hue angle h* of the conversion target pixel; (4) using $D_{h*}$ (h*, C*, Tc) instead of the optimal adaptation factor $D_{h*}$ (h*) calculated in step S26; and (5) using $D_{h*}'$ (h*, C*, Tc') instead of the optimal adaptation factor $D_{h*}'$ (h*) calculated in step S26.

The twelfth embodiment may be adopted in the seventh embodiment by: (1) calculating the color temperature (Tc) based upon the illumination white point indicated in the information related to the viewing condition where the input image is observed and obtained in step S132; (2) calculating the color temperature (Tc') based upon the illumination white point indicated in the information related to the viewing condition where the output image is observed and obtained in step S133; (3) executing an additional step as part of step S25 through which the saturation level (C*) is calculated in addition to the hue angle h* of the conversion target pixel; (4) using $D_{h*}$ (h*, C*, Tc) instead of the optimal adaptation factor $D_{h*}$ (h*) calculated in step S26; and (5) using $D_{h*}'$ (h*, C*, Tc') instead of the optimal adaptation factor $D_{h*}'$ (h*) calculated in step S26.

When the twelfth embodiment is adopted in any of the eighth and ninth embodiments and the variation of the eighth embodiment, the processing may be modified by; (3) calculating the saturation level (C*) in addition to the hue angle h* of the representative color in step S143; and (4) calculating the optimal adaptation factors as $D_{h*}$ (h*, C*, Tc) and $D_{h*}'$ (h*, C*, Tc') instead of $D_{h*}$ (h*) and $D_{h*}'$ (h*) in step S144 based upon the hue angle h* and the saturation level (C*) of the representative color having been calculated in step S143;

in addition to the modifications (1) and (2) made in the processing executed by adopting the twelfth embodiment in the first embodiment.

Thirteenth Embodiment

In the first, sixth, seventh, eighth and ninth embodiments, adaptation factors are determined by using the data shown in FIG. 2 based upon the color (the hue or the like) of the conversion target pixel or of the representative color. In the tenth embodiment, data indicating the relationship between the optimal adaptation factor $D_{h*}$ (h*) and the hue angle h*, such as those shown in FIG. 2, are obtained in advance in correspondence to each of the varying illumination color temperatures and the adaptation factors are adjusted based upon the hue angle h* of the conversion target pixel or the representative color and the color temperatures Tc and Tc' of the illumination under which the input image is obtained and under which the input and output images are observed. In the eleventh embodiment, data indicating the relationship between the optimal adaptation factor $D_{h*}$ (h*) and the hue angle h*, such as those shown in FIG. 2, are obtained in advance in correspondence to each of varying levels of saturation (C*) and the adaptation factor is adjusted based upon the hue angle (h*) and the saturation (C*) of the conversion target pixel or the representative color. In the twelfth embodiment, data indicating the optimal adaptation factor are obtained in advance at varying color temperatures and optimal adaptation factors are then determined based upon the hue angle h* and the saturation level C* of the conversion target pixel or the representative color, and the illumination color temperatures Tc and Tc' of the illuminations where the input image is obtained and where the input and output images are observed.

Figure 22:
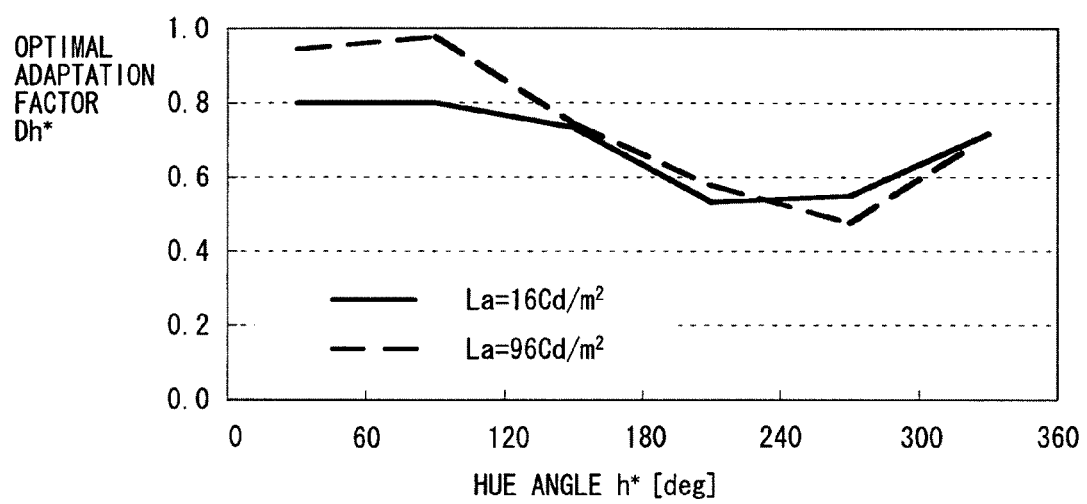

In the thirteenth embodiment, data indicating the relationship between the optimal adaptation factor $D_{h*}$ (h*) and the hue angle h*, such as those shown in FIG. 2 in reference to which the first embodiment has been described, are obtained in advance by varying the viewing conditions (e.g., the adapted luminance $L_A$, the ambient light level and the like) as shown in FIG. 22 so as to execute the processing by taking into consideration the viewing conditions in addition to the color (the hue or the like) of the conversion target pixel or the representative color.

Figure 23:
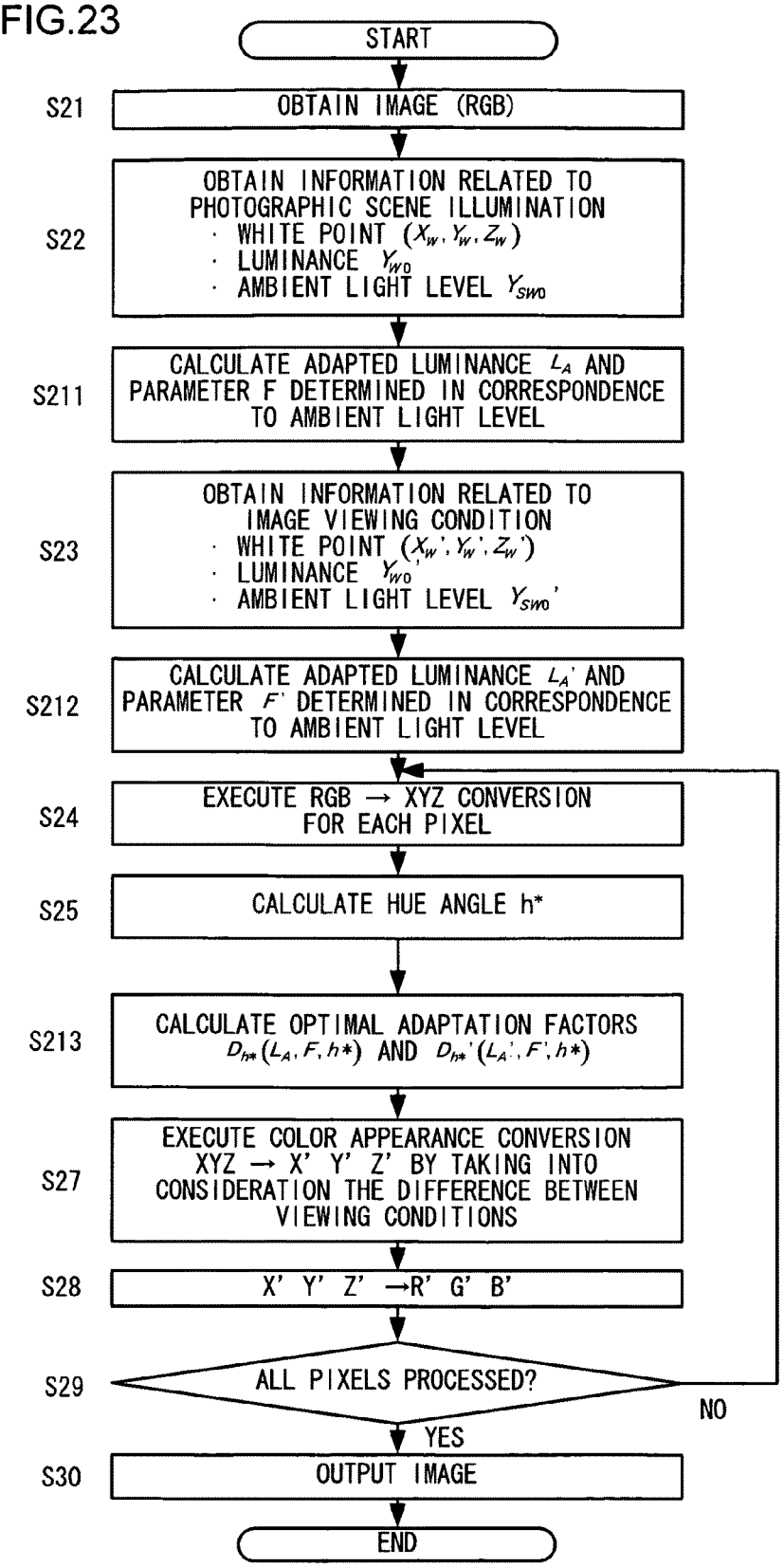

The flow of processing executed in the embodiment is now described in reference to FIG. 23.

Since the processing executed in steps S21 and S22 is similar to that in FIG. 3, a repeated explanation is not provided.

In step S211, an adapted luminance $L_A$, a parameter F, which is determined based upon the ambient light level and the like, are calculated by using the information related to the photographic scene illumination having been obtained in step S22. F is determined in the embodiment through interpolation based upon the ratio of $Y_{w0}$ and $Y_{sw0}$ by referencing a table defined in the CIECAM02. In addition, $L_A$ is calculated as $Y_{w0}/5$. However, $L_A$ or F may be calculated through a different method. For instance, $L_A$ may be estimated based upon the average brightness level for the entire image or it may be calculated as; $L_A=m \cdot Y_{w0}/100$ with m indicating the percentage (%) of the average brightness level for the entire image relative to the white brightness value.

Since the processing executed in step S23 is similar to that in FIG. 3, a repeated explanation is not provided.

In step S212, an adapted luminance $L_A'$, a parameter F', which is determined based upon the and the ambient light level and the like, are calculated by using the information related to the image viewing condition having been obtained in step S23. F' is determined in the embodiment through interpolation based upon the ratio of $Y_{w0}'$ and $Y_{sw0}'$ by referencing a table defined in the CIECAM02. In addition, $L_A$ is calculated as $Y_{w0}'/5$. However, $L_A'$ or F may be calculated through a different method. For instance, $L_A'$ may be estimated based upon the average brightness level for the entire image or it may be calculated as; $L_A'=m \cdot Y_{w0}'/100$ with m indicating the percentage (%) of the average brightness level for the entire image relative to the white brightness value.

Since the processing executed in steps S24 and S25 is similar to that in FIG. 3, a repeated explanation is not provided.

In step S213, adaptation factors $D_{h*}$ ($L_A$, F, h*) and $D_{h*}'$ ($L_A'$, F', h*) that give the optimal color appearance in correspondence to h* having been calculated in step S25 in the viewing conditions having been determined through steps S22~S212 are individually calculated based upon the relationship $D_{h*}$ ($L_A$, F, h*) among the optimal adaptation factor, the viewing condition and the hue, having been determined in advance based upon the color appearance test results.

Since the processing executed in steps S27~S30 is similar to that in FIG. 3, a repeated explanation is not provided.

It is to be noted that the thirteenth embodiment may be adopted in the sixth through twelfth embodiments as well.

When the thirteenth embodiment is adopted in the sixth embodiment, the processing may be modified by: (1) executing step S211 in FIG. 23 showing the processing of the thirteenth embodiment, as an additional step following step S82 in FIG. 14 (sixth embodiment); (2) executing step S212 in FIG. 23 showing the processing of the thirteenth embodiment as an additional step following step S23 in FIG. 14 (sixth embodiment); and (3) executing step S213 in FIG. 23 showing the processing of the thirteenth embodiment, instead of step S26 in FIG. 14 (sixth embodiment).

When the thirteenth embodiment is adopted in the seventh embodiment, the processing may be modified by: (1) executing step S211 in FIG. 23 showing the processing of the thirteenth embodiment as an additional step following step S132 in FIG. 15 (seventh embodiment); (2) executing step S212 in FIG. 23 showing the processing of the thirteenth embodiment as an additional step following step S133 in FIG. 15 (seventh embodiment); and (3) executing step S213 in FIG. 23 showing the processing of the thirteenth embodiment instead of step S26 in FIG. 15 (seventh embodiment).

When the thirteenth embodiment is adopted in any of the eighth and ninth embodiments and the variation of the eighth embodiment, the processing may be modified by: (1) executing step S211 in FIG. 23 showing the processing of the thirteenth embodiment as an additional step following step S22 in FIGS. 15 and 17 (the eighth embodiment and the variation of the eighth embodiment); (2) executing step S23 in FIG. 23 showing the processing of the thirteenth embodiment as an additional step following step S23 in FIGS. 16 and 17 (eighth embodiment and the variation of the eighth embodiment); and (3) executing step S213 in FIG. 23 showing the processing of the thirteenth embodiment instead of step S144 in FIGS. 16 and 17 (the eighth embodiment and the variation of the eighth embodiment).

When the thirteenth embodiment is adopted in the tenth through twelfth embodiments, the processing may be modified as in the adoption in the first embodiment (as in the initial description of the current embodiment).

Fourteenth Embodiment

In the thirteenth embodiment, the adaptation factor $D_{h*}$ is adjusted in correspondence to the color (the hue h* or the like)

of the conversion target pixel or the representative color and the viewing conditions (e.g., the adapted luminance $L_A$ and the ambient light level).

When $D_{h*}$ is adjusted in correspondence to h* in the fourteenth embodiment, the adaptation factor representing the average over the full hue range assumes values determined in correspondence to the scene illumination conditions under which the input image is obtained or the viewing condition where the input image is observed and in correspondence to the viewing condition where the output image is observed. As a result, numerous tests do not need to be conducted by varying the viewing condition and instead, the hue dependency of the adaptation factor in a given viewing condition alone needs to be verified, making it possible to reduce the load of color appearance testing and reduce the capacity requirement for the memory in the personal computer or the camera. It is to be noted that the value of the adaptation factor representing the average over the full hue range will change depending upon the scene illumination conditions under which the input image is obtained or the viewing condition where the input image is observed and also depending upon the viewing condition where the output image is observed.

According to the definition set forth in the CIECAM02, the adaptation factor D can be calculated as expressed below based upon adapted luminance $L_A$ and the parameter F, which is determined in correspondence to the ambient light level.

[Expression 63]

$$D(L_A, F) = F\left[1 - \left(\frac{1}{3,6}\right)e^{\left(\frac{-(L_A+42)}{92}\right)}\right] \quad (63)$$

While the results of investigations into the hue dependency of $L_A$, obtained through color appearance testing similar to that explained in reference to the first embodiment, conducted by varying $L_A$, indicate that hue dependency manifests regardless of $L_A$, as shown in FIG. 22, the value representing the average over the full hue range does change in correspondence to $L_A$ and assumes a value close to the value calculated based upon the definition set forth in the CIECAM02 mentioned above.

Accordingly, a color appearance test similar to that explained in reference to the first embodiment is first conducted in a given viewing condition X (the adapted luminance $L_{A\_X}$, and the parameter $F_X$ which is determined in correspondence to the ambient light level) and the hue dependency $D_X$ (h*) of the adaptation factor in the viewing condition X is ascertained, as shown in FIG. 2. Then, the hue-dependent component $D_0$ (h*) unaffected by the adapted luminance or the ambient light level is extracted from $D_X$ (h*).

[Expression 64]

$$D_0(h^*) = \frac{D_X(h^*)}{D(L_{A\_X}, F_X)} \quad (64)$$

[Expression 65]

$$D(L_{A\_X}, F_X) = F_X\left[1 - \left(\frac{1}{3,6}\right)e^{\left(\frac{-(L_{A\_X}+42)}{92}\right)}\right] \quad (65)$$

$D_0$ (h*) thus calculated is then saved into the storage medium in the personal computer 1, which executes the processing in the fourteenth embodiment.

Figure 24:
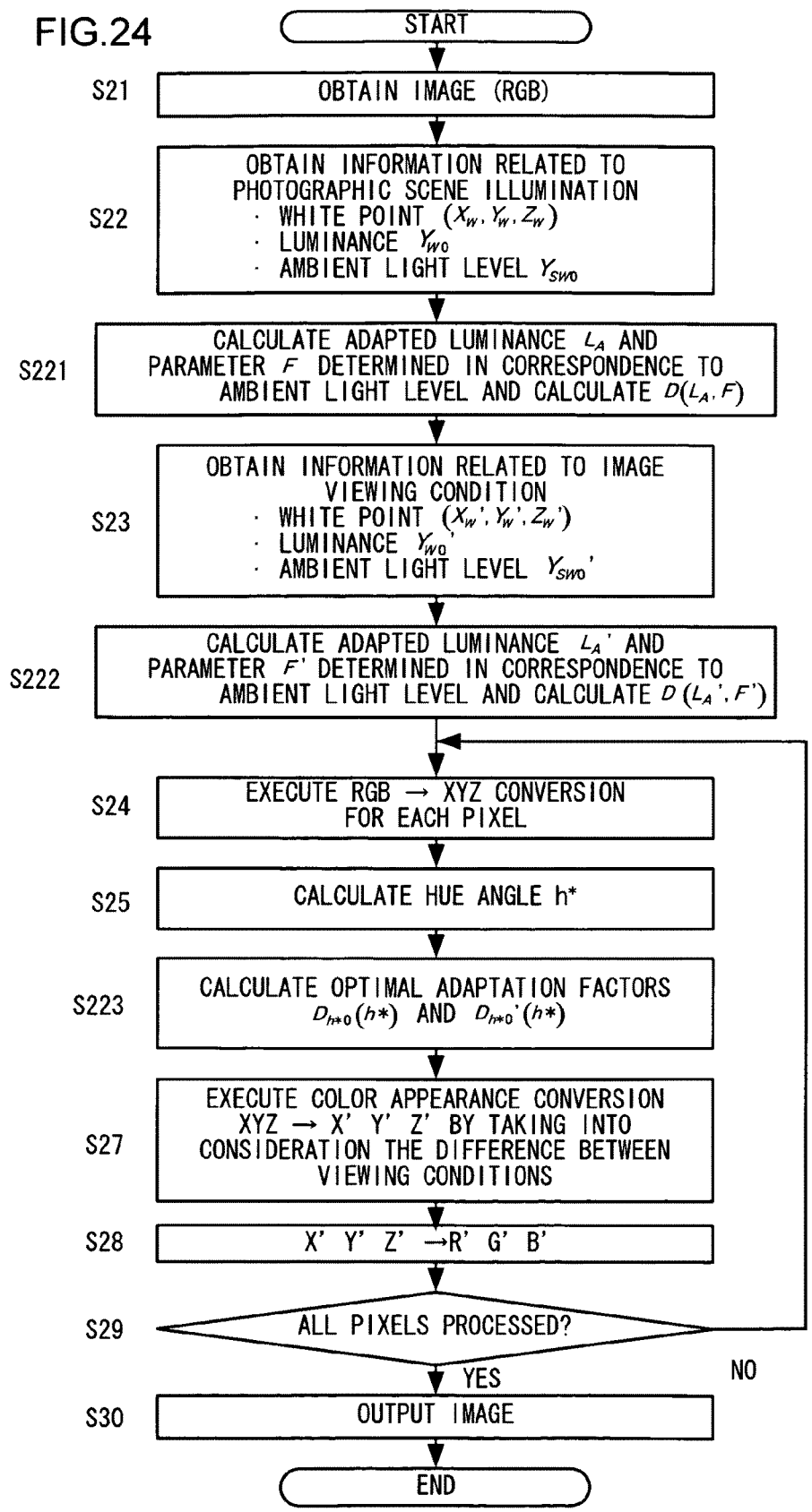

The flow of processing executed in personal computer 1 in the fourteenth embodiment is now explained in reference to FIG. 24.

Since the processing executed in steps S21 and S22 is similar to that executed in the first embodiment (see FIG. 3), a repeated explanation is not provided.

In step S221, the adapted luminance $L_A$ and the parameter F, which is determined based upon ambient light level, are calculated by using the information related to the photographic scene illumination having been obtained in step S22. F is determined in the embodiment through interpolation based upon the ratio of $Y_{w0}$ and $Y_{sw0}$ by referencing a table defined in the CIECAM02. In addition, $L_A$ is calculated as; $L_A=Y_{w0}/5$. However, $L_A$ or F may be calculated through a different method. For instance, $L_A$ may be estimated based upon the average brightness level for the entire image or it may be calculated as; $L_A=m\cdot Y_{w0}/1000$ with m indicating the percentage (%) of the average brightness level for the entire image relative to the white brightness value. Next, D ($L_A$, F) is calculated based upon $L_A$ and F.

[Expression 66]

$$D(L_A, F) = F\left[1 - \left(\frac{1}{3,6}\right)e^{\left(\frac{-(L_A+42)}{92}\right)}\right] \quad (66)$$

Since the processing executed in step S23 is similar to that executed in the first embodiment (see FIG. 3), a repeated explanation is not provided.

In step S222, the adapted luminance $L_A'$ and the parameter F', which is determined based upon the ambient light level, are calculated by using the information related to the image viewing condition having been obtained in step S23. F' is determined in the embodiment through interpolation based upon the ratio of $Y_{w0}'$ and $Y_{sw0}'$ by referencing a table defined in the CIECAM02. In addition, $L_A'$ is calculated as $L_A'=Y_{w0}'/5$. However, $L_A'$ or F' may be calculated through a different method. For instance, $L_A'$ may be estimated based upon the average brightness level for the entire image or it may be calculated as; $L_A'=m\cdot Y_{w0}'/100$ with m indicating the percentage (%) of the average brightness level for the entire image relative to the white brightness value. Next, D ($L_A'$, F') is calculated based upon $L_A'$ and F'.

[Expression 67]

$$D(L_A', F') = F'\left[1 - \left(\frac{1}{3,6}\right)e^{\left(\frac{-(L_A'+42)}{92}\right)}\right] \quad (67)$$

Since the processing executed in steps S24 and S25 is similar to that executed in the first embodiment (see FIG. 3), a repeated explanation is not provided.

In step S223, $D_{h*0}$ (h*) and $D_{h*0}'$ (h*) are calculated as expressed below.

[Expression 68]

$$D_{h*0}'(h^*) = D_0(h^*)\cdot D(L_A', F) \quad (68)$$

[Expression 69]

$$D_{h*0}'(h^*) = D_0(h^*)\cdot D(L_A', F') \quad (69)$$

Since the processing executed in steps S27~S30 is similar to that executed in the first embodiment (see FIG. 3), a repeated explanation is not provided.

Variation 1 of the Fourteenth Embodiment

Figure 25:
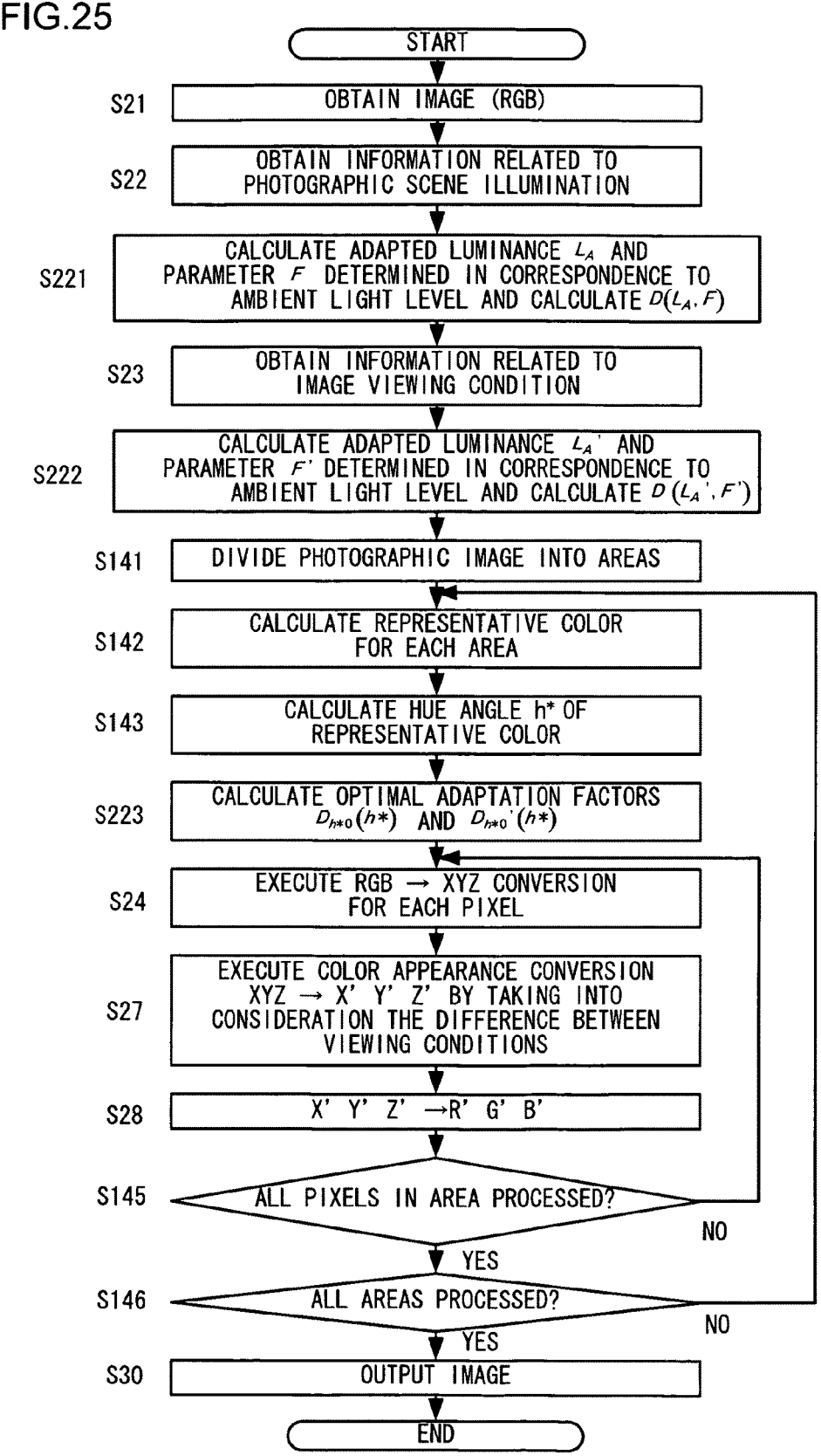

In the fourteenth embodiment, D used in the first embodiment is adjusted so that the average D over the full hue range assumes a value determined in correspondence to the viewing condition as well as the D assumes a value depending on the hue. Similar processing may be adopted in the eighth embodiment as well. The flow of processing that may be executed in the personal computer 1 in such an application is now described in reference to FIG. 25.

Since the processing executed in steps S21, S22, S221, S23 and S222 is similar to that executed in the fourteenth embodiment, as shown in FIG. 24, a repeated explanation is not provided. Since the processing executed in steps S141 S143 is similar to that executed in the eighth embodiment, as shown in FIG. 16, a repeated explanation is not provided.

In step S223, $D_{h*0}$ (h*) and $D_{h*0}'$ (h*) are calculated based upon the hue angle h* of the representative color and D ($L_A$, F) and D ($L_A'$, F') having been calculated in steps S221 and S222, as in step S223 in the fourteenth embodiment shown in FIG. 24.

Since the processing executed in steps S24, S27, S28, S145, S146 and S30 is similar to that executed in the eighth embodiment, as shown in FIG. 16, a repeated explanation is not provided. Namely, the processing executed in the eighth embodiment may be modified by executing step S221 after step S22, executing step S222 after step S23 and executing step S223 instead of S144.

It is to be noted that variation 1 maybe adopted in the ninth embodiment by making similar modifications.

Variation 2 of the Fourteenth Embodiment

Figure 26:
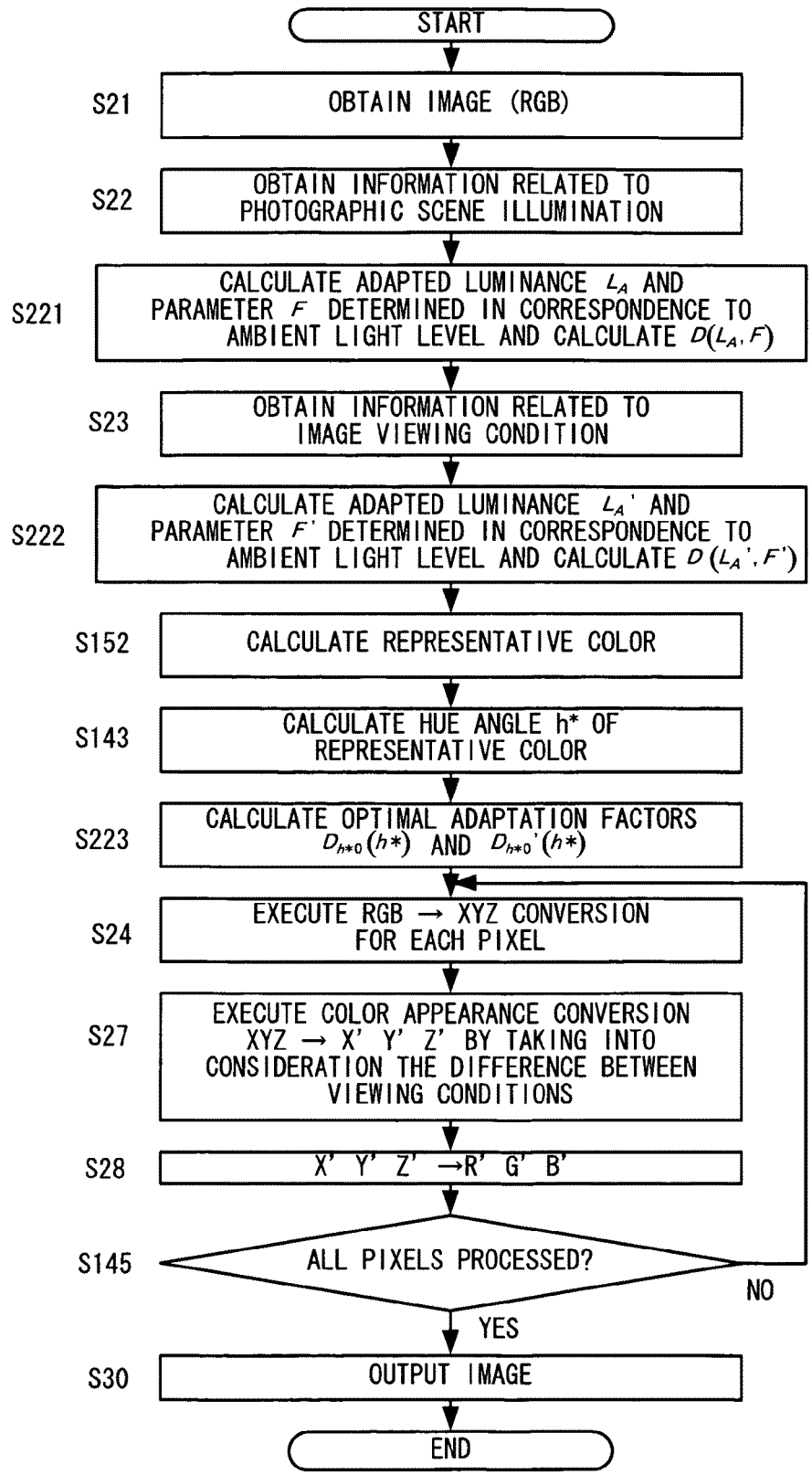

In variation 1 of the fourteenth embodiment, D used in the eighth embodiment is adjusted so that the average D over the full hue range assumes a value determined in correspondence to the viewing condition as well as the D assumes a value depending on the hue. Similar processing may be adopted in the variation of the eighth embodiment as well. The flow of processing that may be executed in the personal computer 1 in such an application is now described in reference to FIG. 26.

Since the processing executed in steps S21, S22, S221, S23 and S222 is similar to that executed in the fourteenth embodiment, as Shown in FIG. 24, a repeated explanation is not provided. Since the processing executed in steps S152 and S143 is similar to that executed in the variation of the eighth embodiment, as shown in FIG. 17, a repeated explanation is not provided.

In step S223, $D_{h*0}$ (h*) and $D_{h*0}'$ (h*) are calculated based upon the hue angle h* of the representative color and D ($L_A$, F) and D ($L_A'$, F') having been calculated in steps S221 and S222, as in step S223 in the fourteenth embodiment shown in FIG. 24.

Since the processing executed in steps S24, S27, S28, S145 and S30 is similar to that executed in the variation of the eighth embodiment, as shown in FIG. 17, a repeated explanation is not provided. Namely, the processing executed in the variation of the eighth embodiment may be modified by executing step S221 after step S22, executing step S222 after step S23 and executing step S223 instead of S144.

Variation 3 of the Fourteenth Embodiment

Figure 27:
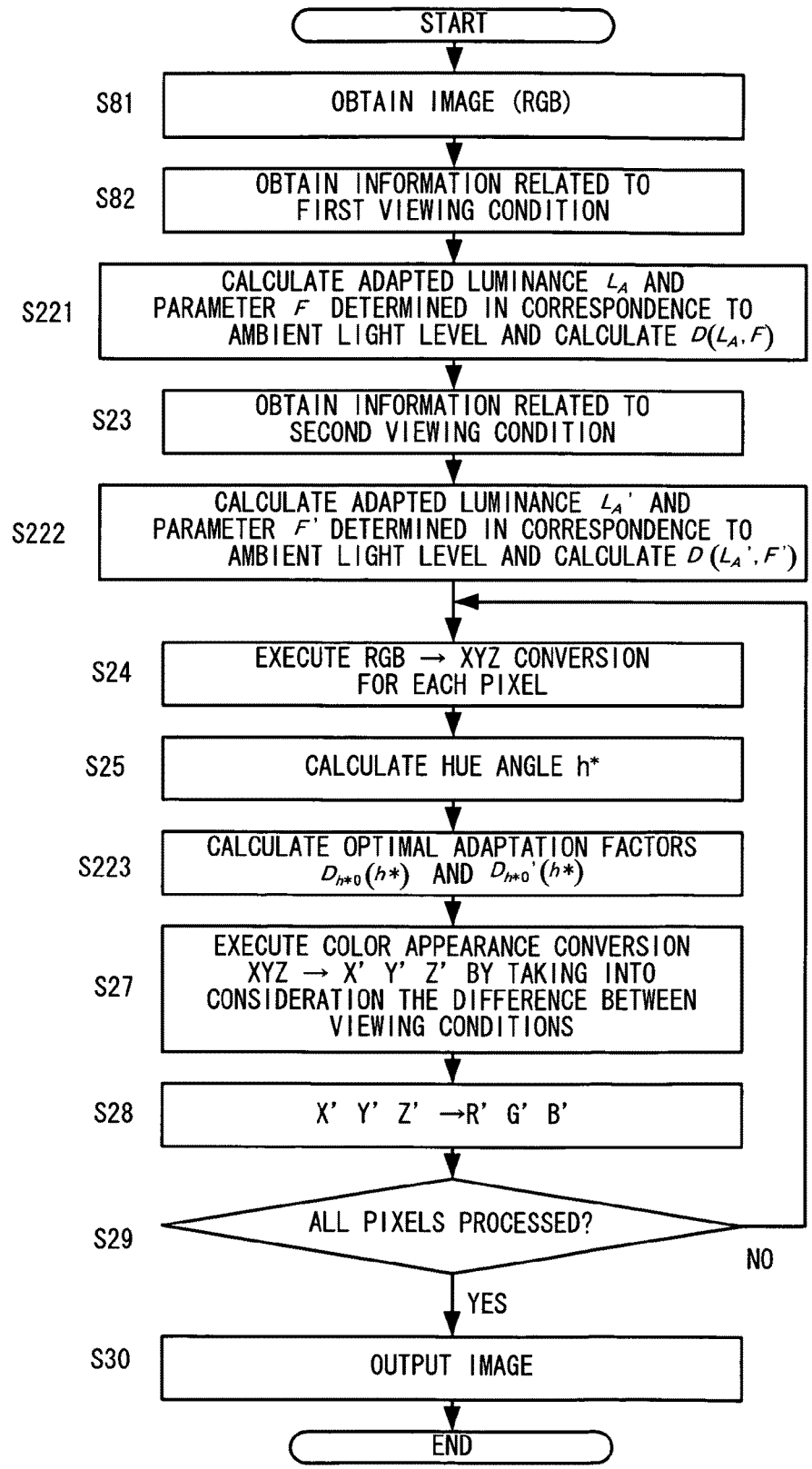

In variation 1 of the fourteenth embodiment, D used in the eighth embodiment is adjusted so that the average D over the full hue range assumes a value determined in correspondence to the viewing condition as well as the D assumes a value depending on the hue. Similar processing may be adopted in the sixth embodiment as well. The flow of processing that may be executed in the personal computer 1 in such an application is now described in reference to FIG. 27.

Since the processing executed in steps S81 and S82 is similar to that executed in the sixth embodiment, as shown in FIG. 14, a repeated explanation is not provided. Since the processing executed in step S221 is similar to that executed in the fourteenth embodiment, as shown in FIG. 24, a repeated explanation is not provided. Since the processing executed in step S23 is similar to that executed in the sixth embodiment, as shown in FIG. 14, a repeated explanation is not provided. Since the processing executed in step S222 is similar to that executed in the fourteenth embodiment, as shown in FIG. 24, a repeated explanation is not provided. Since the processing executed in steps S24 and S25 is similar to that executed in the sixth embodiment, as shown in FIG. 14, a repeated explanation is not provided.

In step S223, $D_{h*0}$ (h*) and $D_{h*0}'$ (h*) are calculated based upon the hue angle h* of the conversion target pixel and D ($L_A$, F) and D ($L_A'$, F') having been calculated in steps S221 and S222, as in step S223 in the fourteenth embodiment shown in FIG. 24.

Since the processing executed in steps S27~S30 is similar to that executed in the sixth embodiment, as shown in FIG. 14, a repeated explanation is not provided. Namely, the processing executed in the sixth embodiment may be modified by executing step S221 after step S82, executing step S222 after step S23 and executing step S223 instead of S26.

Variation 4 of the Fourteenth Embodiment

Figure 28:
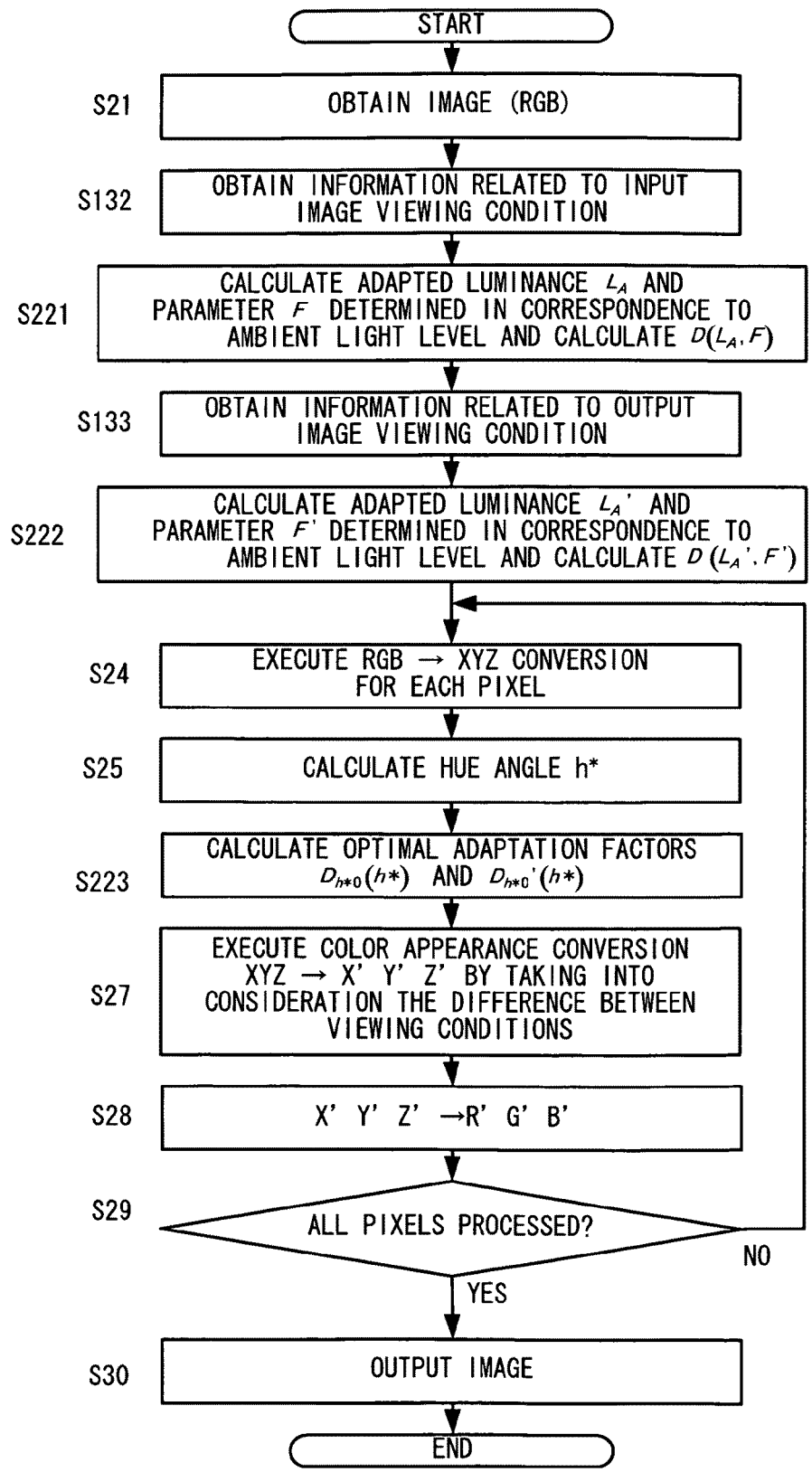

In variation 1 of the fourteenth embodiment, D used in the eighth embodiment is adjusted so that the average D over the full hue range assumes a value determined in correspondence to the viewing condition as well as the D assumes a value depending on the hue. Similar processing may be adopted in the seventh embodiment as well. The flow of processing that may be executed in the personal computer 1 in such an application is now described in reference to FIG. 28.

Since the processing executed in steps S21 and S132 is similar to that executed in the seventh embodiment, as shown in FIG. 15, a repeated explanation is not provided. Since the processing executed in step S221 is similar to that executed in the fourteenth embodiment, as shown in FIG. 24, a repeated explanation is not provided. Since the processing executed in step S133 is similar to that executed in the seventh embodiment, as shown in FIG. 15, a repeated explanation is not provided. Since the processing executed in step S222 is similar to that executed in the fourteenth embodiment, as shown in FIG. 24, a repeated explanation is not provided. Since the processing executed in steps S24 and S25 is similar to that executed in the seventh embodiment, as shown in FIG. 15, a repeated explanation is not provided.

In step S223, $D_{h*0}$ (h*) and $D_{h*0}'$ (h*) are calculated based upon the hue angle h* of the conversion target pixel and D ($L_A$, F) and D ($L_A'$, F') having been calculated in steps S221 and S222, as in step S223 in the fourteenth embodiment shown in FIG. 24.

Since the processing executed in steps S27~S30 is similar to that executed in the seventh embodiment, as shown in FIG. 15, a repeated explanation is not provided. Namely, the processing executed in the seventh embodiment may be modified by executing step S221 after step S132, executing step S222 after step S133 and executing step S223 instead of S26.

Variation 5 of the Fourteenth Embodiment

The fourteenth embodiment may also be adopted in the eleventh embodiment in much the same way as in the variations described above, as long as $D_0$ (h*, C*) is determined in advance through color appearance testing, D ($L_A$, F) and D ($L_A'$, F') are calculated respectively based upon the adapted luminance $L_A$ and parameter F determined in correspondence to the ambient light level and the adapted luminance $L_A'$ and the parameter F' determined in correspondence to the ambient light level, and then the adaptation factors corresponding to the hue of the conversion target pixel or the representative color are calculated as $D_{h*0}$ (h*, C*)=$D_0$ (h*, C*)·D ($L_A$, F) and $D_{h*0}$ (h*, C*)=$D_0$ (h*, C*)·D ($L_A'$, F') instead of $D_{h*}$ (h*, C*) and $D_{h*}'$ (h*, C*).

Variation 6 of the Fourteenth Embodiment

The fourteenth embodiment may also be adopted in the tenth embodiment in much the same way as in the variations described above, as long as $D_0$ (h*, Tc) is determined in advance through color appearance testing, D ($L_A$, F) and D ($L_A'$, F') are calculated respectively based upon the adapted luminance $L_A$ and the parameter F determined in correspondence to the ambient light level and the adapted luminance $L_A'$ and the parameter F' determined in correspondence to the ambient light level, and then the adaptation factors corresponding to the hue of the conversion target pixel or the representative color are calculated as $D_{h*0}$ (h*, Tc)=$D_0$ (h*, Tc)·D ($L_A$, F) and $D_{h*0}'$ (h*, Tc')=$D_0$ (h*, Tc')·D ($L_A'$, F') instead of as $D_{h*}$ (h*, Tc) and $D_{h*}'$ (h*, Tc').

Variation of the Fourteenth Embodiment 7

The fourteenth embodiment may also be adopted in the twelfth embodiment in much the same way as in the variations described above, as long as $D_0$ (h*, C*, Tc) is determined in advance through color appearance testing, D ($L_A$, F) and D ($L_A'$, F') are calculated respectively based upon the adapted luminance $L_A$ and the parameter F determined in correspondence to the ambient light level and the adapted luminance $L_A'$ and the parameter F' determined in correspondence to the ambient light level and the adaptation factors corresponding to the hue of the conversion target pixel or the representative color are calculated as $D_{h*0}$ (h*, C*, Tc)=$D_0$ (h*, C*, Tc)·D ($L_A$, F) and $D_{h*0}'$ (h*, C*, Tc')=$D_0$ (h*, C*, Tc')·D ($L_A'$, F') instead of as $D_{h*}$ (h*, C*, Tc) and $D_{h*}'$ (h*, C*, Tc').

Other Variations of the Fourteenth Embodiment

Figure 29:
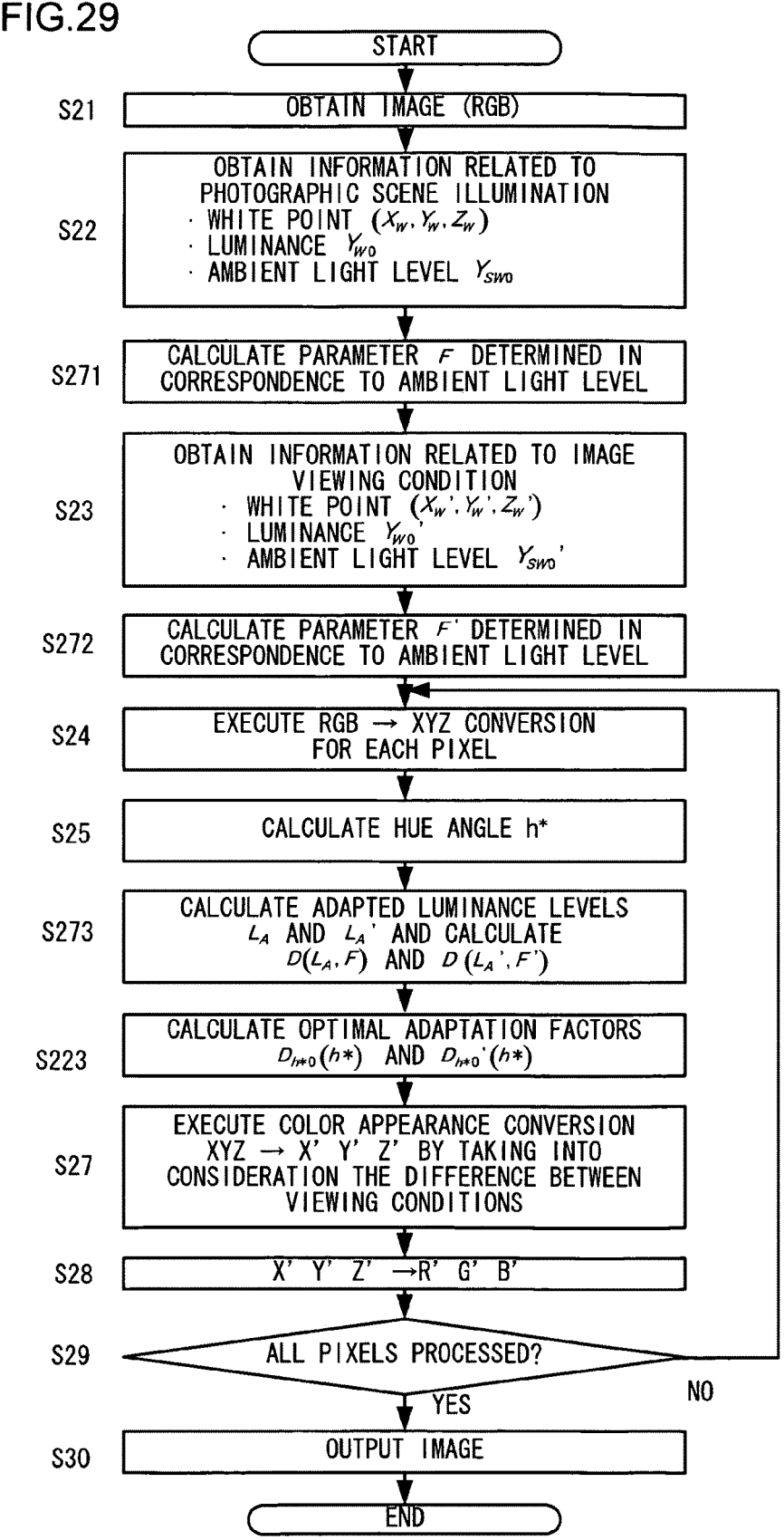

It is to be noted that while the adapted luminance $L_A$ and the adapted luminance $L_A'$ each assume a uniform value for the entire image in the description provided above, the adapted luminance levels may instead be calculated in correspondence to each pixel or each area. For instance, $L_A$ and $L_A'$ may be calculated as; $L_A$=y·$Y_{W0}$/$Y_W$ and $L_A'$=y·$Y_{W0}'$/$Y_W'$ in relation to the white brightness value $Y_W$, each by using a value y, e.g., the relative brightness value representing the average of brightness values at a predetermined number of pixels surrounding the conversion target pixel or the relative brightness value of the representative color. When this change is instituted in the fourteenth embodiment, the flow of processing executed by the personal computer 1 may be modified as shown in FIG. 29.

Since the processing executed in steps S21 and S22 is similar to that executed in the fourteenth embodiment, as shown in FIG. 24, a repeated explanation is not provided.

In step S271, the parameter F, which is determined in correspondence to the ambient light level, is calculated by using the information related to the photographic scene illumination, having been obtained in step S22. Since F can be determined as in step S221 in the fourteenth embodiment, a repeated explanation is not provided. Since the processing executed in step S23 is similar to that executed in the fourteenth embodiment, as shown in FIG. 24, a repeated explanation is not provided.

In step S272, the parameter F', which is determined in correspondence to the ambient light level, is calculated by using the information related to the image viewing condition, having been obtained in step S23. Since F' can be determined as in step S222 in the fourteenth embodiment, a repeated explanation is not provided. Since the processing executed in steps S24 and S25 is similar to that executed in the fourteenth embodiment, as shown in FIG. 24, a repeated explanation is not provided.

In step S273, $L_A$ and $L_A'$ are calculated as; $L_A$=y·$Y_{W0}$/$Y_W$ and $L_A'$=y·$Y_{W0}'$/$Y_W'$ in relation to the white brightness value $Y_W$, each by using the relative brightness value y representing the average of the brightness values at a predetermined number of pixels surrounding the conversion target pixel, and D ($L_A$, F) and D ($L_A'$, F') are calculated based upon F and F' having been determined in steps S271 and S272.

[Expression 70]

$$D(L_A, F) = F\left[1 - \left(\frac{1}{3,6}\right)e^{\left(\frac{-(L_A+42)}{92}\right)}\right] \quad (70)$$

[Expression 71]

$$D(L_A', F') = F'\left[1 - \left(\frac{1}{3,6}\right)e^{\left(\frac{-(L_A'+42)}{92}\right)}\right] \quad (71)$$

Since the processing executed in steps S223 and S27~S30 is similar to that executed in the fourteenth embodiment, as shown in FIG. 24, a repeated explanation is not provided. Namely, the processing executed in the fourteenth embodiment may be modified by executing step S271 instead of step S221, executing step S272 instead of step S222 and executing step S273 prior to step S223.

It is to be noted that the adapted luminance levels $L_A$ and $L_A'$ may be calculated through a method other than that described above, as long as the adapted luminance levels can be determined in correspondence to the conversion target pixel.

Likewise, the adapted luminance levels may be calculated in any variation 1~7 of the fourteenth embodiment by using the relative brightness value y representing the average of the brightness values at a predetermined number of pixels surrounding the conversion target pixel or the relative brightness value y of the representative color. While a detailed explanation is not provided, the processing may be modified by executing step S271 instead of step S221, executing step S272 instead of step S222 and executing step S273 prior to step S223 in such a case.

Furthermore, the adapted luminance levels may be calculated by using the relative brightness value y representing the average of the brightness values at a predetermined number of pixels surrounding the conversion target pixel in the thirteenth embodiment, as well. In such a case, the processing may be modified by executing step S271 in FIG. 29 instead of step S211, executing step S272 in FIG. 29 instead of step S212 and simply calculating $L_A$ and $L_A'$ constituting part of step S273 in FIG. 29 prior to step S213.

Fifteenth Embodiment

In case that the adaptation factors are adjusted in correspondence to h*, in the fourteenth embodiment, the average adaptation factor values over the full hue range assume values determined respectively in correspondence to the scene illumination conditions under which the input image is obtained or the input image viewing condition and in correspondence to the output image viewing condition. During this process, the hue-dependent adaptation factors are calculated as; $D_{h*0}$ (h*)=$D_0$ (h*)·D ($L_A$, F) and $D_{h*0}'$ (h*)=$D_0$ (h*)·D ($L_A'$, F') in relation to the adaptation factor value D ($L_A$, F) representing the average over the full hue range.

In the fifteenth embodiment, too, the average adaptation factor values over the full hue range assume values D ($L_A$, F) determined respectively in correspondence to the scene illumination conditions under which the input image is obtained or the input image viewing condition and in correspondence to the output image viewing condition. However, the hue-dependent adaptation factors are calculated differently in the fifteenth embodiment.

In this embodiment, too, a color appearance test similar to that explained in reference to the first embodiment is first conducted in a given viewing condition X (the adapted luminance $L_{AX}$, and the parameter $F_X$ determined in correspondence to the ambient light level) and the hue dependency $D_X$ (h*) of the adaptation factor in the viewing condition X is ascertained as shown in FIG. 2. Then, the hue-dependent component $D_1$ (h*) unaffected by the adapted luminance or the ambient light level is extracted from $D_X$ (h*).

[Expression 72]

$$D_1(h^*) = D_X(h^*) - D(L_{A\_X}, F_X) \qquad (72)$$

[Expression 73]

$$D(L_{A\_X}, F_X) = F_X\left[1 - \left(\frac{1}{3,6}\right)e^{\left(\frac{-(L_{A\_X}+42)}{92}\right)}\right] \qquad (73)$$

$D_1$ (h*) thus calculated is then saved into the storage medium in the personal computer 1, which executes the processing in the fifteenth embodiment.

Since the flow of processing executed in the personal computer 1 in the fifteenth embodiment is similar to that executed in the fourteenth embodiment, the following explanation is given in reference to FIG. 24 showing the flow of processing executed in the fourteenth embodiment. The flow of processing executed in the personal computer 1 in the fifteenth embodiment is identical to the flow of processing executed in the personal computer 1 in the fourteenth embodiment except for the processing executed in step S223.

In step S223, $D_{h*1}$ (h*) and $D_{h*1}'$ (h*) are calculated as expressed below, instead of $D_{h*0}$ (h*)=$D_0$ (h*)·D ($L_A$, F) and $D_{h*0}'$ (h*)=$D_0$ (h*)·D ($L_A'$, F')

[Expression 74]

$$D_{h*1}(h^*)=D_1(h^*)+D(L_A,F) \qquad (74)$$

[Expression 75]

$$D_{h*1}'(h^*)=D_1(h^*)+D(L_A',F') \qquad (75)$$

Since the processing is otherwise executed as shown in FIG. 24 in reference to which the fourteenth embodiment has been described, a detailed explanation is not provided. In short, subtraction with a lighter processing load, instead of the division executed in the fourteenth embodiment, is executed to calculate the hue-dependent component of the adaptation factors through the advanced color appearance tests and the method adopted for the adaptation factor calculation executed by the personal computer 1 in step S223 in the fourteenth embodiment may be modified accordingly.

The fifteenth embodiment may also be adopted in any of variations 1~7 of the fourteenth embodiment by determining in advance $D_1$ (h*) through color appearance tests, as expressed below.

[Expression 76]

$$D_1(h^*) = D_X(h^*) - D(L_{A\_X}, F_X) \qquad (76)$$

[Expression 77]

$$D(L_{A\_X}, F_X) = F_X\left[1 - \left(\frac{1}{3,6}\right)e^{\left(\frac{-(L_{A\_X}+42)}{92}\right)}\right] \qquad (77)$$

During the processing executed by the personal computer 1, $D_{h*1}$ (h*) and $D_{h*}$ (h*) may be calculated in step S223 as expressed below, instead of $D_{h*0}$ (h*)=$D_0$ (h*)·D($L_A$, F) and $D_{h*0}'$ (h*)=$D_0$ (h*)·D ($L_A'$, F')

[Expression 78]

$$D_{h*1}(h^*)=D_1(h^*)+D(L_A,F) \qquad (78)$$

[Expression 79]

$$D_{h*1}'(h^*)=D_1(h^*)+D(L_A',F') \qquad (79)$$

$D_1$ (h*) may be calculated and the processing executed in step S223 may be modified in much the same way as in the initial description of the fifteenth embodiment. In addition, since the processing may be otherwise executed in the personal computer 1, as in variations 1~7 of the fourteenth embodiment, a repeated explanation is not provided.

Furthermore, as has been described in reference to the other variations of the fourteenth embodiment, the adapted luminance levels may each be calculated by using the relative brightness value representing the average of the brightness values y at a predetermined number of pixels surrounding the conversion target pixel or the relative brightness value y of the representative color instead of calculating a uniform adapted luminance for the entire image. In such a case, the processing may be modified as has been explained in reference to the other variations of the fourteenth embodiment, simply by calculating $D_{h*1}$ (h*) and $D_{h*1}'$ (h*) in step S223, as expressed below instead, by calculating $D_{h*0}$ (h*)=$D_0$ (h*)·D ($L_A$, F) and $D_{h*0}'$ (h*)=$D_0$ (h*)·D ($L_A'$, F') and thus, a detailed explanation of the processing is not repeated.

[Expression 80]

$$D_{h*1}(h^*)=D_1(h^*)+D(L_A,F) \qquad (80)$$

[Expression 81]

$$D_{h*1}'(h^*)=D_1(h^*)+D(L_A',F') \qquad (81)$$

Sixteenth Embodiment

In the fourteenth embodiment, the adaptation factor is calculated as $D_{h*0}$ (h*)=$D_0$ (h*)·D ($L_A$, F) by using the hue-dependent component $D_0$ (h*) and the viewing condition-dependent component D ($L_A$, F). In the fifteenth embodiment, the adaptation factor is calculated as $D_{h*1}$ (h*)=$D_1$ (h*)·D ($L_A$, F) by using the hue-dependent component $D_1$ (h*) and the viewing condition-dependent component D ($L_A$, F). Through the fourteenth and fifteenth embodiment, the adaptation factor in another viewing condition can be estimated with ease simply by determining the hue dependency characteristics of the adaptation factor in a given viewing condition.

In the sixteenth embodiment, a color appearance test similar to that explained in reference to the first embodiment is first conducted in a given viewing condition X (the adapted luminance $L_{AX}$ and the parameter $F_X$ determined in correspondence to ambient light level) and the hue dependency $D_X$ (h*) of the adaptation factor in the viewing condition X is ascertained, as shown in FIG. 2. Then, the hue-dependent component $D_2$ (h*) is extracted from $D_X$ (h*), as in the fifteenth embodiment.

[Expression 82]

$$D_2(h^*) = D_X(h^*) - D(L_{A\_X}, F_X) \quad (82)$$

[Expression 83]

$$D(L_{A\_X}, F_X) = F_X \left[1 - \left(\frac{1}{3,6}\right)e^{\left(\frac{-(L_{A\_X}+42)}{92}\right)}\right] \quad (83)$$

Likewise, a color appearance test is conducted in a viewing condition Y different from the viewing condition X (the adapted luminance $L_{AY}$, and the parameter $F_Y$ determined in correspondence to ambient light level) and the hue dependency $D_Y$ (h*) of the adaptation factor in the viewing condition X is ascertained, as shown in FIG. 2. Then, the hue-dependent component $D_2'$ (h*) is extracted from $D_Y$ (h*).

[Expression 84]

$$D_2'(h^*) = D_X(h^*) - D(L_{A\_Y}, F_Y) \quad (84)$$

[Expression 85]

$$D(L_{A\_Y}, F_Y) = F_Y \left[1 - \left(\frac{1}{3,6}\right)e^{\left(\frac{-(L_{A\_Y}+42)}{92}\right)}\right] \quad (85)$$

As long as $D_2$ (h*) determined in the viewing condition X and $D_2'$ (h*) determined in the viewing condition Y are perfectly matched, the adaptation factors can be calculated with an acceptable level of accuracy by adopting the fifteenth embodiment. However, FIG. 22 indicates that the hue-dependent component (e.g., the amplitude), which does not include the average value, takes on different values in different viewing conditions. This means that $D_2$ (h*) and $D_2'$ (h*) do not match exactly.

Accordingly, the hue dependency of the adaptation factor in a plurality of viewing conditions is investigated, the adaptation factor is calculated as; D (h*)=α ($L_a$, F)+β ($L_a$, F)×γ (h*), so as to ensure that the hue dependency characteristics of the adaptation factor in a different viewing condition can be estimated more accurately.

First, color appearance tests similar to those described earlier are conducted in a plurality of viewing conditions to determine $D_3$ ($L_A$, F, h*) as expressed below;

[Expression 86]

$$D_3(L_A,F,h^*)=D_X(h^*)-D(L_A,F) \quad (86)$$

Then, $D_5$ (h*) is calculated as expressed below by designating part of the hue-dependent component $D_3$ ($L_A$, F, h*), the amplitude of which is affected by the viewing condition, as $D_4$ ($L_A$, F).

[Expression 87]

$$D_5(h^*)=D_3(L_A,F,h^*)/D_4(L_A,F) \quad (87)$$

$D_4$ ($L_A$, F) and $D_5$ (h*) thus calculated are saved in advance into the storage medium in the personal computer 1 engaged in the processing in the fifteenth embodiment.

Since the flow of processing executed in the personal computer 1 in the sixteenth embodiment is similar to that executed in the fourteenth embodiment, the following explanation is given in reference to FIG. 24 showing the flow of processing executed in the fourteenth embodiment. The flow of processing executed in the personal computer 1 in the sixteenth embodiment is identical to the flow of processing executed in the personal computer 1 in the fourteenth embodiment except for the processing executed in step S223.

In step S223, $D_{h*5}$ (h*) and $D_{h*5}'$ (h*) are calculated as expressed below, instead of $D_{h*0}$ (h*)=$D_{h*0}$ (h*)·D ($L_A$, F) and $D_{h*0}'$ (h*)=$D_0$ (h*)·D ($L_A'$, F').

[Expression 88]

$$D_{h*5}(h^*)=D(L_A,F)+D_4(L_A,F)·D_5(h^*) \quad (88)$$

[Expression 89]

$$D_{h*5}'(h^*)=D(L_A',F')+D_4(L_A',F')·D_5(h^*) \quad (89)$$

Since the processing is otherwise executed as shown in FIG. 24 in reference to which the fourteenth embodiment has been described, a detailed explanation is not provided. Namely, the processing in the fourteenth embodiment is modified so as to reflect with better accuracy the hue-dependent component and the viewing condition-dependent component of the adaptation factor calculated in advance through the color appearance tests and the method adopted for the adaptation factor calculation executed by the personal computer 1 in step S223 is modified accordingly.

In addition, the sixteenth embodiment allows for variations similar to variations 1~7 of the fourteenth embodiment. Namely, during the processing executed by the personal computer 1, $D_{h*5}$ (h*) and $D_{h*5}'$ (h*) may be calculated in step S223, as expressed below, instead of $D_{h*0}$ (h*)=$D_0$ (h*)·D ($L_A$, F) and $D_{h*0}'$ (h*)=$D_0$ (h*)·D ($L_A'$, F').

[Expression 90]

$$D_{h*5}(h^*)=D(L_A,F)+D_4(L_A,F)·D_5(h^*) \quad (90)$$

[Expression 91]

$$D_{h*5}'(h^*)=D(L_A'F')+D_4(L_A',F')·D_5(h^*) \quad (91)$$

$D_5$(h*) may be calculated and the processing executed in step S223 may be modified in much the same way as in the initial description of the sixteenth embodiment. In addition, since the processing may be otherwise executed in the personal computer 1, as in variations 1~7 of the fourteenth embodiment, a repeated explanation is not provided.

Furthermore, as has been described in reference to the other variations of the fourteenth embodiment, the adapted luminance levels may each be calculated by using the relative brightness value y representing the average of the brightness values at a predetermined number of pixels surrounding the conversion target pixel or the relative brightness value y of the representative color instead of calculating a uniform adapted luminance for the entire image. In such a case, the processing may be modified as has been explained in reference to the other variations of the fourteenth embodiment, simply by calculating $D_{h*5}(h^*)$ and $D_{h*5}'(h^*)$ in step S223 expressed below, instead of calculating $D_{h*0}(h^*) = D_0(h^*) \cdot D(L_A, F)$ and $D_{h*0}'(h^*) = D_0(h^*) \cdot D(L_A', F')$ and thus, a detailed explanation of the processing is not repeated.

[Expression 92]

$$D_{h*5}(h^*) = D(L_A, F) + D_4(L_A, F) \cdot D_5(h^*) \tag{92}$$

[Expression 93]

$$D_{h*5}'(h^*) = D(L_A', F') + D_4(L_A', F') \cdot D_5(h^*) \tag{93}$$

Seventeenth Embodiment

In the thirteenth through sixteenth embodiments, the hue-dependent component in the adaptation factor is altered in correspondence to the viewing condition. However, in a dark viewing condition, the rod cells are fully active in brightness/darkness recognition as well as the cone cells which are color sensitive. Namely, at 100 Cd/m² or lower, e.g., the range in which the rod cells are assumed to be engaged in low-light vision, the hue dependency of the adaptation factor tends to be less pronounced due to the effect of the rod cell response. This tendency can be confirmed in FIG. 22, which indicates smaller amplitude at a lower adapted luminance.

Accordingly, an adapted luminance value La_limit, beyond which the effect of the hue dependency can be disregarded, is set in advance and hue dependency is not taken into consideration at adapted luminance levels equal to or less than the threshold value. For instance, a predetermined threshold value La_limit may be used in the sixteenth embodiment so that;

$D_4(L_A, F) = 0$ when $La < La\_limit$ and $D_4(L_A, F) \neq 0$ when $La \geq La\_limit$.

It is to be noted that since the function of the rod cells is affected by the ambient light level as well as the adapted luminance $L_A$, it is desirable to select an optimal value for the threshold value La_limit also in correspondence to the ambient light level. For instance, a plurality of values under a plurality of conditions corresponding to varying levels of ambient light maybe set as shown in FIG. 30, so as to select La_limit under the correct condition corresponding to the viewing condition or the scene illumination conditions or to calculate an optimal value for La_limit through interpolation based upon the two La_limit values under two different conditions similar to the current condition.

It is to be noted that since rod cell saturation occurs at a brightness level of approximately 100 Cd/m², the threshold value may be set to ensure that La_limit is equal to or less than approximately 100 Cd/m².

Variations of the Seventeenth Embodiment

Since the threshold value La_limit, which is dependent upon the working of the photoreceptor cells, the optimal threshold value changes in correspondence to the characteristics of individual observers. Accordingly, each observer may participate in an optimal adaptation factor evaluation test conducted a plurality of times at varying adapted luminance levels in conjunction with a color (e.g., yellow or blue) with pronounced hue dependency, and the optimal threshold value La_limit may be set for the particular observer based upon the test results.

In addition, the degree of adaptation, as well as the threshold value La_limit, varies among individual subjects and accordingly, an image achieving an optimal appearance for each observer may be provided by adjusting $D_0(h^*)$ in the fourteenth embodiment, $D_1(h^*)$ in the fifteenth embodiment, $D_4(L_A, F)$ and $D_5(h^*)$ in the sixteenth embodiment, $D(L_A, F)$ in the fourteenth through sixteenth embodiments or the like in correspondence to the individual observers.

It is to be noted that the hue-dependent component is added in reference to $D(L_A, F)$ defined in the CIECAM02 in the fourteenth through seventeenth embodiment. According to the CIECAM02 definition, $D(L_A, F)$ changes within the range of $0.6 \leq D(L_A, F) \leq 1.0$ in varying viewing conditions. This means that the optimal adaptation factor value in another viewing condition estimated based upon the adaptation factor value in a specific viewing condition, as in the fourteenth through seventeenth embodiments, maybe greater than 1 or less than 0. Under such circumstances, it is desirable to execute processing so as to ensure that the adaptation factor calculated as described above falls within the range of 0 to 1.

It also is to be noted that as long as the average of the optimal adaptation factors along the hue direction, —calculated as;

[Expression 94]

$$\int_0^{2\pi} D_X(h^*) dh^*/(2\pi) \tag{94}$$

or

[Expression 95]

$$\Sigma_0^{N-1} D_X(h^*)/N \tag{95}$$

(N indicates the number of partitions into which the subject color, based upon which the optimal adaptation factor is evaluated in the color appearance tests, is divided along the hue direction); based upon the hue dependency $D_X(h^*)$ of the adaptation factor in a given viewing condition X (adapted luminance $L_{A\_X}$, the parameter $F_X$ determined based upon ambient light level) in any of the fourteenth through seventeenth embodiments—matches the adaptation factor value calculated as defined in the CIECAM02 as;

[Expression 96]

$$D(L_{A\_X}, F_X) = F_X \left[ 1 - \left(\frac{1}{3,6}\right) e^{\left(\frac{-(L_{A\_X}+42)}{92}\right)} \right], \tag{96}$$

the average of the adaptation factors $D_{h*0}(h^*)$ or the like along the hue direction in another viewing condition, determined by adopting any of the fourteenth through seventeenth embodiments, too, will match the adaptation factor value calculated based upon the CIECAM02 definition. Accordingly, if the average of $D_X(h^*)$ along the hue direction, obtained through the color appearance tests, does not match the adaptation factor value calculated based upon the CIECAM02 definition, processing may be executed to correct any test error, i.e., test error correction processing may be executed to correct the $D_X(h^*)$ average.

It is to be noted that in the fourteenth through seventeenth embodiments and the variations thereof, $D(L_A, F)$ and $D(L_A', F')$, defined as;

[Expression 97]

$$D(L_A, F) = F\left[1 - \left(\frac{1}{3,6}\right)e^{\left(\frac{-(L_A+42)}{92}\right)}\right] \tag{97}$$

-continued

[Expression 98]

$$D'(L'_A, F') = F'\left[1 - \left(\frac{1}{3,6}\right)e^{\left(\frac{-(L'_A+42)}{92}\right)}\right] \quad (98)$$

in the CIECAM02 model, are used as the adaptation factors representing the averages over the full hue range, which are determined in correspondence to the scene illumination conditions under which the input image is obtained or the input image viewing condition and in correspondence to the output image viewing condition. However, adaptation factors calculated by using relational expressions other than those above may be used, as long as they are determined based upon parameters related to the viewing conditions, such as the adapted luminance $L_A$ under the scene illumination conditions in which the input image is obtained or in the input image viewing condition, the adapted luminance $L_A'$ in the output image viewing condition and the ambient light level parameters F and F'.

In addition, as explained earlier, the adapted luminance $L_A$ under the scene illumination conditions in which the input image is obtained or in the input image viewing condition and the adapted luminance $L_A'$ in the output image viewing condition, are respectively dependent upon the scene illumination brightness or the illumination brightness $Y_{w0}$ in the input image viewing condition and the illumination brightness $Y_{w0}'$ in the output image viewing condition. Accordingly, functions of $Y_{w0}$ and $Y_{w0}'$, i.e., $D(Y_{w0}, F)$ and $D(Y_{w0}', F')$, may be used in place of $D(L_A, F)$ and $D(L_A', F')$.

In each of the first through fifth embodiments and eighth through seventeenth embodiment described above, the information related to the photographic scene illumination and the information related to the image viewing condition are obtained and the adaptation factors are adjusted based upon the individual sets of information in correspondence to the color. In addition, in the sixth and seventh embodiments, adaptation factors are adjusted to assume different values in correspondence to the color in two different viewing conditions. However, processing may be executed so as to alter the adaptation factor in correspondence to the color only in either one of the two different viewing conditions.

In addition, while an explanation is given above on an example in which L*, C* and h* in the CIELAB are used respectively for the lightness, the saturation and the hue parameters related to the lightness, the saturation and the hue in a color space other than the CIELAB may be utilized instead. For instance, J, C and h in a relative color space of the CIECAM02, Q, M and h in an absolute color space of the CIECAM02 or parameters in any other color space may be utilized.

It is to be noted that any of the first embodiment and the sixth through seventeenth embodiments may be adopted in diverse color conversion methods executed by taking into consideration chromatic adaptation, such as the CIECAM02 color appearance model and the von Kries chromatic adaptation transform executed by taking into consideration the white point conversion alone.

Eighteenth Embodiment

In the first embodiment described earlier, an adaptation factor indicating an extent of incomplete adaptation is adjusted in correspondence to the hue of the conversion target color so as to assure better accuracy in the appearance of the reproduced color. The eighteenth embodiment is character-ized in that the hue dependency is either factored in or not factored in depending upon the saturation level of the conversion target pixel.

(Color Appearance Test Results)

A color appearance test similar to that explained in reference to the first embodiment is conducted in a given viewing condition X (the adapted luminance $L_{A\_X}$, the parameter $F_X$ determined in correspondence to the ambient light level) and the hue dependency $D_X$ (h*) of the adaptation factor in the viewing condition X is ascertained, as shown in FIG. 2. Then, the hue-dependent component $D_1$ (h*) unaffected by the adapted luminance or the ambient light level is extracted from $D_X$(h*).

[Expression 99]

$$D_1(h^*) = D_X(h^*) - D(L_{A\_X}, F_X) \quad (99)$$

[Expression 100]

$$D(L_{A\_X}, F_X) = F_X\left[1 - \left(\frac{1}{3,6}\right)e^{\left(\frac{-(L_{A\_X}+42)}{92}\right)}\right] \quad (100)$$

Based upon $D_1$ (h*), the hue dependency of the adaptation factor in a given viewing condition (the adapted luminance $L_A$, the parameter F determined in correspondence to ambient light level) can be estimated as expressed below.

[Expression 101]

$$D_{h*}(L_A,F,h^*) = D(L_A,F) + D_2(L_A,F) \cdot D_1(h^*) \quad (101)$$

It is to be noted that $D(L_A, F)$ is to be determined in advance by conducting color appearance tests to observe changes occurring in the hue-dependent amplitude in a plurality of viewing conditions.

As the saturation level becomes lower and closer to the grey axis, hues become less distinct and thus, hue dependency such as that described above becomes less pronounced. Accordingly, data such as those shown in FIG. 2 may be obtained in advance at varying saturation levels and a maximum saturation level $C_0^*$, at which the hue dependency can be disregarded, may be determined. In the state in which the hue dependency can be disregarded, the hue dependency characteristics curve in the graph presented in FIG. 2 remains flat without any significant increase or decrease or the difference (e.g., ΔE in the CIELAB) between the color, resulting from conversion executed at a given adaptation factor D, and the color resulting from conversion executed at an adaptation factor $(D+\Delta D_{h*})$ is equal to or less than a specific threshold value with respect to the amplitude $\Delta D_{h*}$ of the graph.

(Conversion Processing)

Figure 31:
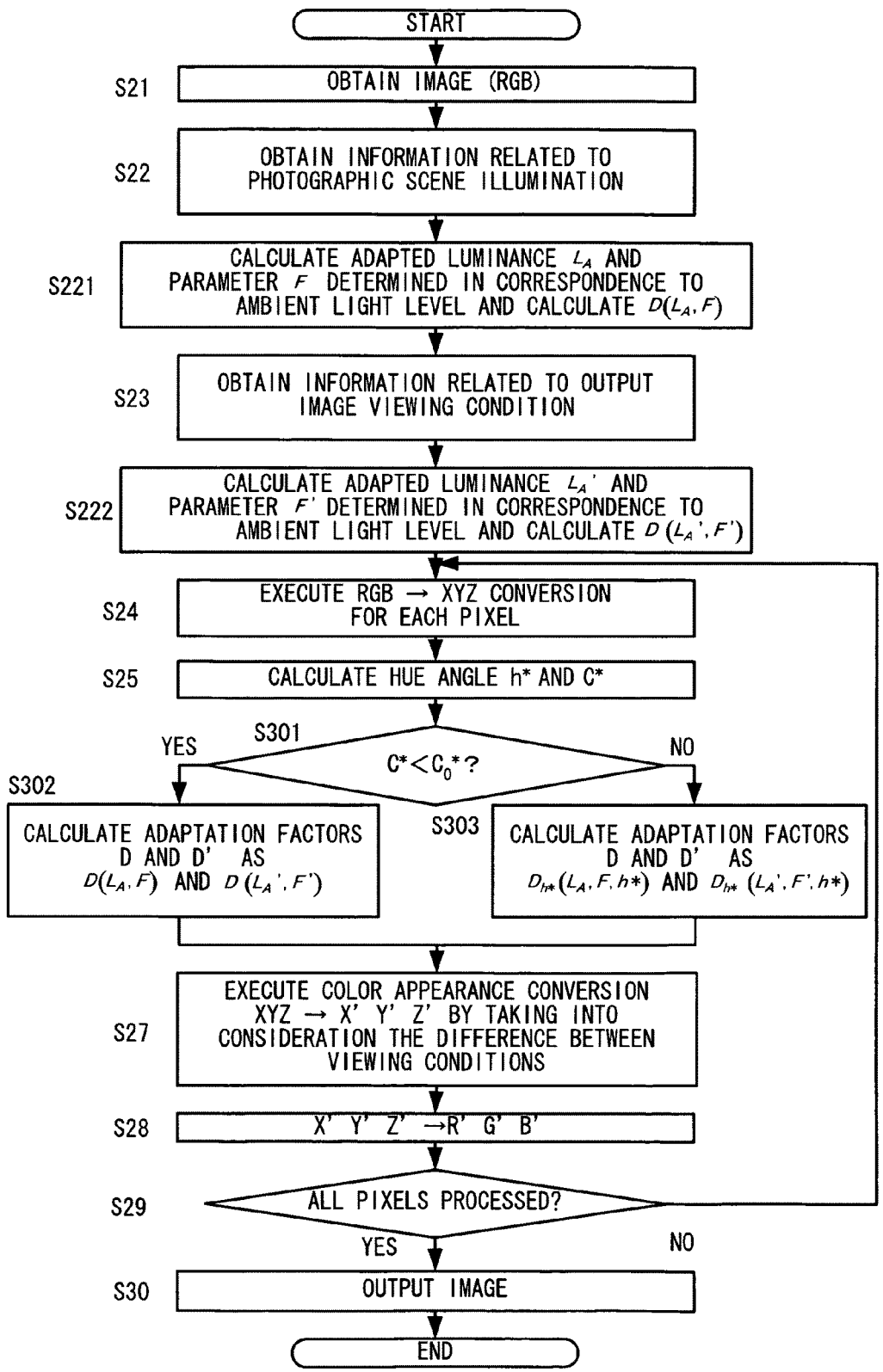

Next, the color conversion processing is described. The processing in the eighteenth embodiment is executed by the personal computer 1 in a configuration similar to that shown in FIG. 1 illustrating the first embodiment. FIG. 31 presents a flowchart of the processing executed in the personal computer 1 in the eighteenth embodiment. The relationship $D_{h*}$ (h*) between the optimal adaptation factor and the hue, ascertained through testing such as that described above, may be saved in advance into the image processing program in the form of a table or an approximating expression. As an alternative, the relationship $D_{h*}$ (h*) may be saved as data to be referenced by the program into a storage device or a memory of the personal computer 1.

The same step numbers are assigned to those in which processing similar to that executed in the first embodiment, as shown in FIG. 3, is executed. First, a photographic image is obtained in step S21, as in the first embodiment. The photographic image, constituted of a plurality of pixels, is described in the color space RGB inherent to the spectral sensitivity of the camera.

The operation then proceeds to step S22. In step S22, information related to the photographic scene illumination is obtained. Namely, information indicating the illumination white point ($X_w, Y_w, Z_w$) and the luminance $Y_{w0}$ of the photographic scene illumination and the ambient light level $Y_{sw0}$ in the photographic scene is obtained. For instance, values input by the user (observer) via a keyboard, indicating the results obtained by measuring the white point and the brightness levels via a spectroradiometer or the like, may be read. Alternatively, the photographing illumination white point ($X_w, Y_w, Z_w$) may be calculated by engaging the auto white balance function of the digital camera and the photographing illumination brightness $Y_{w0}$ may be calculated by analyzing the results provided by engaging the photometering function, which is utilized for purposes of automatic exposure adjustment. The ambient light level $Y_{sw0}$ may be calculated based upon the results obtained by executing photometering over a wider range or a value indicated in information input in advance by the photographer and appended to the image or a value input by the photographer via a keyboard may used as the ambient light level $Y_{sw0}$.

In step S221, the adapted luminance $L_A$ and the parameter F determined in correspondence to the ambient light level is calculated by using the information related to the photographic scene illumination having been obtained in step S22. In this embodiment, the parameter F is calculated through interpolation based upon the ratio of $Y_{w0}$ and $Y_{sw0}$ by referencing a table defined in conformance to the CIECAM02 model. In addition, $L_A$ is calculated as; $L_A=Y_{w0}/5$. However, $L_A$ and F maybe calculated through methods other than those described above. For instance, $L_A$ may be estimated based upon the average brightness of the entire image or $L_A$ may be calculated as; $L_A=m\cdot Y_{w0}/100$ with m representing the percentage (%) of the average brightness of the entire image relative to the white brightness value. Next, D ($L_A$, F) is calculated by using $L_A$ and F in expression (2) for substitution.

[Expression 102]

$$D = D(L_A, F) = F\left[1 - \left(\frac{1}{3,6}\right)e^{\left(\frac{-(L_A+42)}{92}\right)}\right] \quad (102)$$

In step S23, information related to the image viewing condition is obtained. Assuming that an image on display at a monitor is observed in standard viewing conditions, the image viewing condition is the sRGB standard viewing conditions (white point=D65, luminance $Y_{device0}'=80$ Cd/m$^2$, ambient light white point=D50, ambient light level $Y_{sw0}'=4.1$ Cd/m$^2$). If, on the other hand, the image is observed in a viewing condition other than the sRGB standard viewing conditions or an image printout is observed, the personal computer 1 may read the device white point ($X_{device}', Y_{device}', Z_{device}'$) and the device luminance $Y_{device0}'$ of the device used for the image observation and the ambient light white point ($X_{sw}', Y_{sw}', Z_{sw}'$) and the ambient light level $Y_{sw0}'$, input by the user (observer) via a keyboard or the like and determine the illumination white point ($X_w', Y_w', Z_w'$) in the image viewing condition by integrating the device white point and the ambient light white point and the luminance $Y_{w0}'$ in the image viewing condition.

More specifically, the information may be obtained through the calculation expressed below based upon a ratio $R_{mix}'$ of the influences of the device light source and the illumination light source used for the image observation.

[Expression 103]

$$\begin{pmatrix} L_{device}' \\ M_{device}' \\ S_{device}' \end{pmatrix} = M_{CAT02} \begin{pmatrix} X_{device}' \\ Y_{device}' \\ Z_{device}' \end{pmatrix} \quad (103)$$

[Expression 104]

$$\begin{pmatrix} L_{SW}' \\ M_{SW}' \\ S_{SW}' \end{pmatrix} = M_{CAT02} \begin{pmatrix} X_{SW}' \\ Y_{SW}' \\ Z_{SW}' \end{pmatrix} \quad (104)$$

[Expression 105]

$$L_w' = \frac{R_{mix}' \cdot Y_{device0}'^{1/3} \cdot L_{device}' + (1 - R_{mix}') \cdot Y_{sw0}'^{1/3} \cdot L_{sw}'}{R_{mix}' \cdot Y_{device0}'^{1/3} + (1 - R_{mix}') \cdot Y_{sw0}'^{1/3}}$$

$$M_w' = \frac{R_{mix}' \cdot Y_{device0}'^{1/3} \cdot M_{device}' + (1 - R_{mix}') \cdot Y_{sw0}'^{1/3} \cdot M_{sw}'}{R_{mix}' \cdot Y_{device0}'^{1/3} + (1 - R_{mix}') \cdot Y_{sw0}'^{1/3}}$$

$$S_w' = \frac{R_{mix}' \cdot Y_{device0}'^{1/3} \cdot S_{device}' + (1 - R_{mix}') \cdot Y_{sw0}'^{1/3} \cdot S_{sw}'}{R_{mix}' \cdot Y_{device0}'^{1/3} + (1 - R_{mix}') \cdot Y_{sw0}'^{1/3}} \quad (105)$$

[Expression 106]

$$\begin{pmatrix} X_W' \\ Y_W' \\ Z_W' \end{pmatrix} = (M_{CAT02})^{-1} \begin{pmatrix} L_W' \\ M_W' \\ S_W' \end{pmatrix} \quad (106)$$

[Expression 107]

$$Y_{w0}' = (R_{mix}' \cdot Y_{device0}'^{1/3} + (1 - R_{mix}') \cdot Y_{sw0}'^{1/3})^3 \quad (107)$$

[Expression 108]

$$M_{CAT02} = \begin{pmatrix} 0.7328 & 0.4296 & -0.1624 \\ -0.7036 & 1.6975 & 0.0061 \\ 0.0030 & 0.0136 & 0.9834 \end{pmatrix} \quad (108)$$

In step S222, the adapted luminance $L_A'$ and the parameter F' determined in correspondence to the ambient light level is calculated by using the information related to the image viewing condition having been obtained in step S23. In this embodiment, the parameter F' is calculated through interpolation based upon the ratio of $Y_{w0}'$ and $Y_{sw0}'$ by referencing a table defined in conformance to the CIECAM02 model. In addition, $L_A'$ is calculated as $L_A'=Y_{w0}'/5$. However, $L_A$ and F' may be calculated through method other than those described above. For instance, $L_A'$ may be estimated based upon the average brightness of the entire image or $L_A'$ may be calculated as $L_A'=m\cdot Y_{w0}'/100$ with m representing the percentage (%) of the average brightness of the entire image relative to the white brightness value. Next, D ($L_A'$, F') is calculated by using $L_A'$ and F' in expression (2) for substitution.

[Expression 109]

$$D' = D(L_A', F') = F'\left[1 - \left(\frac{1}{3,6}\right)e^{\left(\frac{-(L_A'+42)}{92}\right)}\right] \quad (109)$$

The operation then proceeds to step S24. The processing in steps S24~S28 is repeatedly executed until all the pixels are processed. Since camera RGB data are expressed in the inherent color space RGB determined based upon the camera spectral sensitivity, the data are converted to data in CIE 1931 XYZ color space by using a predetermined camera RGB→XYZ matrix $M_{RGB \to XYZ}$.

[Expression 110]

$$\begin{pmatrix} X \\ Y \\ Z \end{pmatrix} = M_{RGB \to XYZ} \cdot \begin{pmatrix} R \\ G \\ B \end{pmatrix} \quad (110)$$

The operation then proceeds to step S25 to calculate the hue angle h* and the saturation level C* of the conversion target pixel. The CIE XYZ data are converted to CIELAB data and the angle formed in the a*b* coordinate system is calculated in the 0~360° range as the hue angle h*. The saturation level is calculated as; $C^* = (a^{*2} + b^{*2})^{1/2}$.

The operation then proceeds to step S301 to make a decision as to whether or not the saturation level C* is within a predetermined range ($C^* < C_0^*$) over which the extent of the hue dependency is not significant.

If an affirmative decision is made in step S301, the operation proceeds to step S302 to calculate an adaptation factor D under the photographic scene illumination conditions and an adaptation factor D' in the output image viewing condition. In more specific terms, D and D' are calculated respectively as D ($L_A$, F) based upon $L_A$ and F having been determined in step S221 and as D ($L_A'$ F') based upon $L_A'$ and F' having been determined in step S222.

[Expression 111]

$$D = D(L_A, F) \quad (111)$$

[Expression 112]

$$D' = D(L_A', F') \quad (112)$$

If, on the other hand, a negative decision is made in step S301, the operation proceeds to step S303 to calculate an adaptation factor D under the photographic scene illumination conditions and an adaptation factor D' in the output image viewing condition by using the adaptation factor relational expressions incorporating the hue dependency, having been obtained in advance by conducting color appearance tests.

[Expression 113]

$$D = D_{h*}(L_A, F, h^*) = D(L_A, F) + D_2(L_A, F) \cdot D_1(h^*) \quad (113)$$

[Expression 114]

$$D' = D_{h*}(L_A', F', h^*) = D(L_A', F') + D_2(L_A', F') \cdot D_1(h^*) \quad (114)$$

In step S27, a color X'Y'Z' taking on an appearance under the image observation illumination condition, which is close to the appearance of the color XYZ as perceived under the photographic scene illumination conditions, is calculated based upon the difference between the viewing conditions having been ascertained in steps S22 and S23 and D and D' having been calculated in step S302 or step S303. The color appearance model used in this step may be a chromatic adaptation transform expression that factors in the difference between the viewing conditions, such as the CIECAM02 model or the von Kries chromatic adaptation model. If the CIECAM02 model is used, D calculated in step S302 or step S303 may be used in place of the adaptation factor D calculated as expressed in the defining expression when converting the XYZ data to JCh data and D' may be used when converting the JCh data to X'Y'Z' data. If the von Kries chromatic adaptation transform expression is used, the color conversion may be executed as expressed below.

[Expression 115]

$$\begin{pmatrix} X_W' \\ Y_W' \\ Z_W' \end{pmatrix} = (M_{CAT02})^{-1} \cdot M_h \cdot M_{CAT02} \cdot \begin{pmatrix} X_W \\ Y_W \\ Z_W \end{pmatrix} \quad (115)$$

provided

[Expression 116]

$$M_h = \begin{pmatrix} \dfrac{L_{W,D}'}{L_{W,D}} & 0.0 & 0.0 \\ 0.0 & \dfrac{M_{W,D}'}{M_{W,D}} & 0.0 \\ 0.0 & 0.0 & \dfrac{S_{W,D}'}{S_{W,D}} \end{pmatrix} \quad (116)$$

[Expression 117]

$$L_{W,D} = \dfrac{L_W}{Y_W \cdot D + L_W \cdot (1 - D)} \quad (117)$$

$$M_{W,D} = \dfrac{M_W}{Y_W \cdot D + M_W \cdot (1 - D)}$$

$$S_{W,D} = \dfrac{S_W}{Y_W \cdot D + S_W \cdot (1 - D)}$$

[Expression 118]

$$L_{W,D}' = \dfrac{L_W'}{Y_W' \cdot D' + L_W' \cdot (1 - D')} \quad (118)$$

$$M_{W,D}' = \dfrac{M_W'}{Y_W' \cdot D' + M_W' \cdot (1 - D')}$$

$$S_{W,D}' = \dfrac{S_W'}{Y_W' \cdot D' + S_W' \cdot (1 - D')}$$

[Expression 119]

$$\begin{pmatrix} L_W \\ M_W \\ S_W \end{pmatrix} = M_{CAT02} \cdot \begin{pmatrix} X_W \\ Y_W \\ Z_W \end{pmatrix} \quad (119)$$

[Expression 120]

$$\begin{pmatrix} L_W' \\ M_W' \\ S_W' \end{pmatrix} = M_{CAT02} \cdot \begin{pmatrix} X_W' \\ Y_W' \\ Z_W' \end{pmatrix} \quad (120)$$

The operation then proceeds to step S28 to convert the X'Y'Z' data to data in the color space R'G'B' to be used as the output image. $M_{XYZ \to sRGB}$ is a matrix used to convert XYZ data to data in the color space RGB to be used as the output image and assuming that the output image is expressed with data in the color space sRGB, a matrix predetermined in conformance to the standard may be used.

[Expression 121]

$$\begin{pmatrix} R' \\ G' \\ B' \end{pmatrix} = M_{XYZ \to sRGB} \cdot \begin{pmatrix} X' \\ Y' \\ Z' \end{pmatrix} \quad (121)$$

If it is decided in step S29 that the processing for all the pixels has not yet been completed, the operation returns to step S24 to repeat the processing described above. Once the processing for all the pixels is completed, the operation proceeds to step S30 to output the image and then the processing ends.

Through the processing described above, the color appearance can be accurately reproduced even when the photographing operation is performed and the photographic image observation is conducted under different illumination conditions. The image processing device achieved in the embodiment, which executes color conversion by using the optimal adaptation factor in correspondence to the color, i.e., the hue, of the conversion target pixel, is capable of predicting the accurate color appearance with a high level of reliability.

Nineteenth Embodiment

As the adaptation factors each indicating the extent of incomplete adaptation are adjusted in correspondence to the hue of the conversion target color so as to assure better accuracy in the appearance of the reproduced color, the hue dependency is either factored in or not factored in based upon the saturation level of the conversion target pixel in the eighteenth embodiment. In the nineteenth embodiment, the hue dependency is either factored in or not factored in depending upon the adapted luminance.

In a dark viewing condition, the rod cells, which are sensitive to low-light conditions are fully active in brightness/darkness recognition and the cone cells, which are color sensitive, are less active. Namely, at 100 Cd/m² or lower, i.e., the range in which the rod cells are assumed to be engaged in low-light vision, the hue dependency of the adaptation factor tends to be less pronounced due to the effect of the rod cell response. Accordingly, an adapted luminance value $L_{A0}$, beyond which the effect of the hue dependency can be disregarded, is set in advance and so as to not take into consideration the hue dependency at adapted luminance levels equal to or less than the threshold value in the embodiment.

(Color Appearance Testing)

The hue dependency of the adaptation factor in a given viewing condition (the adapted luminance $L_A$, the parameter F determined in correspondence to ambient light level) is calculated as expressed below by conducting a color appearance test similar to that conducted in relation to the eighteenth embodiment.

[Expression 122]

$$D_{h*}(L_A,F,h^*)=D(L_A,F)+D_2(L_A,F)\cdot D_1(h^*) \qquad (122)$$

Figure 32:
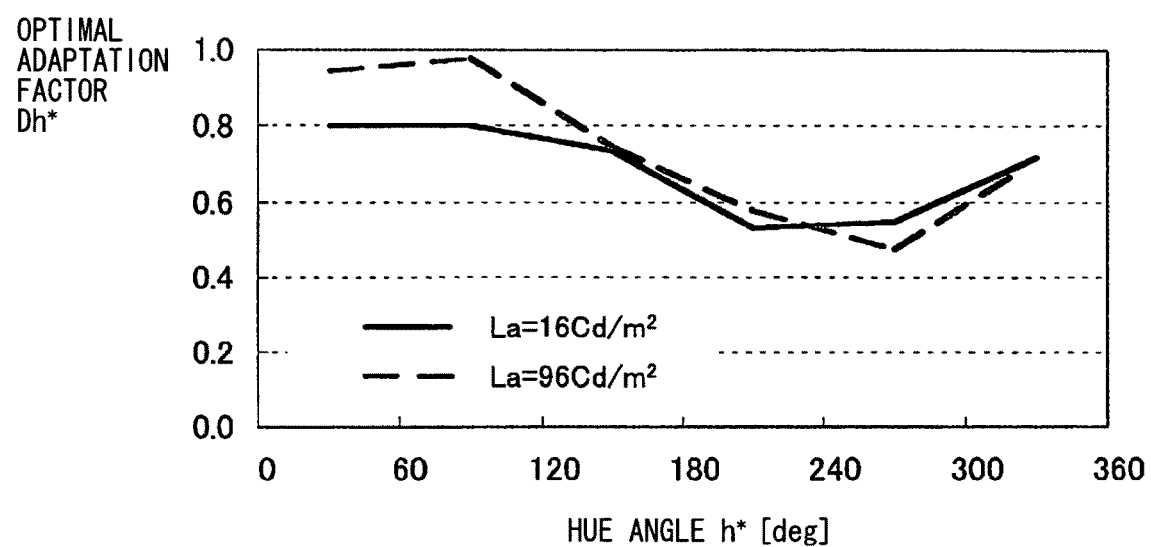

As the adapted luminance is lowered, the extent of change in the adaptation factor attributable to the hue dependency is lessened as indicated in FIG. 32. This means that when the extent of change in the hue dependency is equal to or less than a predetermined threshold value (e.g., when the color difference $\Delta E$ corresponding to the largest value and the smallest value that can be assumed by the hue-dependent adaptation factor is less than 3, since it is generally agreed that a color difference is discernible if $\Delta E \leq 3$), the color appearance is not affected even if the hue dependency of the adaptation factor is disregarded. Accordingly, a threshold value $L_{A0}$ is determined in advance by conducting the color appearance test described above. As an alternative, $L_{A0}$ assuming an optimal value within the range of 1 Cd/m² $\leq L_{A0} \leq$ 100 Cd/m² may be selected, since the color recognition function is not fully engaged at an adapted luminance (equal to or less than approximately 100 Cd/m²) at which only the rod cells for low-light vision alone are in action, the extent of hue dependency is thus reduced in such a state and the cone cells engaged in color recognition are engaged in effective action at approximately 1 Cd/m² or more.

(Conversion Processing)

The processing in the nineteenth embodiment is executed by the personal computer 1 in a configuration similar to that shown in FIG. 1 illustrating the first embodiment.

The color conversion processing is now described. The conversion processing executed in the personal computer, similar to that executed in the eighteenth embodiment, is described in reference to FIG. 31.

The processing executed in steps S21~S25 is similar to that executed in the eighteenth embodiment, as shown in FIG. 31. The operation then proceeds to step S301 to make a decision as to whether or not the adapted luminance $L_A$ falls within a predetermined range $L_A < L_{A0}$, over which the hue dependency is not significant. If an affirmative decision is made in step S301, the operation proceeds to step S302. The processing executed in step S302 is similar to that executed in the eighteenth embodiment, as shown in FIG. 31. If, on the other hand, a negative decision is made in step S301, the operation proceeds to step S303. The processing executed in step S303 is similar to that executed in the first embodiment, as shown in FIG. 3. The processing executed in steps S27~S30 is similar to that executed in the eighteenth embodiment, as shown in FIG. 31.

It is to be noted that expression (24) presented earlier, used to calculate $D_{h*}(L_A, F, h^*)$, may be written as; $D_{h*}=\alpha$ (La, F)+β (La, F)×γ (h*). While β (La, F), which is equivalent to $D_2(L_A, F)$ in expression (24), represents the hue-dependent change in the amplitude determined through appearance testing conducted in a plurality of viewing conditions, it is assumed that β ($L_A$, F)=0 in the processing executed in step S302.

It is to be noted that since the function of the rod cells is affected by the ambient light levels as well as the adapted luminance $L_a$, it is desirable to select an optimal value for the threshold value $L_{A0}$ also in correspondence to the ambient light level. For instance, a plurality of values under a plurality of conditions corresponding to varying levels of ambient light may be set, as shown in FIG. 33, so as to select $L_{A0}$ under the correct conditions corresponding to the viewing condition or the scene illumination conditions or to calculate an optimal value for $L_{A0}$ through interpolation based upon the two $L_{A0}$ values under two different conditions similar to the current condition.

Twentieth Embodiment

As the adaptation factors each indicating the extent of incomplete adaptation are adjusted in correspondence to the hue of the conversion target color so as to assure better accuracy in the appearance of the reproduced color, the hue dependency is either factored in or not factored in based upon the saturation level of the conversion target pixel in the eighteenth embodiment. In the nineteenth embodiment, the hue dependency is either factored in or not factored in depending upon the adapted luminance. In the twentieth embodiment, the hue dependency is either factored in or not factored in depending upon the color temperature of the photographic scene illumination or the light used to illuminate the input/output image viewing condition.

(Color Appearance Testing)

The hue dependency of the adaptation factor in a given viewing condition (the adapted luminance $L_A$, the parameter F determined in correspondence to the ambient light level) is calculated as expressed below by conducting a color appearance test similar to that conducted in relation to the eighteenth embodiment.

[Expression 123]

$$D_{h*}(L_A,F,h^*)=D(L_A,F)+D_2(L_A,F)\cdot D_1(h^*) \quad (123)$$

When the illumination white point is close to the equivalent energy white in white expressed as below by taking into consideration the adaptation factor;

[Expression 124]

$$L_{W,D} = \frac{L_W}{Y_W \cdot D + L_W \cdot (1-D)} \quad (124)$$

$$M_{W,D} = \frac{M_W}{Y_W \cdot D + M_W \cdot (1-D)}$$

$$S_{W,D} = \frac{S_W}{Y_W \cdot D + S_W \cdot (1-D)},$$

the relationship expressed as in (125) below is true, and for this reason, the value of the white ($L_{W,D}$, $M_{W,D}$, $S_{W,D}$) that factors in the adaptation does not change readily regardless of the value assumed by D.

[Expression 125]

$$L_W \approx M_W \approx S_W \approx Y_W \quad (125)$$

Accordingly, a specific illumination condition range over which the color is not significantly affected even if the value of D is changed, is determined in advance. Such an illumination condition range may be determined by ascertaining the actual range over which the hue dependency is not pronounced through color appearance testing or as a color temperature range over which the change in the color (the color difference LE does not affect the appearance even if D is disregarded in the range that the adaptation factor D may assume (0.0~1.0). In addition, the illumination condition range may be set as a range over which the relationship $T_1<T<T_2$ is satisfied for the color temperature T or as a two-dimensional range of the chromaticity coordinates ($X_w,Y_y$) of the illumination white point. It is desirable that the lower limit $T_1$ for the color temperature without significant hue dependency be 4500K, and that the upper limit $T_2$ for the color temperature without significant hue dependency be 7000K. It is even more desirable to set $T_1$ to 5000K and $T_2$ to 6000K.

(Conversion Processing)

The processing in the twentieth embodiment is executed by the personal computer 1 in a configuration similar to that shown in FIG. 1 illustrating the first embodiment.

The color conversion processing is described next. The conversion processing executed in the personal computer, similar to that executed in the eighteenth embodiment, is described in reference to FIG. 31.

The processing executed in steps S21~S25 is similar to that executed in the eighteenth embodiment, as shown in FIG. 31. The conversion processing in the twentieth embodiment, similar to that executed in the eighteenth embodiment, is distinguishable from the processing in the eighteenth embodiment in that an additional step is executed to calculate the color temperature (T) is calculated based upon the illumination white point ($X_w, Y_w, Z_w$) indicated in the information related to the photographic scene illumination and obtained in step S22, and that an additional step is executed to calculate the color temperature (T') based upon the illumination white point ($X_w', Y_w', Z_w'$) indicated in the information related to the image viewing condition and obtained in step S23.

Then, the operation proceeds to step S301 to make a decision as to whether or not the color temperatures T and T' having been calculated in steps S22 and S23 both fall within the predetermined range over which significant color dependency does not manifest, i.e., $T_1<(T, T')<T_2$. If an affirmative decision is made in step S301, the operation proceeds to step S302. The processing in step S302 is similar to that executed in the first embodiment, as shown in FIG. 3. If a negative decision is made in step S301, the operation proceeds to step S303. The processing in step S303 is similar to that executed in the eighteenth embodiment, as shown in FIG. 31. The processing executed in steps S27~S30 is similar to that executed in the eighteenth embodiment, as shown in FIG. 31.

The color temperatures may be determined based upon the white points by, for instance, indicating a point corresponding to the spectrum with black-body radiation as a coordinate point in the XYZ color coordinate system and selecting the color temperatures corresponding to the spectrum assuming coordinate positions closest to the respective white points.

—Variations—

It is to be noted that as is the first embodiment, any of the eighteenth through twentieth embodiment is applicable in various color conversion methods whereby color conversion is executed by factoring in the chromatic adaptation, including the CIECAM02 color appearance model and the von Kries chromatic adaptation transform executed by taking into consideration the white point conversion alone.

It is also to be noted that the value ($X_w', Y_w', Z_w'$) in the CIE 1931 XYZ colorimetric system is calculated as the illumination white point in the image viewing condition in step S23 executed in the eighteenth embodiment. As an alternative, the arithmetic operation expressed in (8) may be skipped and the value ($L_w', M_w', S_w'$) in the cone response space may be obtained as the illumination white point in the image viewing condition. In such a case, the arithmetic operation executed in step S27 expressed in (22) can also be skipped and ($L_w', M_w', S_w'$) obtained in step S23 can be directly used in expression (20). As a result, the processing load can be reduced.

While the eighteenth embodiment is described above in reference to an example in which an image is brought up on display at the monitor 6, the output image may instead be displayed via a projector or in the form of a printout. An example of input data that may be used to display the image as a printout has already been described in reference to step S23. When the image is displayed via a projector, the user may input via a keyboard or the like values representing the output image viewing condition. The device white point ($X_{device}', Y_{device}', Z_{device}'$) and the device luminance $Y_{device0}'$ may be set by referencing data included in the specifications or the user may input values obtained through actual measurements to be used as the device white point ($X_{device}', Y_{device}', Z_{device}'$) and the device luminance $Y_{device0}'$. If the observation is conducted in a dimly lit room, $Y_{device0}'=0$, and ($X_{sw}', Y_{sw}', Z_{sw}'$)=($X_{device}', Y_{device}', Z_{device}'$) may be input to be used as the ambient light white point ($X_{sw}', Y_{sw}', Z_{sw}'$) and the ambient light level $Y_{sw0}'$. If the observation is conducted in a room other than a dark room, the user should enter measurement values obtained by measuring the viewing conditions in the viewing environment.

In addition, while an explanation is given above on an example in which h*, L* and C* in the CIELAB are used respectively for the hue, the lightness and the saturation, parameters in a color space other than the CIELAB may be utilized instead. For instance, J, C and h parameters indicating the relative lightness, the relative saturation and the relative hue in the CIECAM02 may be used.

It is to be noted that the eighteenth through twentieth embodiments may be adopted in combination so as to determine whether or not to factor in the hue dependency of the adaptation factor by checking the three conditions, i.e., the saturation, the adapted luminance and the illumination color temperature, in combination.

It is to be noted that while the threshold values determined by conducting tests on a plurality of subjects are used in the eighteenth through twentieth embodiments, the actual optimal threshold values will vary from subject to subject. Accordingly, the threshold values $C_0^*$, $L_{A0}$, $T_1T_2$ and the like mentioned earlier may be optimized for each observer so as to assure a more faithful reproduction of the color appearance for the particular image observer.

For instance, the adapted luminance value used in the nineteenth embodiment may be adjusted in correspondence to the observer characteristics unique to a given observer based upon the results of an evaluation provided by the observer, indicating the image with better color reproduction among those resulting from conversion executed by using D assuming different values calculated as;

[Expression 126]

$$D_{h^*}(L_A, F, h^*) = D(L_A, F) + D_2(L_A, F) \cdot D_1(h^*) \quad (126)$$

[Expression 127]

$$D_{h^*}(L_A, F, h^*) = D(L_A, F) \quad (127),$$

and corresponding to different conditions, which are equivalent to somewhat more than and less than the predetermined adapted luminance value $L_{A0}$ representing the average. This test does not have to be conducted for all colors and instead may be conducted in conjunction with colors (e.g., yellow and blue) which are markedly hue dependent.

In the conversion executed based upon $D_{h^*}(L_A, F, h^*) = D(L_A, F)$, too, an adapted luminance value $L_{A0}'$ for an adapted luminance considered to assure a similar color appearance may be determined in correspondence to a color with marked hue dependency and may be stored as an observer inherent threshold value into the memory of a personal computer or the like. The actual processing executed in conjunction with such a threshold value will be similar to that executed in the nineteenth embodiment except that the decision in step S301 is made by using $L_{A0}'$ instead of $L_{A0}$.

Variation 1 of the Eighteenth Through Twentieth Embodiments

An explanation is given above in reference to the embodiments on an example in which a photographic image undergoes color conversion to generate an image to be observed on a monitor or as a printout by taking into consideration the difference between the photographic scene illumination conditions and the image viewing condition. However, the principle described in reference to the embodiments may be adopted in any other application that requires the appearance of color under different viewing conditions to be predicted by using a color appearance model (including a chromatic adaptation method).

For instance, the present invention may be adopted in an application in which an image, initially created to be observed in a first viewing condition (e.g., as a display image on a monitor), is converted for observation in a second viewing condition (as a hard copy printout) by taking into consideration the color appearance so as ensure that the image observed in the second viewing condition is similar in appearance to the image observed in the first viewing condition or in an application in which an image, having initially undergone a chromatic adaptation transform on an assumption that it is to be observed in standard viewing conditions, must undergo a further chromatic adaptation transform to create an image optimal for the actual viewing condition, as well as in the embodiments described earlier.

In such an alternative application, information related to the first viewing condition in which first image data are created based upon already acquired image data is obtained in step S22 instead of the information related to the photographic scene illumination. The information related to the first viewing condition mentioned above indicates the illumination condition at the device used to create the input image data and also used for input image data observation and the ambient illumination condition in the viewing condition. If the image data do not include any data related to the first viewing condition, the conditions of the sRGB standard viewing conditions (white point=D65, luminance $Y_{device0}=80$ $Cd/m^2$, ambient light white point=D50, ambient light level $Y_{sw0}=4.1$ $Cd/m^2$) are read and the illumination white point $(X_w, Y_w, Z_w)$ and the luminance $Y_{w0}$ in the first viewing condition are calculated by incorporating the device white point and the ambient light white point.

If the image has been created to be observed in a viewing condition other than the sRGB standard viewing conditions, the device white point $(X_{device}, Y_{device}, Z_{device})$ and the luminance $Y_{device0}$ of the device having been used to create the image, the ambient light white point $(X_{sw}, Y_{sw}, Z_{sw})$ and the ambient light level $Y_{sw0}$, entered by the user (observer) via the keyboard, may be read and the illumination white point $(X_w, Y_w, Z_w)$ and the corresponding luminance $Y_{w0}$ in the first image viewing condition may be calculated by incorporating the device white point and the ambient light white point.

In step S23, information related to the second viewing condition is obtained. The information related to the second viewing condition indicates the illumination condition at the device used for the actual output image data observation and the ambient illumination condition in the viewing condition where the output image data are observed. The information related to the first viewing condition and the information related to the second viewing condition each relate to the environment of the peripheral visual field, which affects the appearance of the image and indicate, for instance the brightness level and the white point of an illuminating light source, the ambient light level and the like.

Since the processing may be otherwise executed as in the eighteenth through twentieth embodiments, as shown in FIG. 31, a repeated explanation is not provided.

Variation 2 of the Eighteenth Through Twentieth Embodiments

As variation 2 of the eighteenth through twentieth embodiments, an application in which an image observed in a first viewing condition is also observed in a different viewing condition, i.e., a second viewing condition is described. The embodiment may be adopted to match the appearance of, for instance, a printout image with the appearance of an image observed at a monitor or the appearance of an image projected via a projector with the appearance of an image observed at a monitor.

In this case, information related to the viewing condition in which a first image is observed, input by the user via a keyboard or the like, is obtained in step S22 instead of the information related to the photographic scene illumination. If "CRT observation (sRGB standard viewing conditions)" is selected, the XYZ value at D65 for the device white point ($X_{device}$, $Y_{device}$, $Z_{device}$), luminance $Y_{device0}'=80$ Cd/m², the XYZ value at D50 for the ambient light white point ($X_{sw}$, $Y_{sw}$, $Z_{sw}$) and ambient light level $Y_{sw0}=4.1$ Cd/m² are set. Alternatively, values ($X_{device}$, $Y_{device}$, $Z_{device}$), $Y_{device0}$, ($X_{sw}$, $Y_{sw}$, $Z_{sw}$) and $Y_{sw}$ entered by the user may be obtained.

Based upon the four values obtained as described above, the cone response ($L_W$, $M_W$, $S_W$) of the illumination white point and the luminance $Y_{w0}$ at which visual perception is adapted in the input image viewing condition are determined.

Information related to the viewing condition where the output image is to be observed, entered by the user with a keyboard or the like, is obtained in step S23. Namely, the white point ($X_{device}'$, $Y_{device}'$, $Z_{device}'$) and the luminance $Y_{device0}'$ of the device used in the output image observation, the ambient light white point ($X_{sw}'$, $Y_{sw}'$, $Z_{sw}'$) and the ambient light level $Y_{sw0}'$, entered by the user (observer) via a keyboard or the like, are read and the cone response ($L_w'$, $M_w'$, $S_W'$) of the illumination white point and the corresponding luminance $Y_{w0}'$ in case that visual perception is adapted in the output image viewing condition are calculated by incorporating the device white point and the ambient light white point.

For instance, if the output image is to be observed as a printed hard copy, the calculation is executed by using the white point ($X_{device}'$, $Y_{device}'$, $Z_{device}'$) and the luminance $Y_{device0}'$ of the illumination used in the output image observation, the ambient light white point ($X_{sw}'$, $Y_{sw}'$, $Z_{sw}'$) and the ambient light level $Y_{sw0}'$, entered by the user (observer) via a keyboard or the like. If, on the other hand, the output image is displayed via a projector, the following values, entered by the user with a keyboard or the like, may be used.

For the white point ($X_{device}'$, $Y_{device}'$, $Z_{device}'$) and the luminance $Y_{device}'$ of the device, data included in the specifications or values obtained by the user through actual measurements may be used. For the ambient light white point ($X_{sw}'$, $Y_{sw}'$, $Z_{sw}'$) and the ambient light level $Y_{sw0}'$, $Y_{sw0}'=0$ and ($X_{sw}'$, $Y_{sw}'$, $Z_{sw}'$)=($X_{device}'$, $Y_{device}'$, $Z_{device}'$) may be entered if the image is to be observed in a dark room. Otherwise, the values obtained by the user by measuring the viewing conditions in the viewing condition may be entered.

As in the eighteenth embodiment, ($L_w'$, $M_w'$, $S_w'$) and $Y_{w0}'$ are calculated by using the ratio $R_{mix}'$ of the influences of the device light source used for the output image observation and the ambient illuminating light source.

Variation 3 of the Eighteenth Through Twentieth Embodiments

In the eighteenth through twentieth embodiments, the adaptation factor D is adjusted in correspondence to the color (the hue, the saturation level and the like) of each target pixel undergoing the color conversion. As an alternative, the pixels constituting the image data may be grouped into areas each made up with a plurality of pixels present in the area, a representative color for each area may be determined and an adaptation factor D to be used in the pixel conversion within the area may be determined based upon the representative color (the hue, the saturation level and the like) instead of adjusting the adaptation factor D in correspondence to the individual pixels. Namely, the color (hue, saturation level and the like) distribution in the image data may be analyzed and the adaptation factor may be determined based upon the color distribution resulting from the analysis.

The image data may be divided into areas by dividing the image data into areas each corresponding to a given subject based upon edge extraction results or by dividing the image into blocks. The adaptation factor D determined for each area corresponding to a given subject defined based upon the edge extraction results changes in a manner faithfully reflecting the outline of the particular subject and thus, the converted image does not take on any unnatural look such as a change in D manifesting as a noticeable boundary.

If the image data are divided into blocks and the adaptation factor D is adjusted to assume different values in correspondence to the individual block areas, D used in a given area becomes discontinued at a block boundary. If such changes in D lead to an unnatural look in the vicinity of the boundaries of the divided areas, an interpolated D, obtained through interpolation executed based upon the representative adaptation factors D in the adjacent areas, may be used over a plurality of pixels present in each boundary area so as to assure continuity in D.

Variation 4 of the Eighteenth Through Twentieth Embodiments

An application in which a photographic image is displayed at a liquid crystal display screen mounted on the rear of a digital camera is described. The digital camera achieved in the variation is structurally similar to the digital camera 30 in the ninth embodiment, and is accordingly described in reference to FIG. 18 illustrating the ninth environment. The digital camera 30 comprises a control unit 31, an imaging unit 32, a memory 33, a monitor 34, a photometering unit 35 and the like. The monitor 34 is a liquid crystal monitor mounted at the rear of the digital camera 30.

The control unit 31, constituted with a microprocessor, peripheral circuits and the like executes various types of control for the digital camera 30 and the image processing to be detailed later by executing a program stored in the memory 33. The imaging unit 32, constituted with an image sensor such as CCD, converts a light flux originating from the subject and received therein via a photographic optical system (not shown) such as a photographic lens, to electrical signals, digitizes the electrical signals resulting from the conversion and outputs digital image data. The imaging unit 32, equipped with RGB color filters, outputs image data expressed in the RGB colorimetric system.

Since the control unit 31 in the digital camera 30 executes image processing similar to that shown in FIG. 31, the following explanation is given by referring to FIG. 31.

In step S21, a photographic image captured by the imaging unit 32 is obtained. Step S221 is executed as in the first embodiment, as shown in FIG. 31. In step S22, information related to the photographic scene is obtained. Since the details of this processing are similar to those explained in reference to the eighteenth embodiment, a repeated explanation is not provided. In step S23, information related to the image viewing condition is obtained. Step S222 is executed as in the eighteenth embodiment, as shown in FIG. 31.

The image observation device used for the image observation in this embodiment is the monitor 34 at the digital camera 30. Accordingly, the white point and the luminance of the monitor 34 stored in advance in the memory 33 are read and respectively designated as the device white point ($X_{device}'$, $Y_{device}'$, $Z_{device}'$) and the device luminance $Y_{device0}'$. In addition, the ambient light level is calculated by engaging the photometering function of the photometering unit 35 and the calculated ambient light level is set as the ambient light level $Y_{sw0}'$. The ambient illuminating light source may be determined by checking the WB data for the most recently photographed image and the white point of this light source may be read and designated as the ambient white point ($X_{sw}'$, $Y_{sw}'$, $Z_{sw}'$).

If the user is allowed to select the type of light source used for the observation in a menu listing, for instance, "sunlight", "overcast", "incandescent lamp", "fluorescent lamp" and the like, the white point corresponding to the selected light source is read as the ambient light white point. Since the illumination white point ($X_w'$, $Y_w'$, $Z_w'$) and the luminance $Y_{w0}'$ in the image viewing condition can be calculated by incorporating the device white point and the ambient light white point, as in the eighteenth embodiment, a repeated explanation is not provided.

The processing executed in steps S24~S30 is similar to that executed in the eighteenth embodiment. The image output and brought up on display on the monitor 34 mounted at the rear of the digital camera 30 assumes an appearance close to that of the actual photographic scene, achieved through simple processing even when the entry of the viewing condition information by the user is skipped.

Variation 5 of the Eighteenth Through Twentieth Embodiments

Figure 34:
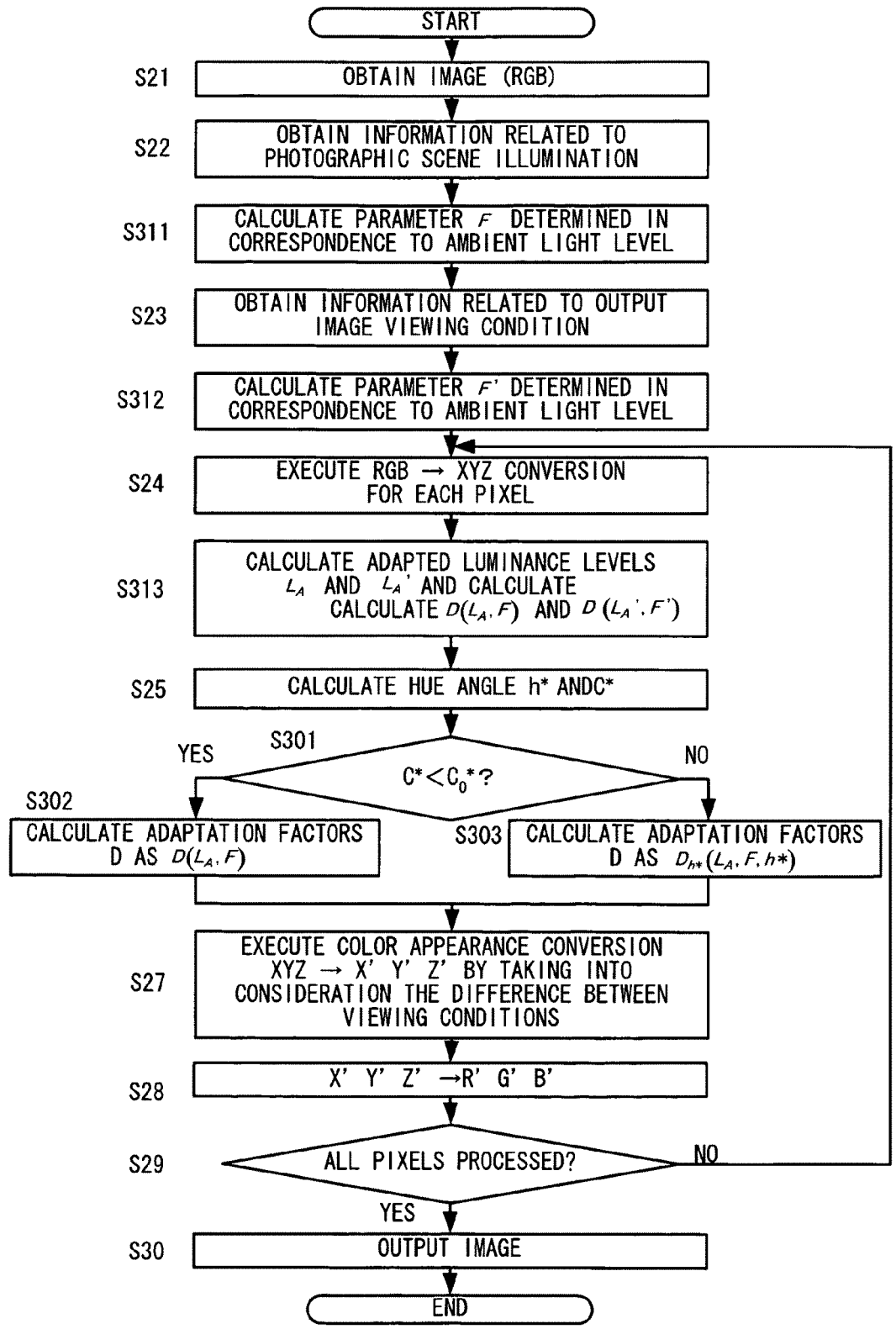

While the adapted luminance $L_A$ and the adapted luminance $L_A'$ each assume a uniform value for the entire image in the description provided above, the adapted luminance levels may instead be calculated in correspondence to each pixel or each area. For instance, $L_A$ and $L_A'$ may be calculated as; $L_A = y \cdot Y_{w0}/Y_w$ and $L_A' = y \cdot Y_{w0}'/Y_w'$ in relation to the white brightness value $Y_w$, each by using the relative brightness value representing the average of brightness values at a predetermined number of pixels surrounding the conversion target pixel or a relative brightness value y of the representative color. When this change is instituted in the eighteenth embodiment, the flow of processing executed by the personal computer 1 is modified as shown in FIG. 34.

Since the processing executed in steps S21 and S22 is similar to that executed in the eighteenth embodiment, as shown in FIG. 31, a repeated explanation is not provided. In step S311, the parameter F, which is determined in correspondence to the ambient light level, is calculated by using the information related to the photographic scene illumination, having been obtained in step S22. Since F can be determined as in step S221 in the eighteenth embodiment, a repeated explanation is not provided. Since the processing executed in step S23 is similar to that executed in the eighteenth embodiment, as shown in FIG. 31, a repeated explanation is not provided.

In step S312, the parameter F', which is determined in correspondence to the ambient light level, is calculated by using the information related to the image viewing condition, having been obtained in step S23. Since F' can be determined as in step S222 in the eighteenth embodiment, a repeated explanation is not provided. Since the processing executed in steps S24 and S25 is similar to that executed in the eighteenth embodiment, as shown in FIG. 31 and accordingly, a repeated explanation is not provided. In step S313, $L_A$ and $L_A'$ are calculated as $L_A = y \cdot Y_{W0}/Y_W$ and $L_A' = y \cdot Y_{W0}'/Y_W'$ in relation to the white brightness value $Y_W$, each by using the relative brightness value y representing the average of the brightness values at a predetermined number of pixels surrounding the conversion target pixel and D ($L_A$, F) and D ($L_A'$, F') are calculated based upon F and F' having been determined in steps S311 and S312.

[Expression 128]

$$D(L_A, F) = F\left[1 - \left(\frac{1}{3,6}\right)e^{\left(\frac{-(L_A+42)}{92}\right)}\right] \quad (128)$$

[Expression 129]

$$D(L_A', F') = F'\left[1 - \left(\frac{1}{3,6}\right)e^{\left(\frac{-(L_A'+42)}{92}\right)}\right] \quad (129)$$

Since the processing executed in steps S301~S30 is similar to that executed in the eighteenth embodiment, as shown in FIG. 31, a repeated explanation is not provided. Namely, the processing executed in the eighteenth embodiment is modified by executing step S311 instead of step S221, executing step S312 instead of step S222 and executing step S313 prior to step S25. The variation may be likewise adopted in the nineteenth and twentieth embodiments.

It is to be noted that the adapted luminance levels $L_A$ and $L_A'$ may be calculated through a method other than that described above, as long as the adapted luminance levels can be determined in correspondence to the conversion target pixel.

In the eighteenth embodiment described above, the information related to the photographic scene illumination and the information related to the image viewing condition are obtained and the adaptation factors are adjusted based upon the individual sets of information in correspondence to the color. However, processing may be executed so as to alter the adaptation factor in correspondence to the color only in either the photographic scene or the image viewing condition or either one of the two different viewing conditions.

In addition, while an explanation is given above in reference to the eighteenth through twentieth embodiments on an example in which L*, C* and h*, in the CIELAB are used respectively for the lightness the saturation and the hue, parameters related to the lightness, the saturation level and the hue in a color space other than the CIELAB maybe utilized instead. For instance, J, C and h in a relative color space of the CIECAM02, Q, M and h in an absolute color space of the CIECAM02 or parameters in any other color space may be utilized as has been already explained in reference to the first through seventeenth embodiments.

It is to be noted that in the eighteenth through twentieth embodiments, the hue dependency of the adaptation factor is either taken into consideration or not depending upon the viewing condition or the image color (hue) by assuming that the adaptation factor is dependent only upon the hue of the conversion target pixel or of the representative color calculated by using data at the conversion target pixel and the surrounding pixels and the viewing condition (adapted luminance and the ambient light level). However, if another element of the viewing condition (e.g., saturation dependency, lightness dependency or another viewing condition) affects the adaptation factor, a threshold value may be set so as to lighten the processing load by disregarding the image color dependency at or under the threshold value.

The appearance of the observation target may be affected by an appearance mode, e.g., a light source color mode in which the color of light emitted at the device itself, e.g., a display unit, is assumed or an object color mode, in which the observation target is observed as reflected light. While the adaptation factor is adjusted in correspondence to the hue or the saturation level of the conversion target pixel or the representative color, the adapted luminance in the viewing condition, the color temperature, the brightness or the like in the first through twentieth embodiments, the adaptation factor may instead be adjusted in correspondence to the currently selected appearance mode.

This alternative may be adopted in the first embodiment by conducting color appearance tests in at least two appearance modes in conjunction with a color chart of light (light source color mode) emitted at the device itself, e.g., a display unit and a printed color chart (object color mode) and preparing in advance data indicating the relationship between the optimal adaptation factor $D_{h*}$ and the hue angle h* such as those shown in FIG. 2 for the individual modes including at least the light source color mode and the object color mode. Then, the adaptation factor simply needs to be switched in correspondence to the input/output environment appearance mode so that if the image display conditions ascertained in step S23 in FIG. 3 are equivalent to the light source color mode, e.g., the image is brought up on display at the display unit, $D_{h*}$ corresponding to the light source color mode is used and that if the image display conditions ascertained in step S23 in FIG. 3 indicate a printout observation, $D_{h*}$ corresponding to the object color mode is used.

In addition, in step S22 in FIG. 3, the object color mode may be assumed, since a regular scene is normally observed as reflected light. Then, the adaptation factor may be switched if a subject taking on the light source color has been photographed so as to use $D_{h*}$ corresponding to the light source color mode in response to instructions entered by the user. Likewise, it is more desirable to switch the adaptation factor to be used in a similar manner in correspondence to the target object appearance mode in the input/output viewing condition in the other embodiments as well. When an image is observed through transmitted light observation, as when a specimen is observed through a microscope, the light source color mode may be selected as the appearance mode or a transmitted light color mode, specially set in conjunction with the transmitted light, may be selected.

While the invention has been particularly shown and described with respect to preferred embodiments and variations thereof by referring to the attached drawings, the present invention is not limited to these examples and it will be understood by those skilled in the art that various changes in form and detail may be made therein without departing from the scope and teaching of the invention.

The disclosures of the following priority applications are herein incorporated by reference:

Japanese Patent Application No. 2006-287918 filed Oct. 23, 2006

Japanese Patent Application No. 2006-317391 filed Nov. 24, 2006

Japanese Patent Application No. 2006-317748 filed Nov. 24, 2006

The invention claimed is:

1. An image processing method for executing color conversion processing on input image data by taking into consideration chromatic adaptation characteristics of human visual perception, the color conversion processing being executed so that color appearances under different viewing or illumination conditions become close to each other, comprising:

determining a chromatic adaptation transform expression to be used in executing the color conversion processing, the chromatic adaptation transform expression using an adaptation factor indicating a degree to which human visual perception is adapted to a white point under a given illumination condition or viewing condition;

preparing in advance relationship information between an optimal adaptation factor and color;

determining one or more adaptation factors for the input image, the one or more adaptation factors indicating at least one of:

an extent of adaptation to an illumination condition under which a scene where an input image is obtained is illuminated, an extent of adaptation to a viewing condition where the input image is observed, and an extent of adaptation to a viewing condition where an output image is observed;

altering the one or more adaptation factors based upon i) the relationship information and ii) at least one of a hue and a saturation of the input image; and executing the color conversion processing for the input image by using the determined chromatic adaptation transform expression using the altered one or more adaptation factors.

2. The image processing method according to claim 1, wherein:

the step of determining one or more adaptation factors determines the one or more adaptation factors for each of a plurality of areas of the input image;

the step of altering the one or more adaptation factors alters the one or more adaptation factors based upon i) the relationship information and ii) at least one of a hue and a saturation of a corresponding area of the plurality of areas; and the step of executing color conversion processing executes the color conversion processing for each of the plurality of areas of the input image by using the altered one or more adaptation factors.

3. The image processing method according to claim 2, wherein the plurality of areas of the input image correspond to a plurality of conversion target pixels of the input image.

4. The image processing method according to claim 3, wherein:

the one or more adaptation factors indicate:

an extent of adaptation to an illumination condition under which a scene where an input image is obtained is illuminated, or an extent of adaptation to a viewing condition where the input image is observed.

5. The image processing method according to claim 3, wherein:

the one or more adaptation factors indicate an extent of adaptation to a viewing condition where an output image is observed.

6. The image processing method according to claim 3, wherein:

the one or more adaptation factors indicate:

an extent of adaptation to an illumination condition under which a scene where an input image is obtained is illuminated, or an extent of adaptation to a viewing condition where the input image is observed, and an extent of adaptation to a viewing condition where an output image is observed; and the step of altering the one or more adaptation factors alters each of the adaptation factors.

7. The image processing method according to claim 3, wherein the step of determining one or more adaptation factors for the input image determines a representative color for each of the plurality of conversion target pixels based upon a conversion target pixel to be converted or based upon the conversion target pixel and pixels surrounding the conversion target pixel, wherein the image processing method further comprises:
depending upon a current viewing condition or the input image, determining whether or not the one or more adaptation factors are to be altered based upon i) the relationship information and ii) at least one of a hue and a saturation of the representative color.

8. The image processing method according to claim 7, wherein:
the step of determining whether or not the one or more adaptation factors are to be altered determines whether or not the one or more adaptation factors to be hue-dependent.

9. The image processing method according to claim 2, wherein:
the step of determining one or more adaptation factors for the input image determines a representative color for each of the plurality of areas of the input image; and
the step of altering the one or more adaptation factors alters the one or more adaptation factors based upon i) the relationship information and ii) at least one of a hue and a saturation of the representative color of the corresponding areas of the plurality of areas.

10. The image processing method according to claim 1, further comprising:
determining at least one of a hue distribution or a saturation distribution in the input image based upon color distribution analysis that is executed on the input image,
wherein the step of altering the one or more adaptation factors alters the one or more adaptation factors based upon i) the relationship information and ii) the at least one of the hue distribution and the saturation distribution in the input image.

11. The image processing method according to claim 10, wherein:
the one or more adaptation factors indicate:
an extent of adaptation to an illumination condition under which a scene where an input image is obtained is illuminated, or
an extent of adaptation to a viewing condition where the input image is observed.

12. The image processing method according to claim 10, wherein
the one or more adaptation factors indicate an extent of adaptation to a viewing condition where an output image is observed.

13. The image processing method according to claim 10, wherein
the one or more adaptation factors indicate:
an extent of adaptation to an illumination condition under which a scene where an input image is obtained is illuminated, or
an extent of adaptation to a viewing condition where the input image is observed, and
an extent of adaptation to a viewing condition where an output image is observed; and
the step of altering the adaptation factors alters each of the adaptation factors of the input image.

14. The image processing method according to claim 10, wherein:
the step of determining one or more adaptation factors for the input image determines the one or more adaptation factors that are applicable to an entire region of the input image based upon the at least one of the hue distribution and the saturation distribution of the input image.

15. The image processing method according to claim 10, wherein:
the step of determining one or more adaptation factors for the input image determines the one or more adaptation factors for a plurality of areas of the input image; and
the step of altering the one or more adaptation factors alters the one or more adaptation factors of each of the plurality of areas of the input image based upon i) the relationship information and ii) the at least one of the hue distribution and the saturation distribution of the corresponding area of the plurality of areas.

16. A non-transitory computer-readable recording medium containing an image processing program enabling a computer to execute an image processing method, the image processing method executing color conversion processing on input image data by taking into consideration chromatic adaptation characteristics of human visual perception, the color conversion processing being executed so that color appearances under different viewing or illumination conditions become close to each other, the method comprising:
determining a chromatic adaptation transform expression to be used in executing the color conversion processing, the chromatic adaptation transform expression using an adaptation factor indicating a degree to which human visual perception is adapted to a white point under a given illumination condition or viewing condition;
preparing in advance relationship information between an optimal adaptation factor and color;
determining one or more adaptation factors of the input image, the one or more adaptation factors indicating at least one of:
an extent of adaptation to an illumination condition under which a scene where an input image is obtained is illuminated,
an extent of adaptation to a viewing condition where the input image is observed, and
an extent of adaptation to a viewing condition where an output image is observed;
altering the one or more adaptation factors based upon i) the relationship information and ii) at least one of a hue and a saturation of the input image; and
executing the color conversion processing of the input image by using the determined chromatic adaptation transform expression using the altered one or more adaptation factors.

17. An image processing device, comprising a control unit that executes an image processing method, the image processing method executing color conversion processing on input image data by taking into consideration chromatic adaptation characteristics of human visual perception, the color conversion processing being executed so that color appearances under different viewing or illumination conditions become close to each other, the control unit is configured to:
determine a chromatic adaptation transform expression to be used in executing the color conversion processing, the chromatic adaptation transform expression using an adaptation factor indicating a degree to which human visual perception is adapted to a white point under a given illumination condition or viewing condition;
prepare in advance relationship information between an optimal adaptation factor and color;
determine one or more adaptation factors of the input image, the one or more adaptation factors indicating at least one of:

an extent of adaptation to an illumination condition under which a scene where an input image is obtained is illuminated, an extent of adaptation to a viewing condition where the input image is observed, and an extent of adaptation to a viewing condition where an output image is observed;

alter the one or more adaptation factors based upon i) the relationship information and ii) at least one of a hue and a saturation of the input image; and execute the color conversion processing of the input image by using the determined chromatic adaptation transform expression using the altered one or more adaptation factors.

18. A camera, comprising:

an imaging unit that captures an image of a subject;

a display unit; and a control unit that executes color conversion processing on image data generated by the imaging unit by taking into consideration chromatic adaptation characteristics of human visual perception, the color conversion processing being executed so that color appearances under different viewing or illumination conditions become close to each other, the control unit being configured to:

determine a chromatic adaptation transform expression to be used in executing the color conversion processing the chromatic adaptation transform expression using an adaptation factor indicating a degree to which human visual perception is adapted to a white point under a given illumination condition or viewing condition;

prepare in advance relationship information between an optimal adaptation factor and color;

determine one or more adaptation factors of the input image, the one or more adaptation factors indicating at least one of:

an extent of adaptation to an illumination condition under which a scene where an input image is obtained is illuminated, an extent of adaptation to a viewing condition where the input image is observed, and an extent of adaptation to a viewing condition where an output image is observed;

alter the one or more adaptation factors based upon i) the relationship information and ii) at least one of a hue and a saturation of the input image; and execute the color conversion processing of the input image by using the determined chromatic adaptation transform expression using the altered one or more adaptation factors; and display the image data after the color conversion processing has been executed, at the display unit.

19. The camera according to claim 18, further comprising:

a photometering unit, wherein the control unit is configured to set a viewing condition where an output image is observed, based upon photometering data obtained via the photometering unit and an illumination condition of the image display unit.

* * * * *